(12) United States Patent
Lichty et al.

(10) Patent No.: US 9,399,575 B2
(45) Date of Patent: Jul. 26, 2016

(54) METHODS AND APPARATUS FOR GAS-PHASE REDUCTION/OXIDATION PROCESSES

(71) Applicant: The Regents of the University of Colorado, a body corporate, Denver, CO (US)

(72) Inventors: Paul Lichty, Broomfield, CO (US); Christopher Muhich, Grosse Pointe Park, CO (US); Darwin Arifin, Boulder, CO (US); Alan W. Weimer, Niwot, CO (US); Aldo Steinfeld, Brugg (CH)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 13/857,951

(22) Filed: Apr. 5, 2013

(65) Prior Publication Data

US 2013/0266502 A1    Oct. 10, 2013

Related U.S. Application Data

(60) Provisional application No. 61/620,891, filed on Apr. 5, 2012.

(51) Int. Cl.
| | |
|---|---|
| *C01B 3/06* | (2006.01) |
| *C01B 31/18* | (2006.01) |
| *C01B 3/04* | (2006.01) |
| *C01B 13/02* | (2006.01) |
| *F24J 2/07* | (2006.01) |
| *F24J 2/48* | (2006.01) |

(52) U.S. Cl.
CPC ............ *C01B 3/061* (2013.01); *C01B 3/045* (2013.01); *C01B 13/0207* (2013.01); *C01B 31/18* (2013.01); *F24J 2/07* (2013.01); *F24J 2/485* (2013.01); *Y02E 10/41* (2013.01); *Y02E 60/364* (2013.01); *Y02P 20/134* (2015.11)

(58) Field of Classification Search
None
See application file for complete search history.

(56) References Cited

U.S. PATENT DOCUMENTS

| | | | |
|---|---|---|---|
| 2008/0086946 A1* | 4/2008 | Weimer et al. | ............ 48/89 |
| 2015/0030529 A1 | 1/2015 | Hao et al. | |

OTHER PUBLICATIONS

"Water splitting for hydrogen production with ferrites" Sang Bum Han et al. Solar Energy vol. 81, pp. 623-628, 2007.*
"A spinel ferrite/hercynite water-splitting redox cycle" Jonathan R. Scheffe et al. International Journal of Hydrogen Energy, vol. 35, pp. 3333-3340, 2010.*
Chavez, J.M. and C. Chaza, "Testing of a porous ceramic absorber for a volumetric air receiver," Solar Energy Materials, vol. 24, No. 1-4, 1991, pp. 172-181.

(Continued)

*Primary Examiner* — Melvin C Mayes
*Assistant Examiner* — Douglas Call
(74) *Attorney, Agent, or Firm* — Snell & Wilmer L.L.P.

(57) ABSTRACT

A method and apparatus for gas-phase reduction/oxidation is disclosed. The apparatus includes a reactor including at least one reactor tube or containment vessel with active redox material within the reactor tube or containment vessel, a first reactant gas or vacuum for reducing the active redox material, and a second reactant gas for oxidizing the active redox material. The method may be run under substantially isothermal conditions and/or energy supplied to the apparatus may include solar energy, which may be concentrated.

19 Claims, 33 Drawing Sheets

(56) References Cited

OTHER PUBLICATIONS

Ferguson, J.D., A.W. Weimer and S.M. George, "Atomic layer deposition of ultrathin and conformal Al2O3 films on BN particles," Thin Solid Films, vol. 371, No. 1-2, 2000, pp. 95-104.

Kodama, T., Y. Kondoh, R. Yamamoto, H. Andou and N. Satou, "Thermochemical hydrogen production by a redox system of ZrO2-supported Co(II)-ferrite," Solar Energy, vol. 78, No. 5, 2005, pp. 623-631.

Fend, T., R. Pitz-Paal, O. Reutter, J. Bauer and B. Hoffschmidt, "Two novel high-porosity materials as volumetric receivers for concentrated solar radiation," Solar Energy Materials & Solar Cells, vol. 84, No. 1-4, 2004, pp. 291-304.

Abanades, S. and G. Flamant, "Thermochemical hydrogen production from a two-step solar-driven water-splitting cycle based on cerium oxides," Solar Energy, vol. 80, No. 12, 2006, pp. 1611-1623.

Kodama, T., N. Gokon and R. Yamamoto, "Thermochemical two-step water splitting by ZrO2-supported NixFe3-xO4 for solar hydrogen production," Solar Energy, vol. 82, No. 1, 2008, pp. 73-79.

Scheffe, J.R., A. Frances, D.M. King, X. Liang, B.A. Branch, A.S. Cavanagh, S.M. George and A.W. Weimer, "Atomic layer deposition of iron(III) oxide on zirconia nanoparticles in a fluidized bed reactor using ferrocene and oxygen," Thin Solid Films, vol. 517, No. 6, 2009, pp. 1874-1879.

Chueh, W.C., C. Falter, M. Abbott, D. Scipio, P. Furler, S.M. Haile and A. Steinfeld, "High-Flux Solar-Driven Thermochemical Dissociation of CO(2) and H(2)O Using Nonstoichiometric Ceria," Science, vol. 330, No. 6012, 2010, pp. 1797-1801.

Chueh, W.C. and S.M. Haile, "A thermochemical study of ceria: exploiting an old material for new modes of energy conversion and CO(2) mitigation," Philosophical Transactions of the Royal Society A, Mathematical, Physical and Engineering Sciences, vol. 368, No. 1923, 2010, pp. 3269-3294.

Liang, X.H., N.H. Li and A.W. Weimer, "Template-directed synthesis of porous alumina particles with precise wall thickness control via atomic layer deposition," Microporous and Mesoporous Materials, vol. 149, No. 1, 2012, pp. 106-110.

\* cited by examiner

METHODS AND APPARATUS FOR GAS-PHASE REDUCTION/OXIDATION PROCESSES

CROSS REFERENCE TO RELATED APPLICATIONS

This application claims the benefit of provisional application No. 61/620,891, entitled METHOD AND APPARATUS FOR GAS-PHASE REDUCTION/OXIDATION PROCESS, and filed Apr. 5, 2012, the contents of which are incorporated herein by reference to the extent such contents do not conflict with the present disclosure.

FIELD OF INVENTION

The present invention generally relates to reduction/oxidation (redox) methods and apparatus. More particularly, the invention relates to substantially isothermal redox processes to split gas-phase reactants and to solar thermochemical reactor technology for effecting redox reactions.

BACKGROUND OF THE INVENTION

Various redox processes can be used to split gas-phase reactants. For example, hercynite, ceria, and M-ferrite redox cycles may be used to split water (vapors) and $CO_2$. The hercynite cycle can be represented by the following equations.

Hercynite cycle:

$$\text{Reduction: } CoFe_2O_4 + 3Al_2O_3 \rightarrow CoAl_2O_4 + 2Fe_2AlO_4 + \tfrac{1}{2}O_2 \quad (1)$$

$$\text{Oxidation: } CoAl_2O_4 + 2Fe_2AlO_4 + H_2O \text{ (or } CO_2\text{)} \rightarrow CoFe_2O_4 + 3Al_2O_3 + H_2 \text{ (or } CO\text{)} \quad (2)$$

$$\text{Overall: } H_2O \rightarrow H_2 + \tfrac{1}{2}O_2 \text{ or } CO_2 \rightarrow CO + \tfrac{1}{2}O_2 \quad (3)$$

Non-stoichiometric ceria cycle can be represented by the following equations.

$$\text{Reduction: } 1/\delta CeO_2 + \text{Heat} \rightarrow 1/\delta CeO_{2-\delta} + \tfrac{1}{2}O_2(g) \quad (4)$$

$$\text{Oxidation: } 1/\delta CeO_{2-\delta} + H_2O \text{ or } CO_2(g) \rightarrow 1/\delta CeO_2 + H_2 \text{ or } CO(g) \quad (5)$$

Standard M-ferrite cycle (M=Co, Ni, Mn, Zn, etc.) can be represented by the following equations.

$$\text{Reduction: } M_xFe_{3-x}O_4 \rightarrow [xMO + (3-x)FeO] + \tfrac{1}{2}O_2 \quad (6)$$

$$\text{Oxidation: } [xMO + (3-x)FeO] + H_2O \text{ or } CO2 \rightarrow M_xFe_{3-x}O_4 + H_2 \text{ or } CO \quad (7)$$

The hercynite cycle reduction step (1) can be carried out at temperatures that are substantially lower than those of competing cycles, such as the reduction step (4) of the non-stoichiometric ceria cycle and the reduction step (6) of the standard M-Ferrite Cycle. The hercynite cycle active materials start to undergo thermal reduction at temperatures as low as 940° C. (although reduction is typically performed at 1200 to 1400° C.) [1], while the ceria cycle typically requires a reduction temperature of 1500° C. [2, 3]. The standard ferrite material, on the other hand, starts to undergo thermal reduction at 1190° C.; however, thermal reduction is typically performed at 1450° C. [4].

These systems are normally run as reduction/oxidation (redox) cycles with reduction temperatures typically hundreds of degrees Celsius above the corresponding oxidation temperatures. For example, ceria is typically reduced at 1500° C. and then oxidized at 850° C. to 1000° C. [2, 3]. Likewise, standard ferrite is reduced at 1450° C. and then oxidized between 900 and 1100° C. [4]. This difference in temperature requires a cool-down followed by a heat-up step, both of which take time and inherently result in sensible heat losses and reduced efficiency of the process.

Running the oxidation and reduction steps of the redox cycles at substantially different temperatures may be undesirable for several reasons. For example, systems running such cycle exhibit heat loss with each temperature change. In addition, altering the temperature of the system to run each cycle requires additional time to heat or cool the system that reduces the number of cycles that can be performed during a given period. And, the temperature cycling can cause materials used in the reaction to degrade more quickly than if the reaction could be run at substantially isothermal conditions. Accordingly, improved methods and apparatus for splitting gas-phase reactants using substantially isothermal or isothermal conditions are desired.

Additionally, systems and methods for splitting gas-phase reactants using solar thermal reactors are desired.

SUMMARY OF THE INVENTION

Various embodiments of the disclosure relate to methods and an apparatus for splitting gas-phase reactants using redox reactions under substantially isothermal conditions and/or using solar reactor technology. The methods and apparatus described herein can be used to split gasses in a relatively time- and energy-efficient and economical manner.

As set forth in more detail below, in accordance with various embodiments of the disclosure, reduction and oxidation cycles are performed under isothermal (or substantially isothermal) conditions, such that significant heating or cooling between the respective cycles is not required. This allows faster, more efficient cycling between the reduction and oxidation steps and less wear on the equipment and materials used for the process. In accordance with various embodiments, the oxidation reaction of the isothermal redox reaction is typically much faster than the reduction reaction, such that product gas(es) of the oxidation stage are produced first and/or can easily be separated from gas(es) produced during the reduction reaction.

To operate under the isothermal conditions, reactant or oxidizing gasses may be pulsed into a reactor, such that desired product gasses are produced during the pulse and then inert or reducing gasses are pulsed into the reactor to "reset" the reactor active material. Additionally or alternatively, some or all of the product gasses may be filtered using a membrane, a consumable "getter" material, or by adsorbing onto material and later released—e.g., during a reduction cycle.

In accordance with exemplary embodiments of the disclosure, a method of splitting gas-phase reactants includes providing a reactor comprising at least one reactor tube or containment vessel and active redox material (e.g., selected from the group consisting of one or more of: ceria, M-ferrite and hercynite material, which may have high surface area) within the reactor tube or vessel, reducing (e.g., thermally) the active redox material using a first gas or a vacuum at a first temperature, and oxidizing the active redox material by flowing a second gas over the active redox material to split the second gas, wherein the reducing and oxidizing steps are performed under substantially isothermal conditions—e.g., temperatures between the temperatures typically used for thermal oxidation and reduction or wherein the difference in temperatures of the reducing and oxidizing steps is less than about 400° C., 200° C., 100° C., 50° C., or 25° C. In accordance with aspects of these embodiments, the isothermal temperature is from about 950° C. to about 1750° C. or about 1350° C. to about 1600° C. In accordance with various aspects of these embodiments, the method further comprises removing a first oxygen product gas during the reducing step. In accordance with further aspects, the second (or oxidizing) gas comprises one or more gasses selected from the group consisting of: $H_2O$, $CO_2$, air, and $NO_x$, where x is 1 or 2, and $SO_3$. In accordance with further aspects, the method further comprises repeating steps of reducing, oxidizing, and removing under substantially isothermal operating conditions. In accordance with yet further aspects, one or more product gasses are separated—e.g., using a high-temperature membrane to separate one or more gasses from the product gas stream. In accordance with yet further aspects, a re-generable sorbent is used to capture oxygen in the product stream. In these cases, the sorbent material may be regenerated during a reducing step or be consumed and replenished. An example of a consumable sorbent or "getter" material includes a carbonaceous source such as biomass or carbon black. In accordance with various aspects, the active redox material is formed using one or more of ball milling of individual components, sol-gel processing, or by depositing redox active material onto substrates (e.g., fine alumina, zirconia or similar support particles or onto a monolithic structure) using liquid salts of cobalt and iron or atomic or chemical vapor deposition (ALD or CVD). By way of example, high surface area active redox material may be formed by first synthesizing a highly porous thin film alumina network by coating a sacrificial polymer with alumina [5] followed by removing the polymer leaving a very thin-walled alumina structure for which ALD can be carried out to coat the thin walled alumina with M-ferrite (i.e., $CoFe_2O_4$, $NiFe_2O_4$, etc.) for hercynite cycle active material; such materials may be suitable for fluidized or packed-bed reactors. Alternatively, the high surface area material may include alumina nanoparticles coated with the M-ferrite material; such materials may be suitable for use in reactors where the high surface area material moves around—e.g., from one reaction vessel to another. In accordance with yet further aspects, the first gas is pulsed into the reactor, with enough time between pulses to allow for reduction of the active redox material. In accordance with further aspects, the reactor includes a single tube or containment structure for the active material, or a plurality of reactor tubes. The process can be operated with all active material in all containment vessels or tubes being reduced and subsequently oxidized, or the process may be run where some of the reactor tubes may perform a reducing step while other tubes perform an oxidizing step. In accordance with further aspects, the reactor tubes are contained within a solar heated cavity receiver and the active material heated using concentrated sunlight. In accordance with yet further aspects, the reactor tubes may be operated as fluidized bed reactors with the active material fluidized within the reactor tubes. Alternatively, the tubes or vessels may operate as a powder-flowing reactor, where, for example, "hercynite cycle" active materials can easily flow from one reactor tube or vessel to another. A still further aspect is that the reactor tubes may be heated with both concentrated sunlight and a secondary heating source such as electricity or the burning of natural gas so that the process can be operated continuously when sunlight is unavailable. The absolute pressure in the reactor tube may between about 0.1 Atm and about 5 Atm or about 1 Atm and about 5 Atm, and the pressure during the oxidizing step may desirably be greater than the pressure during the reducing step. To drive the reaction, the second gas may include 50 to 100% oxidizing gas.

In accordance with additional embodiments, a system for gas phase reduction and oxidation includes an isothermal reactor that includes at least one reactor tube or containment vessel and an active redox material (e.g., selected from the group consisting of ceria, M-ferrite and M-ferrite deposited on alumina material, i.e., hercynite cycle active material) within the reactor tube. In accordance with various aspects of these embodiments, the high surface area active redox material is formed using one or more of ball milling of individual components, sol-gel processing, or by depositing material (e.g., using incipient wetness/wet impregnation, ALD or CVD) onto substrates (e.g., on fine alumina or zirconia or similar support particles or a monolithic structure). In accordance with further aspects, the system includes a first or reducing gas and a second or oxidizing gas. The oxidizing gas may include one or more gasses selected from the group consisting of: $H_2O$, $CO_2$, air, and NOx, where x is 1 or 2, and $SO_3$. In accordance with further aspects, the reactor includes a high-temperature membrane to separate one or more gasses from the product gas stream. In accordance with yet further aspects, the reactor includes a re-generable sorbent to capture one or more gasses in the product stream or a consumable carbonaceous material that produces a more desirable product gas (i.e., $2C+O_2->2CO$). In accordance with further aspects, the reactor includes a single tube or containment structure for the active material, or a plurality of reactor tubes. The process can be operated with all active material in all containment vessels or tubes being reduced and subsequently oxidized, or the process may be run where some of the reactor tubes perform a reducing step while other tubes perform an oxidizing step. In accordance with further aspects, the reactor tubes are contained within a solar heated cavity receiver and the active material heated using concentrated sunlight. In accordance with yet further aspects, the reactor tubes may be operated as fluidized bed reactors with the active material fluidized within the reactor tubes. A still further aspect is that the reactor tubes may be heated with both concentrated sunlight and a secondary heating source such as electricity or the burning of natural gas so that the process can be operated continuously when sunlight is unavailable. The reactor tubes may be operated as a fluidized bed (e.g., with M-ferrite material deposited onto high surface area alumina structures formed using sacrificial polymer substrates) or as a flowing powder reactor using, e.g., nano-sized alumina particles coated with M-ferrite material. Further, the tubes or vessels may be operated at an absolute pressure between about 0.1 Atm and about 5 Atm or about 1 Atm and 5 Atm, and the pressure during the oxidation step may be higher than the pressure during the reduction step. To drive the reaction, the second gas may include 50 to 100% oxidizing gas. In accordance with aspects of these embodiments, the system is run under isothermal conditions, where the isothermal temperature is from about 950° C. to about 1750° C. or about 1350° C. to about 1600° C.

In accordance with additional exemplary embodiments, a system for gas-phase reduction and oxidation includes a reactor comprising a first reactor vessel, a second reactor vessel, and an active redox material within at least one of the first reactor vessel and the second reactor vessel, a first reactant gas for reducing the active redox material, and a second reactant gas for oxidizing the active redox material, wherein the active redox material is reduced in the first reactor vessel to form a reduced active redox material, the reduced active redox material travels from the first reactor vessel to the second reactor vessel, and the reduced active redox material is oxidized in the second reactor vessel, and wherein the reactor is at least partially heated using solar energy. In accordance with various aspects of these embodiments, the active redox material comprises solid alumina particles having a size between about 20 nm and 3 microns. The solid alumina particles may be coated with M-ferrite material to form the active redox material having, for example, a molar ratio of the alumina to M-ferrite material of about 3.

In different aspects, the disclosure provides methods and apparatus for simultaneously conducting both steps of a gas-phase redox reaction, where concentrated solar energy provides thermal energy to the reaction. Use of a two-step process can eliminate the need to perform high-temperature separation of gaseous reaction products. In different embodiments, the methods and apparatus of the disclosure can be used to simultaneously conduct both steps of a water and/or carbon dioxide splitting process. In an embodiment, both steps of the two-step reaction are conducted in the same reaction chamber designed to allow efficient recuperation of heat between the two reaction steps. The solar reactors and methods described herein can be used with any of the isothermal methods described herein or with other methods.

In accordance with various embodiments, one of the steps in the two-step reaction involves reducing a reactant such as water vapor using an active material, thereby converting the active material to an oxidized state. When the reactant is water vapor, hydrogen can be generated during this step, while when the reactant is carbon dioxide, carbon monoxide can be generated. The second step involves recovery or regeneration of the active material through reduction of the oxidized active material. In accordance with various aspects of these embodiments, the active material is a metal oxide and the second step in the two-step reaction involves thermal reduction of the oxidized state of the metal oxide, thereby regenerating the reduced form of the metal oxide and producing oxygen.

In accordance with further exemplary embodiments, methods of splitting gas-phase reactants employ a solar thermochemical reactor comprising a plurality of reactor tube assemblies generally located within a cavity, wherein some of the assemblies are operated in a reduction temperature range and the others are operated in an oxidation temperature range. In accordance with various aspects of these embodiments, concentrated solar energy is provided via lateral access to a cavity through an aperture. For the reactor tube operating in oxidation mode, exemplary reactants include $H_2O$, $CO_2$, air, and $NO_x$, where x is 1 or 2, and $SO_3$. Exemplary resulting products for rector tubes operating in oxidation mode include $H_2$ and CO. For the reactor tubes operating in reduction mode, exemplary products include $O_2$. If some variation in temperature also exists along the tube, the reactor tubes operating in oxidation mode may operate in an oxidation temperature range, while those operating in reduction mode may operate in a reduction temperature range. Accordance with further aspects, the temperatures in the reduction temperature range are greater than those in the oxidation temperature range.

In accordance with further exemplary embodiments, the redox cycle is effected at temperatures TR for the reduction step and To for the oxidation step, where TR>TO. In accordance with some aspects of these embodiments, at a given instant, half or a first number of the tubes are operated in the reduction mode at TR while the remaining half or a second number are operated in the oxidation mode at TO. When the reactions reach completion, the operational modes of the tubes may be switched.

Desired reactor tube assembly temperatures may be achieved through consideration of several factors including the thermal energy provided to the reactor, heat transfer within the cavity and tubes, the endothermicity of the reaction during the reduction step and the flow rate of the reactant to be reduced during the metal oxide oxidation step. In accordance with some exemplary systems, two sets of reactor tube assemblies are exposed to approximately the same level of intensity of solar radiation, so that the temperature of the reactor tube assemblies running the oxidation reaction is controlled primarily through the mass flow of the reactant to be reduced (e.g. water or carbon dioxide). Heat transfer within the cavity can be influenced by the design and arrangement of the reactor tube assemblies inside the cavity-receiver. A desired position of the tubes and the number and dimensions of the tubes can be determined by solving the energy conservation equation that couples heat transfer (especially radiative transfer) and reaction enthalpies. The reactor tubes need not be separated from each other by dividing walls or similar structures; this facilitates transfer of heat within the cavity. With such an arrangement, the sensible heat of the solid components during the switching of modes may be transferred among tubes and kept inside the cavity, achieving high internal recuperation of heat.

In accordance with further exemplary embodiments, concentrated solar radiation enters the cavity-receiver through an aperture such as an simple opening or window covered opening. Concentrated solar radiation entering through the aperture or window may be directly intercepted by at least one of the reactor tube assemblies. Concentrated solar radiation entering the cavity may also be re-radiated. In accordance with some embodiments, concentrated solar radiation entering the cavity-receiver and radiation emitted by the hot tubes undergoes absorption and multiple reflections. A number of apertures in the cavity may be less than the number of reactor tube assemblies, so that control of the temperature of each reactor tube is not achieved solely through control of the irradiation intensity through a separate associated aperture.

In accordance with yet additional exemplary embodiments, a multi-tube cavity reactor includes more than two reactor tube assemblies for splitting gas-phase reactants. Exemplary reactor tube assemblies include an inner tube and an outer tube. A bottom end of the outer tube may be closed and the bottom end of the inner tube may be porous, establishing a stagnation flow reactor configuration. Metal oxide or reduced metal oxide on a porous support structure may be located within the annular region between the two tubes, allowing for efficient heat and mass transfer and consequently, fast overall kinetics. The inner tube may be packed with porous media providing increased surface area for heat transfer, for example, to drive the vaporization of water to steam. By way of example, a reactant may flow downward through the inner tubes of the tube assemblies operating in oxidation mode before exiting the inner tube and moving upwards through the supported reduced metal oxide in the annular space between the tubes. The product of the oxidation reaction exits the annular space between the tubes in the oxidation tube assemblies. Inert gas or air may be provided to the inner tubes of the tube assemblies operating in reduction mode. This inert gas or air acts as a sweep gas help remove oxygen gas, the product of the reduction reaction, from the reduction tube assemblies.

In accordance with yet further embodiments, the difference between the oxidation and reduction temperatures (or the maximum of the oxidation and reduction temperature ranges) is less than 500° C., 300° C., 100° C., 50° C., or substantially 0° C. or from 100° C. to 500° C., 100° C. to 300° C., or 0° C. to 50° C. Minimizing the difference between the oxidation and reduction temperatures can simplify the recuperation of heat during the redox steps. In accordance with exemplary embodiments, the reduction temperature is from 1000° C. to 1500° C. (or the reduction temperature range falls within the range from 1000° C. to 1500° C.). In other embodiments, the reduction temperature range may be 1100° C. to 1500° C. or 1200° C. to 1400° C. In accordance with various aspects, the oxidation temperature is from 800° C. to 1400° C. (or the oxidation temperature range falls within the range from 800° C. to 1400° C.).

BRIEF DESCRIPTION OF THE DRAWING FIGURES

The exemplary embodiments of the present invention will be described in connection with the appended drawing figures, in which.

Figure 23:
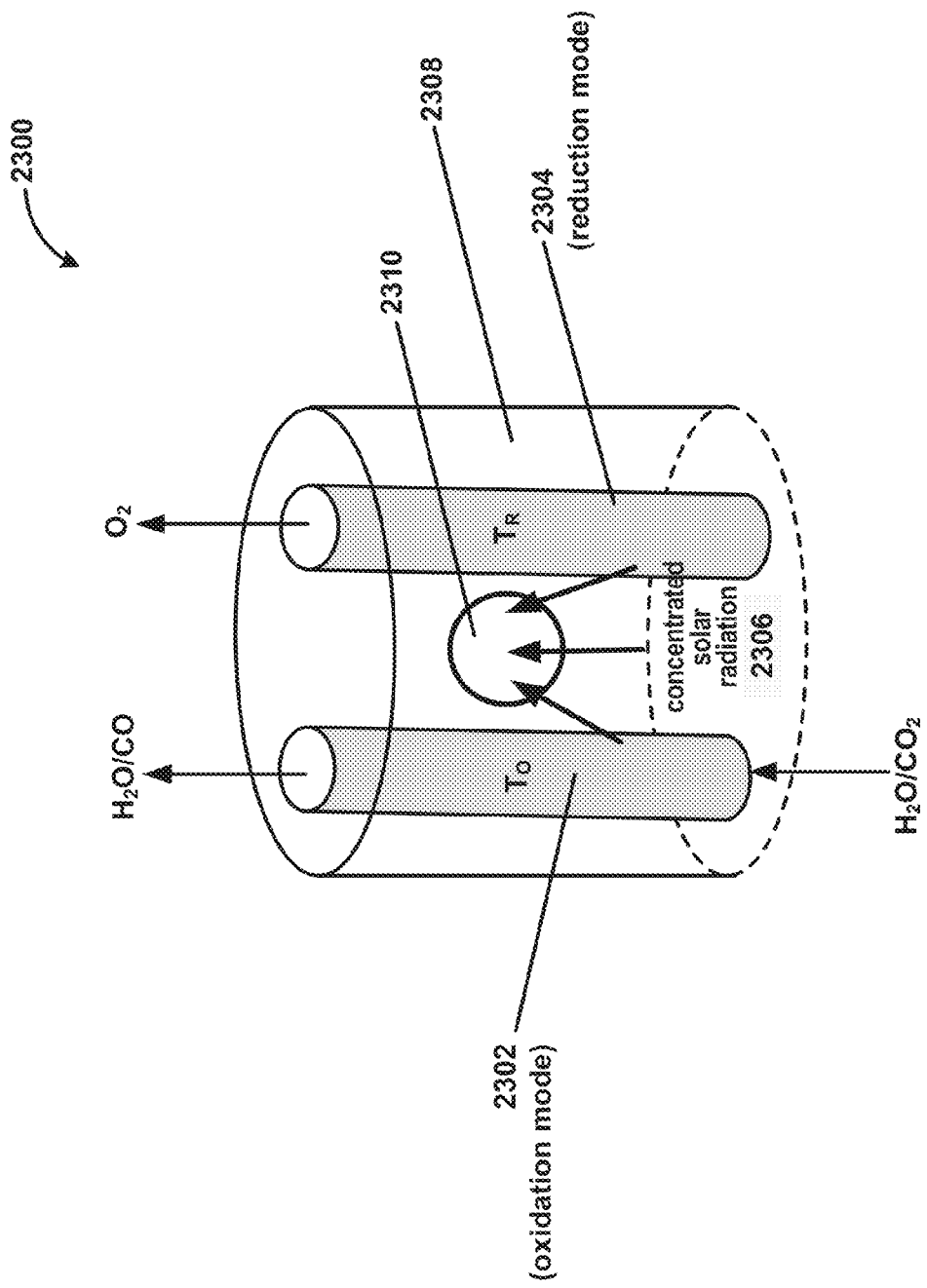
Figure 24:
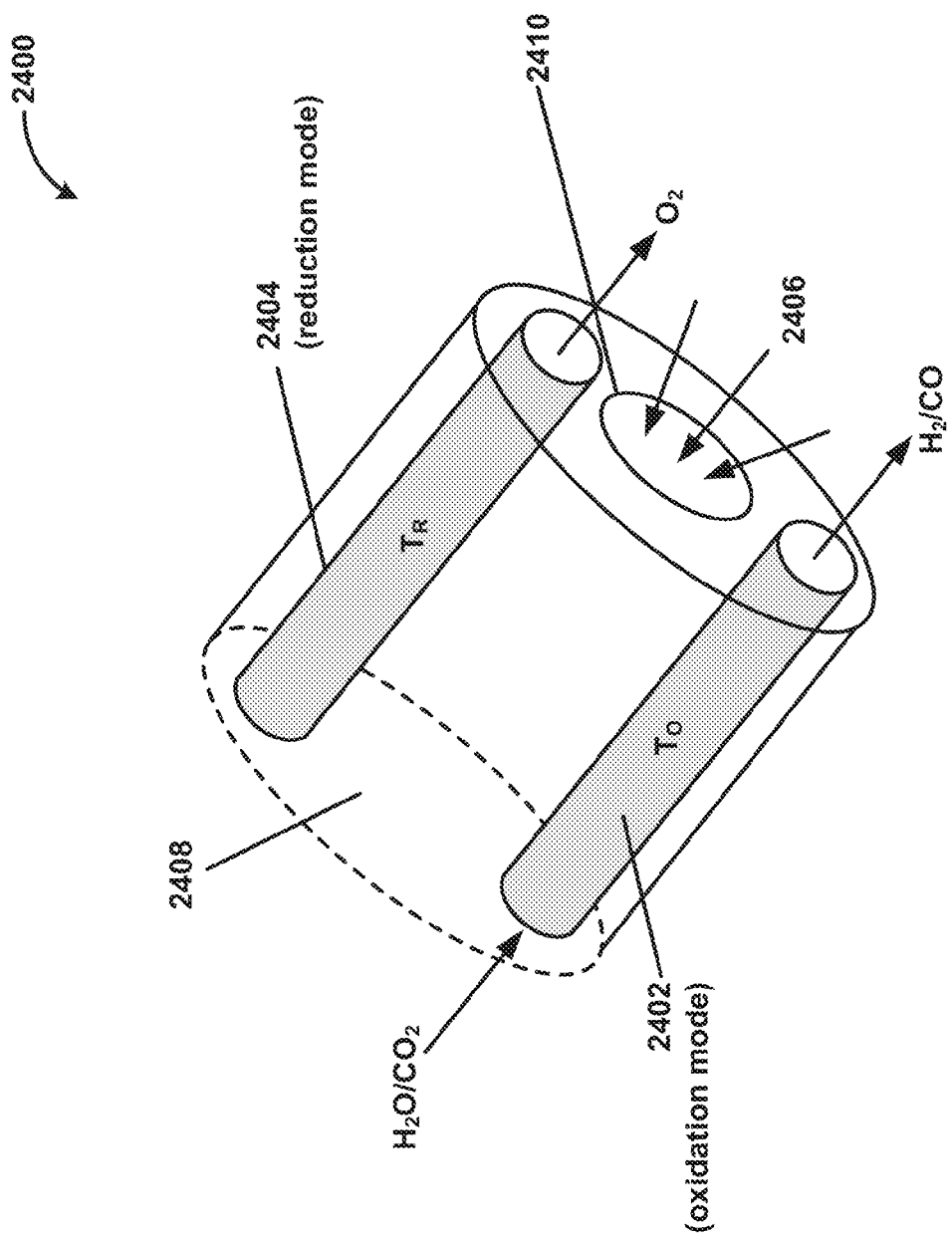
Figure 25:
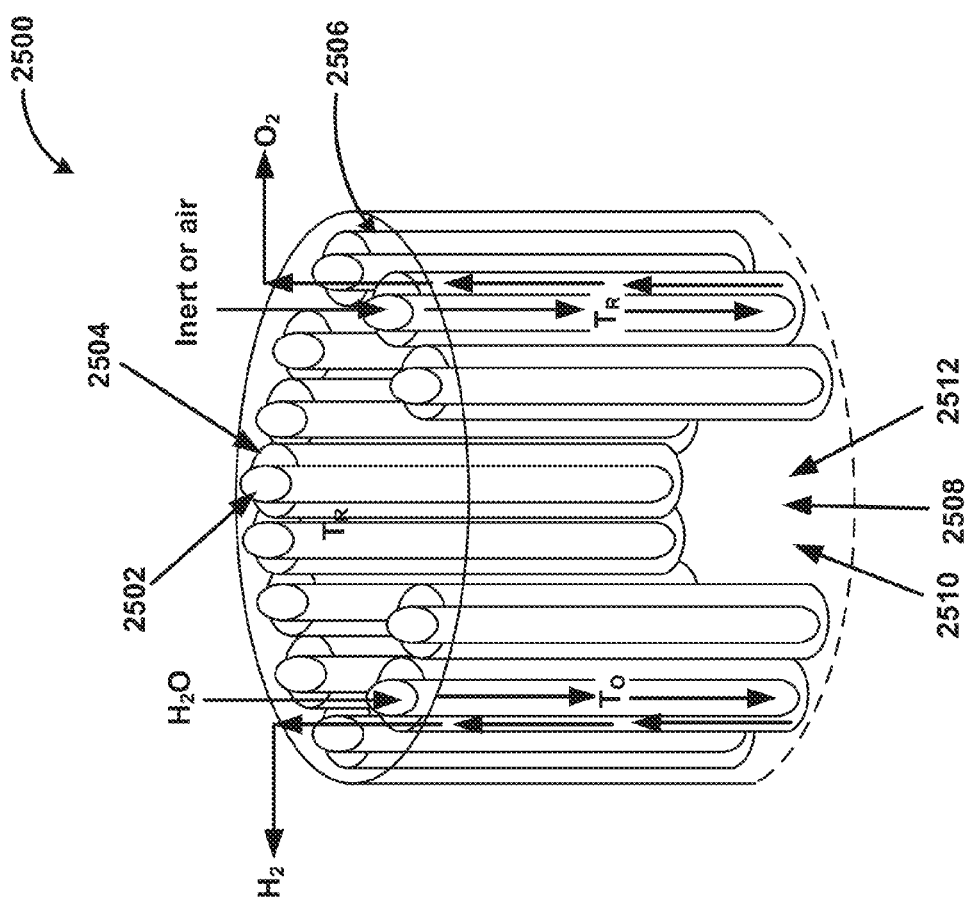
Figure 26:
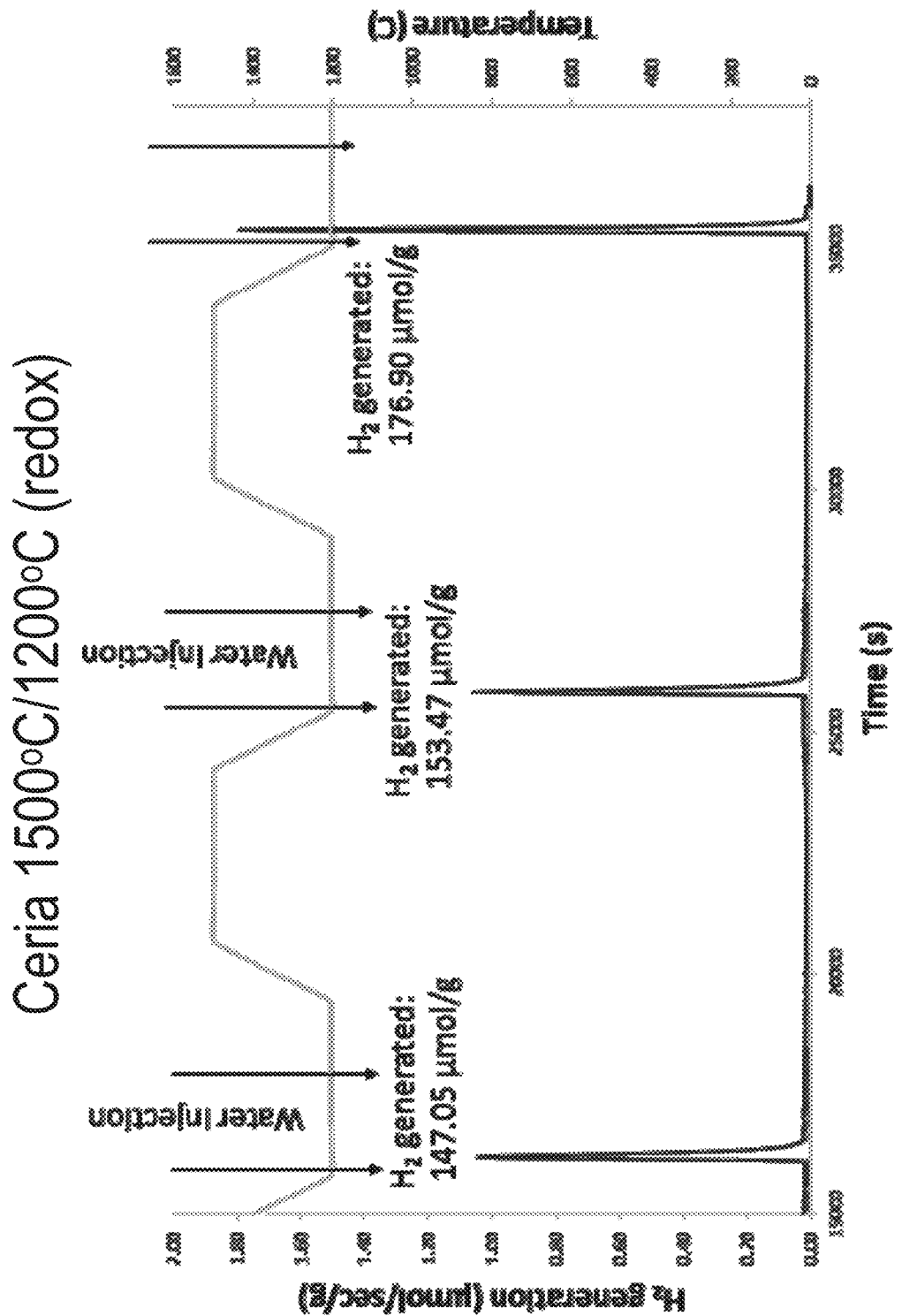
Figure 27:
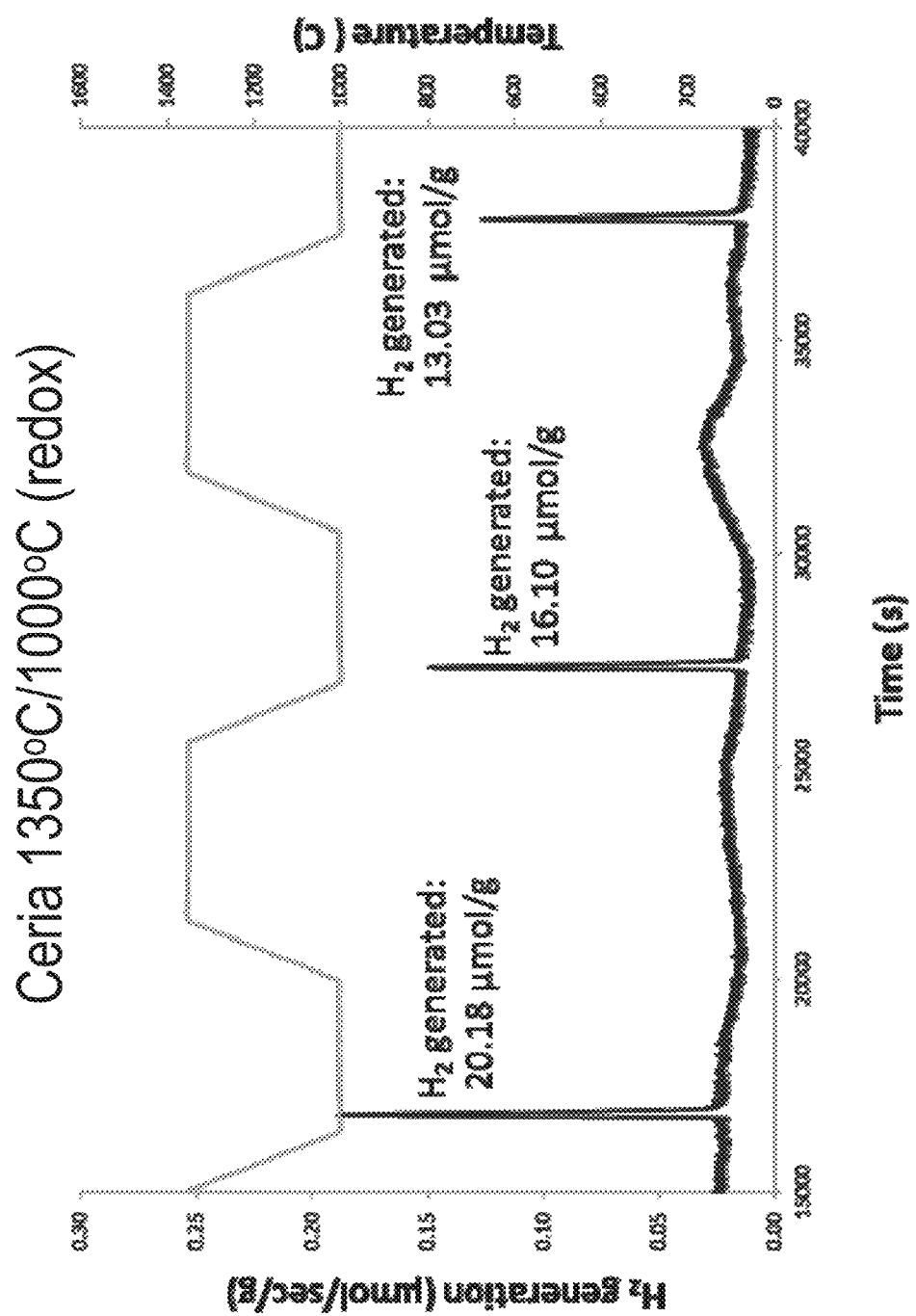
Figure 28:
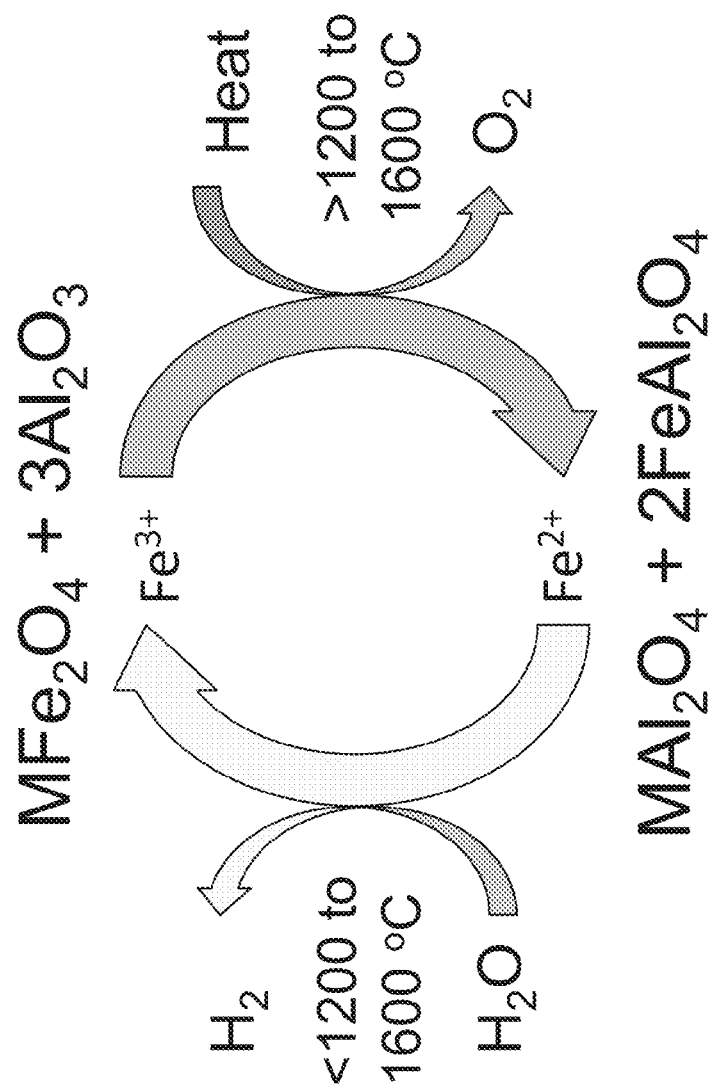
Figure 29:
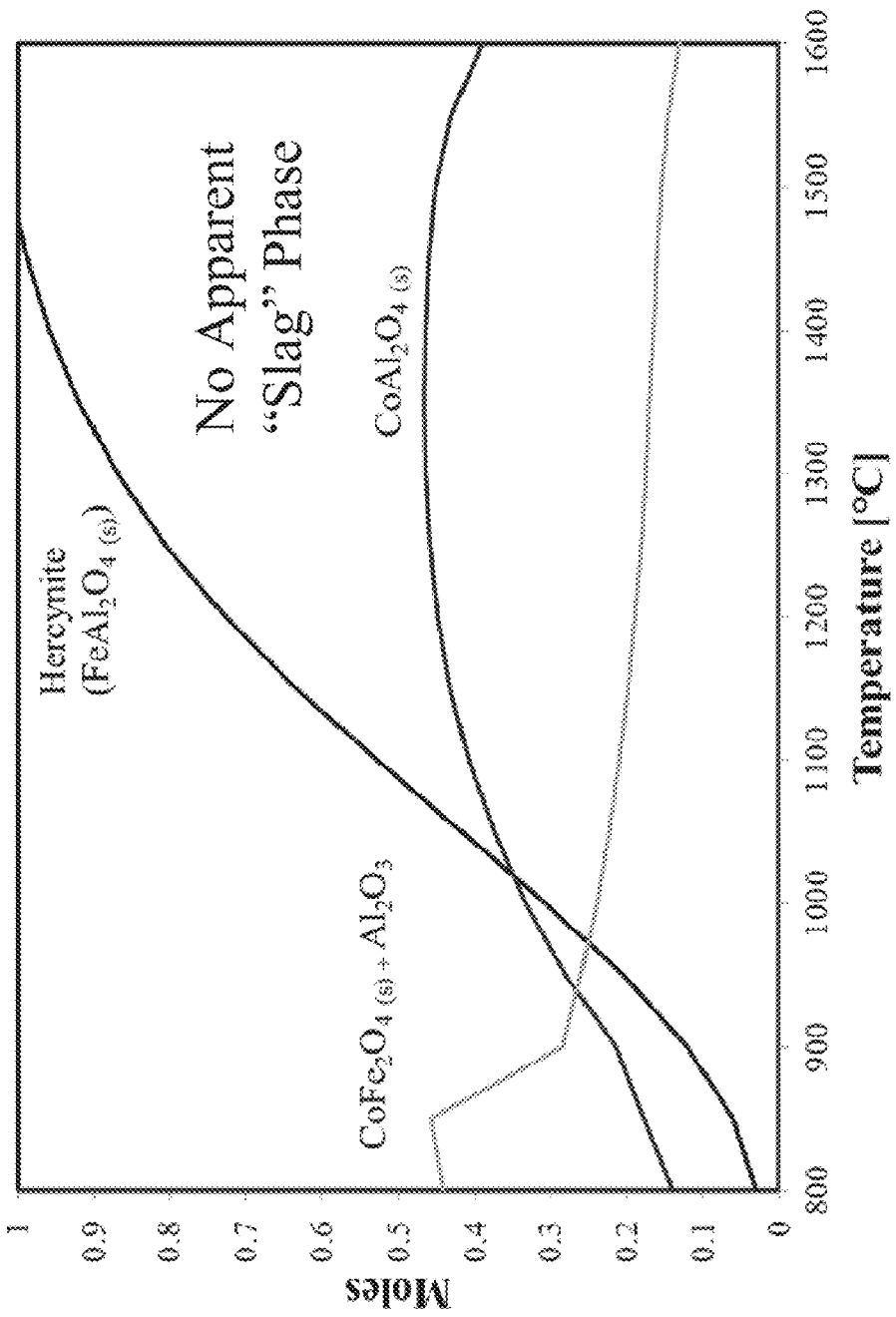
Figure 30:
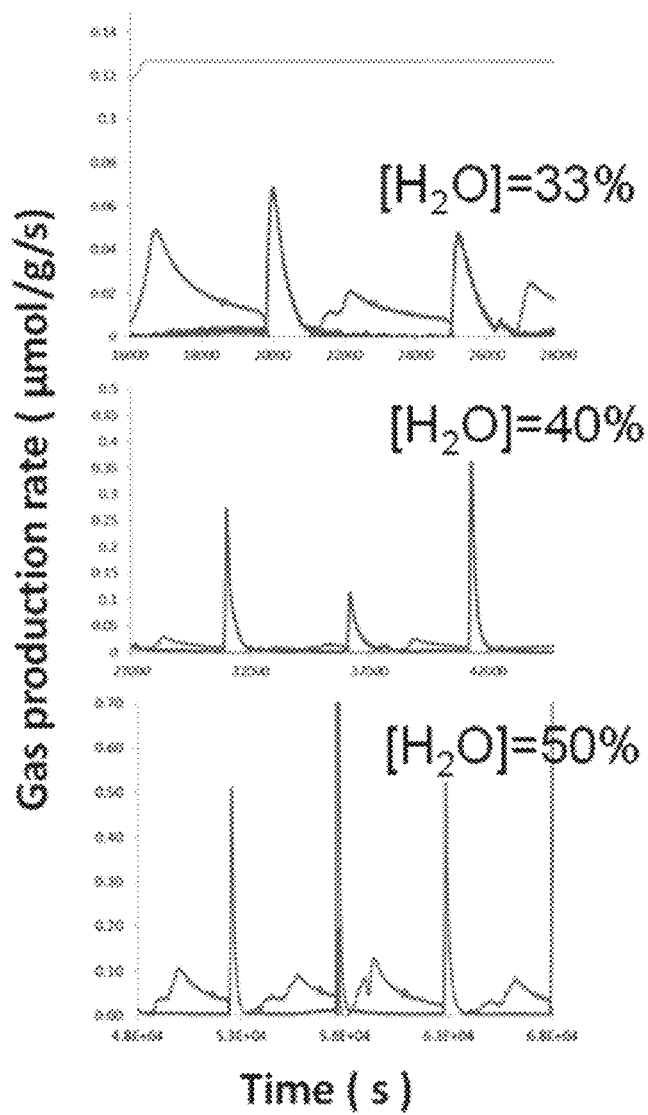
Figure 31:
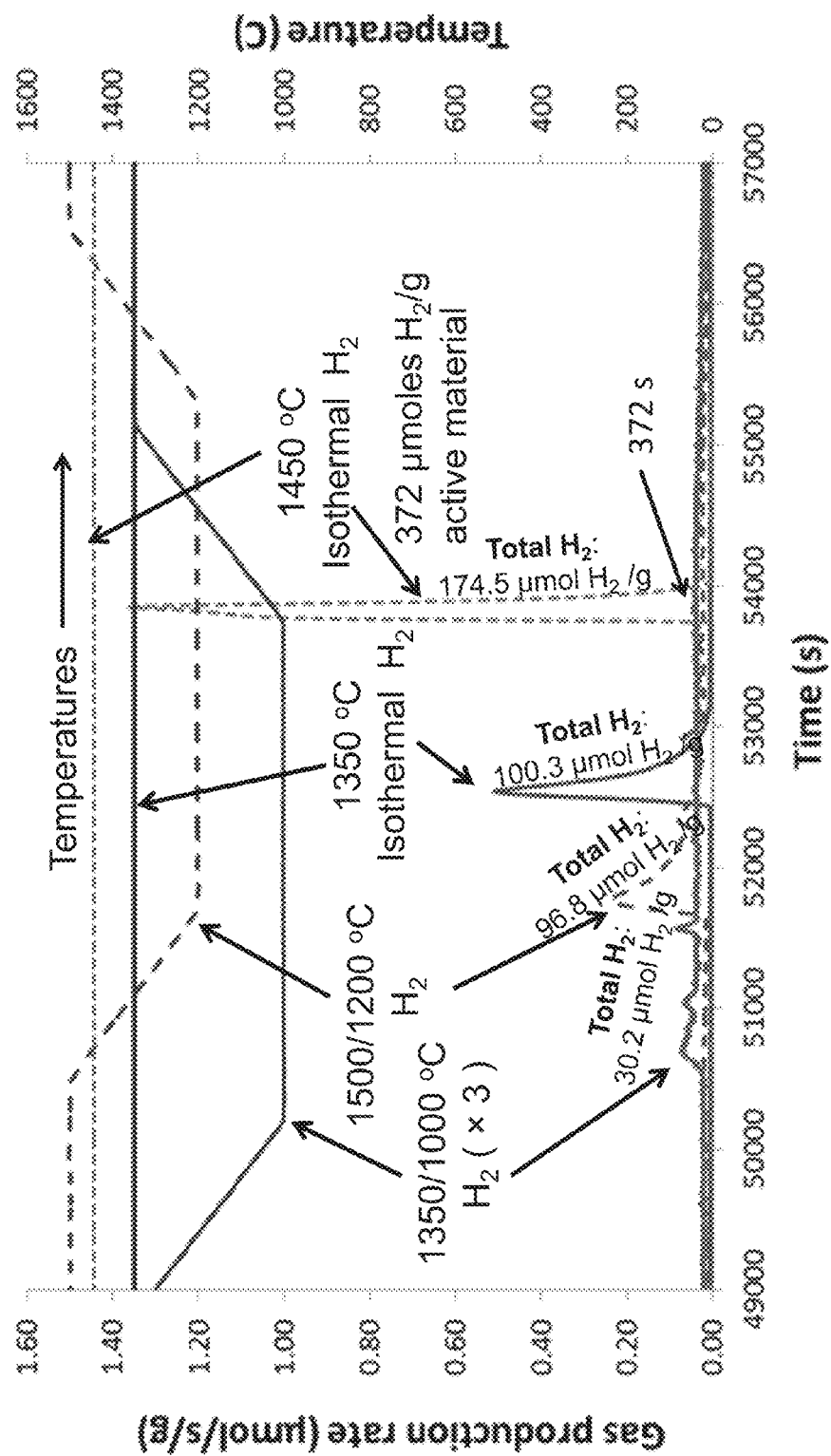
Figure 32:
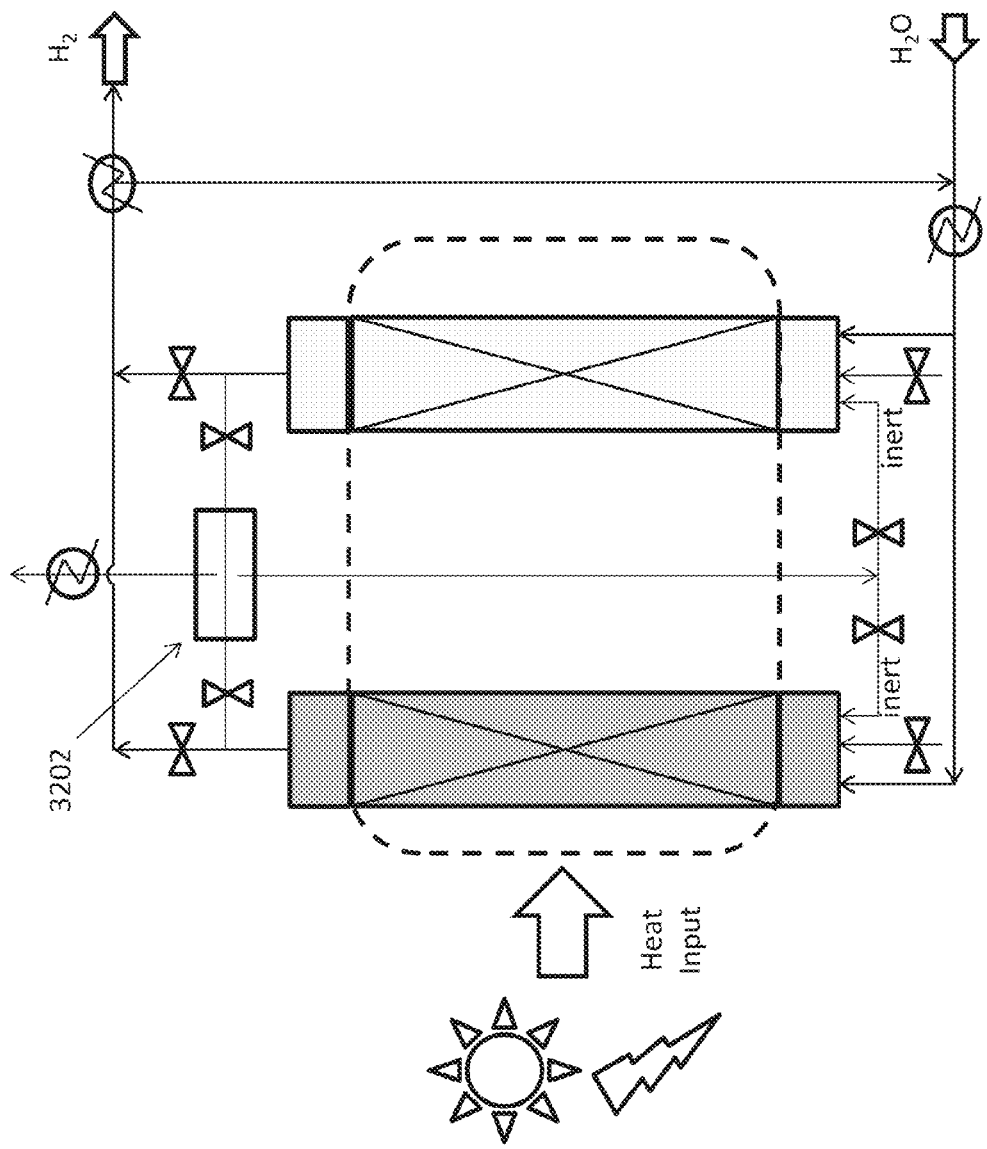
Figure 33:
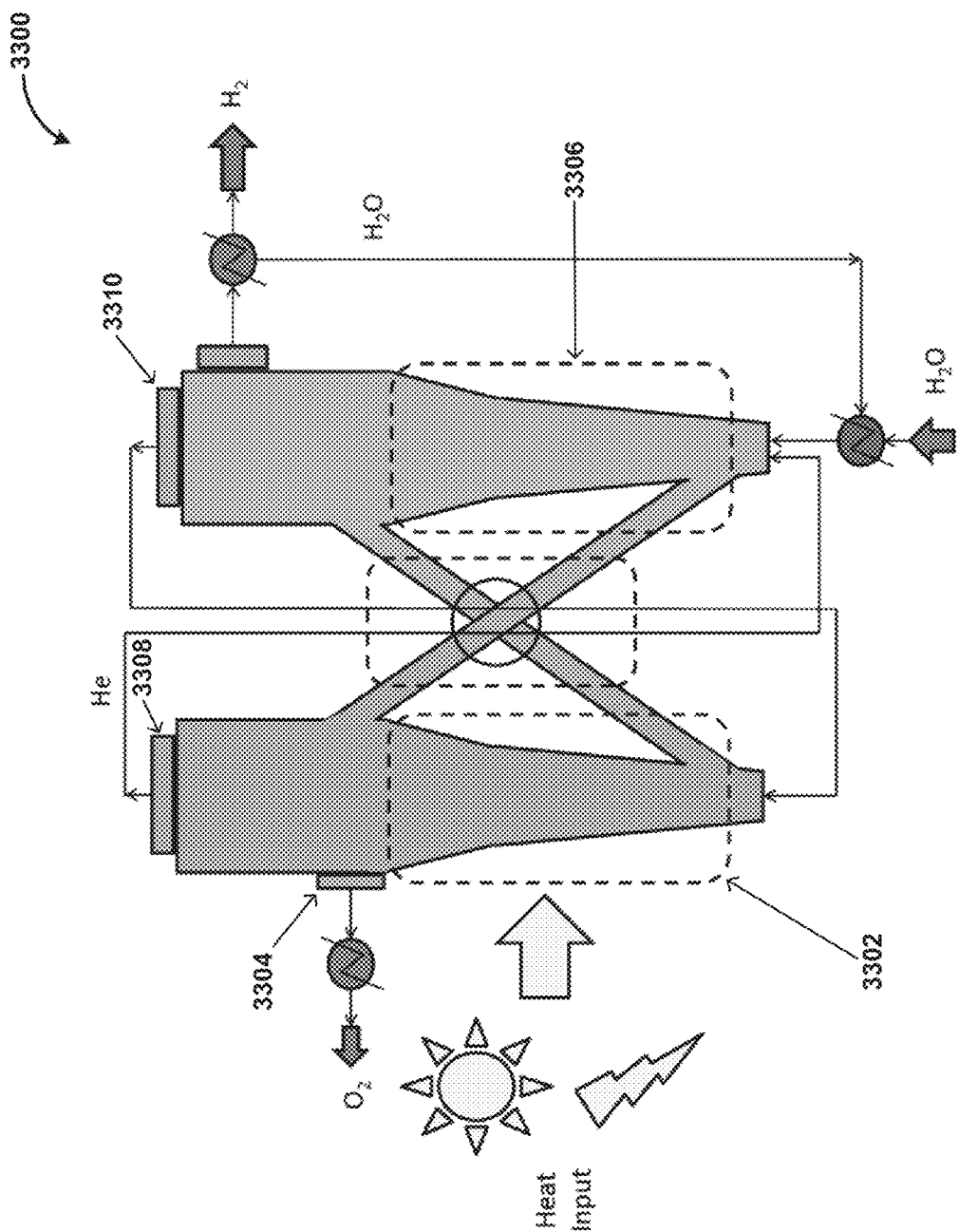

FIGS. 23-25 illustrated exemplary solar thermal reactors for use in accordance with exemplary embodiments of the disclosure;

FIGS. 26 and 27 illustrate a ceria temperature swing process;

FIG. 28 illustrates a hercynite cycle;

FIG. 29 illustrates lag of a slag phase in a hercynite cycle;

FIG. 30 illustrates a hercynite isothermal process at 1350° C. at different $H_2O$ concentrations;

FIG. 31 illustrates $H_2$ productions from isothermal and temperature swing processes;

FIG. 32 illustrates a solar reactors in accordance with additional exemplary embodiments of the disclosure; and FIG. 33 illustrates a particle flow reactor in accordance with yet additional exemplary embodiments of the disclosure.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS OF THE INVENTION

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The present disclosure provides an improved method and an apparatus for splitting gas-phase reactants using redox reactions under substantially isothermal conditions and/or using a solar reactor system. As set forth in more detail below, the method and apparatus include an active redox material (e.g., high surface area material selected from the group consisting of one or more of: ceria, M-ferrite and hercynite material) to facilitate splitting of the gas phase reactant.

Metal oxides suitable for use with the invention include mixed metal oxides which include more than one metal, such as mixed metal ferrites. As used herein, mixed metal ferrites include compounds of iron oxide with oxides of other transition metals. Exemplary ferrite materials suitable for use with various embodiments have decomposition temperatures less than that of iron oxide. M-ferrites may be described by the chemical formula $M_xFe_{3-x}O_4$, wherein M is one or more metals. In an embodiment, M may be Ni, Co, Ce or a combination thereof.

For example, M-ferrite materials include iron oxides with Ni(II), Co(II), or Mn(II) inclusions, such as $MnFe_2O_4$, $NiFe_xO_4$, $Ni_{0.5}Mn_{0.5}Fe_2O_4$ and $Co_{0.5}Mn_{0.5}Fe_2O_4$. High temperature dissociation of such oxides can produce an activated, oxygen deficient form, such as $Ni_{0.5}Mn_{0.5}Fe_2O_{(4-delta)}$. This activated form can be combined with water at relatively low temperatures to yield hydrogen and the original mixed metal oxide. In another embodiment, the metal oxide is a ferrite spinel material ($MFe_2O_4$; M=Co, Ni), which can be thermally reduced using, e.g., concentrated sunlight and/or other heat source, to release $O_2$ and the reduced ferrite then subsequently oxidized (redox cycle) with steam producing $H_2$[9-10], recovering the original spinel structure in the process.

The metal oxide material may be a ferrite spinel material on an alumina ($Al_2O_3$) support and the redox cycle may take place through a hercynite (FeAl2O4) pathway (reduction: $MFe_2O_4+3Al_2O_3+$(e.g., solar or other energy)$\rightarrow MAl_2O_4+2FeAl_2O_4+0.5O_2$; oxidation: $MAl_2O_4+2FeAl_2O_4+H_2O \rightarrow MFe_2O_4+3Al_2O_3+H_2$). Cobalt ferrites deposited on alumina substrates via atomic layer deposition are capable of being reduced at lower temperatures than $CoFe_2O_4$ due to a reaction between the ferrite and substrate to form $2FeAl_2O_4$ [12]. Cerium and/or aluminum may also be present as a solid solution component. For example, $CeO_2$ may be present as a constituent of a mixed metal oxide, i.e. $(1-y)CeO_{2-y}M_xFe_{3-x}O_4$ with the ferrite (M=Co, Ni). Similarly, $Al_2O_3$ may be present as a constituent of the mixed metal oxide. $(1-y)Al_2O_{3-y}M_xFe_{3-x}O_4$ with the ferrite (M=Co, Ni).

The metal oxide and reduced metal oxide may be in the form of a continuous or discontinuous film supported on a solid or porous substrate. A thickness of the film may range from, for example, 1 to 100 nm. Nano-thick films of active materials can allow for significantly reduced diffusional effects and for rapid radiation heat transfer to drive fast cycling. The film may be deposited on a support prior to placement of the support within the reactor tube assembly or the film may be deposited in situ. The films may be deposited by vapor deposition, including chemical vapor deposition techniques. In an embodiment, the film is deposited by atomic layer deposition. High surface area active ferrite materials ($M_xFe_{3-x}$, $O_4$; M=Co, Ni) can be synthesized using atomic layer deposition (ALD) to deposit nanometer thick films onto nanosized particles [24-27] or onto a high surface area porous ceramic substrate [28-39]. Such ALD has been carried out to produce ferrite films on nanoparticles [12, 40]. For Particle ALD, nanoparticle substrates can be placed in fluidized bed reactors and coated with $Fe_2O_3$, CoO, and NiO thin films using self-limiting surface chemistry via metallocene [$(C_5H_5)_2M$; M=Fe, Co, Ni] and $O_2$ precursors. $CeO_2$ can be deposited by ALD [45-47] in alternating layers with $MO_x$/$Fe_2O_3$ (producing $M_xFe_{3-x}O_4$ [12, 40]) onto a high surface area substrate such as $ZrO_2$ and/or $Al_2O_3$.

The ALD deposition process typically takes place at sub-ambient pressures. Each reactant may be introduced sequentially into the reaction zone in a sequence of dosing steps, typically together with an inert carrier gas. Before the next reactant is introduced, the reaction by-products and unreached reagents are removed in a purging step. This can be done, for example, by subjecting the substrate to a high vacuum, such as about 10-5 torr or lower, after each reaction step. Another method of accomplishing this, which is more readily applicable for industrial application, is to sweep the substrate with an inert purge gas between the reaction steps. This purge gas can also act as a carrier for the reagents. The next reactant is then introduced, where it reacts at the surface of the substrate. By removing excess reagents and reaction by-products, as before, the reaction sequence can be repeated as needed to build inorganic deposits of the desired size or thickness.

For deposition into a porous substrate with the ALD process, the dose time for a given reactant is selected to be sufficiently long to allow the desired extent of penetration of the reactant into the pores. Similarly, the purge time is selected to be sufficiently long to allow removal of excess reactant.

General methods for conducting ALD processes are described, for example, in J. W. Klaus et al, "Atomic Layer Controlled Growth of SiO2 Films Using Binary Reaction Sequence Chemistry", and Appl. Phys. Let. 70, 1092 (1997) and O. Shah et al., "Atomic Layer Growth of SiO2 on Si (100) and H2O using a Binary Reaction Sequence", Surface Science 334, 135 (1995).

Isothermal Techniques
Specific Examples

The following non-limiting examples illustrate an exemplary method and system in accordance with various embodiments of the disclosure. These examples are merely illustrative, and it is not intended that the invention be limited to the examples. Systems in accordance with the present invention may include the compounds and materials listed below as well as additional and/or alternative materials, and various system components described below may be interchanged with similar components described in connection with other systems.

Figure 1:
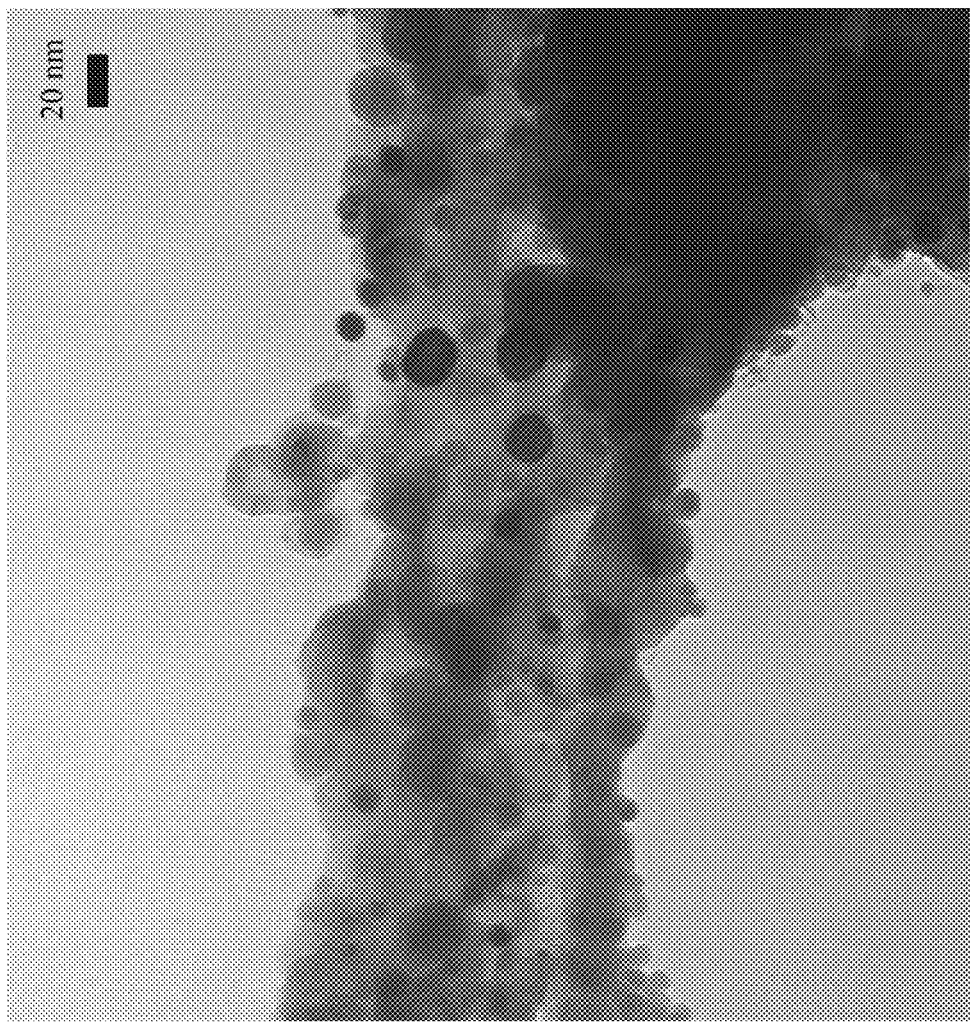
FIG. 1 illustrates a high surface area active redox material suitable for use in accordance with exemplary embodiments.

Preparation of High Surface Area Active Redox Material
Preparation of Hercynite Cycle Active Materials as Films Large, high surface area, large pore size with interconnected pore poly(styrene-divinylbenzene; PS-DVB) polymer particles (Cavilink™, ~600 μm, 43.5 m$^2$/g) have been coated via atomic layer deposition (ALD) with 50 layers of alumina resulting in a 15 nm alumina film. A fluidized bed reactor was used to apply all of the coatings, with precursors introduced through heated bubblers. The alumina layers were applied using alternating doses of tri-methyl-aluminum and deionized water. The particles were then heated to 800° C. in air to burn out the polymer substrate. The substrates were then coated with alternating layers of $Fe_2O_3$ and CoO using ferrocene [6] and cobaltocene (99% purity, Alfa Aesar®) precursors with pure $O_2$ as the oxidizer and in situ gas monitoring via mass spectrometry. Coatings were conducted at 450° C., and a reduced pressure of approximately 100 Torr. The first half of the two layer coating cycle consisted of; a 360 s ferrocene dose, a 900 s nitrogen purge, and 90 s vacuum purge, followed by a 480 s oxygen dose, a 900 s nitrogen purge, and a 90 s vacuum purge. The second half of the coating cycle was similar except a 480 s cobaltocene dose was used. Materials were characterized using transmission electron microscopy (TEM) and induced coupled plasma atomic emission spectroscopy (ICP-AES). Surface area and pore volume were measured using a Micromeritic Gemini 5 Brunauer-Emmett-Teller (BET) surface area analyzer. ICP results show metal oxide loadings up to 27 mol % on the porous alumina substrate. A Co to Fe ratio of 0.5 was produced which resulted in the desired stoichiometry of $CoFe_2O_4$ deposited on the thin-walled alumina TEM images of the particles after calcination at 800° C. are illustrated in FIG. 1. The metal oxide coating appears to have formed islands on the substrate. This $CoFe_2O_4/Al_2O_3$ active material was used in subsequent redox testing of the hercynite cycle.

It is also possible to obtain $CoFe_2O_4/Al_2O_3$ active materials by sol-gel processing, incipient wetness deposition onto support materials (such as alumina, zirconia or other similar supports) or simply ball milling starting oxides, however, the active materials may not be as reactive as those prepared using thin-film ALD methods. It is also possible to use chemical vapor deposition (CVD) to deposit M-ferrite on existing substrates, including particles (e.g., nano-sized alumina particles), pellets and highly porous monolithic substrates such as those used for catalytic converter materials. Nano-sized particles may range from about 10-1000 nm or about 20-500 nm.

$Fe_2O_3$ Iron Nanopowder
<50 nanometer iron oxide powders ($Fe_2O_3$) were obtained from Sigma-Aldrich for comparative testing.

Ceria Starting Powder
Ceria ($CeO_2$) powder was obtained from Alfa Aesar, 99.9% REO 5 micron powder (Lot # H06WO17, stock #11328) and used as received.

Standard Non-isothermal Hercynite Cycle Redox Using a Stagnation Flow Reactor and Comparison with Iron Oxide Nanopowder Sample redox performance was characterized using a stagnation flow reactor, which provides uniform gas composition to the entire sample. A comparison was made between the water splitting performance of the ALD coated particles and $Fe_2O_3$ nanoparticles (<50 nm Sigma-Aldrich), as a baseline. The low temperature oxidation step was conducted at 1100° C. and the high temperature reduction step occurred at 1400° C. Reactor pressure was held a 150 Torr during experimentation. Helium was flowed at a rate of 5 sccm during reduction and 150 sccm He/100 sccm steam during oxidation. Steam flow rate was controlled by a syringe pump that fed into a pressure controlled heated steam generator. Excess steam was scrubbed from the product stream via a liquid nitrogen cryogenic trap, followed by a desiccant column. The product stream was then analyzed using a Stanford Research QMS200 mass spectrometer with a capillary sampling port. Thermal cycling was achieved by heating at a rate of 15° C./min to the reduction temperature, holding for 50 min, then cooling to the oxidation temperature and introducing steam for 25 min then purging with inert for 20 min, before repeating for 5 cycles.

Figure 2:
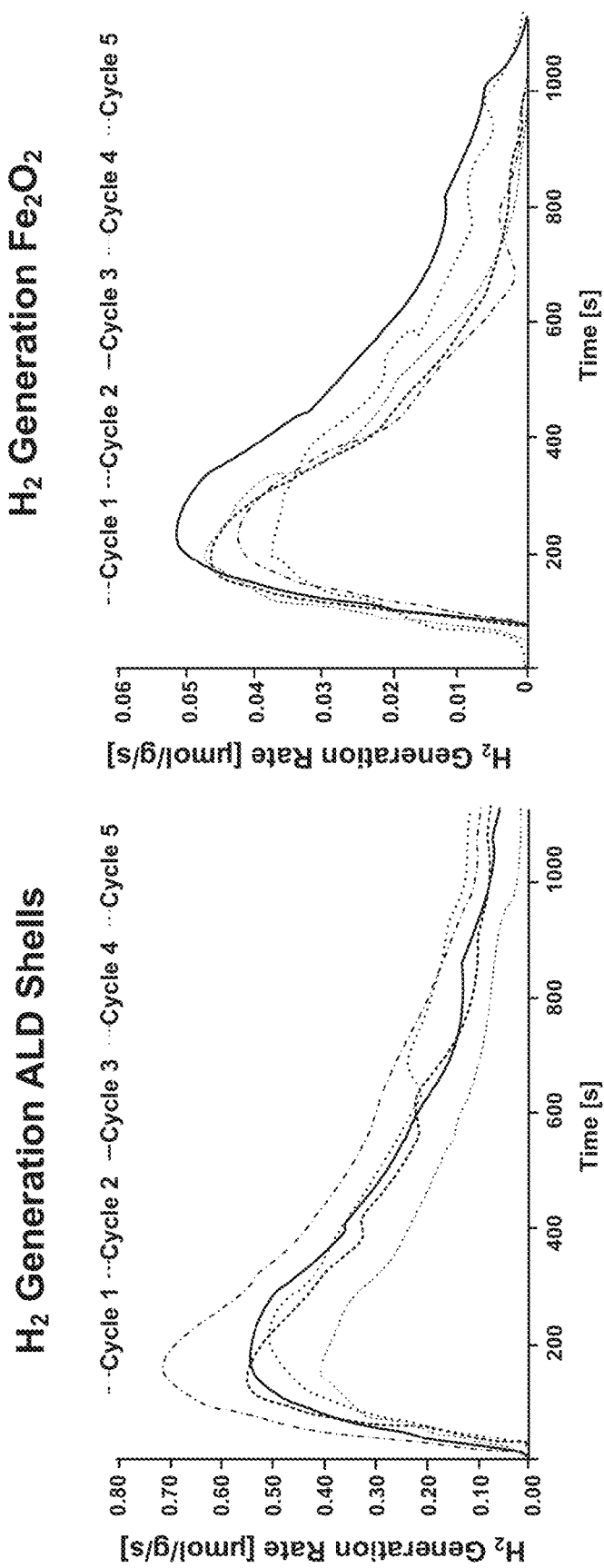
FIGS. 2 and 5-19 illustrate performance of system and methods in accordance with exemplary embodiments.

Hydrogen production during 5 cycles in the stagnation flow reactor is illustrated in FIG. 2. The graphs show hydrogen production from the ALD prepared hercynite cycle powders and the $Fe_2O_3$ nanopowder. The ALD powders (hercynite cycle) showed a 10× increase in the peak hydrogen production rates and integrated hydrogen produced on a per mass basis (total mass, active and inert substrate materials). Evaluation of the integrated hydrogen and oxygen production values during redox confirms a 2:1 stoichiometric ratio for splitting water which completes the mass balance for both samples. This example demonstrates the high productivity of the thin film M-ferrite/alumina (hercynite cycle) materials relative to iron oxide.

Standard Non-Isothermal Hercynite Cycle Redox Using a Solar Heated Receiver/Reactor FIG. 28 illustrates a redox cycle for hercynite material. As illustrated, the hercynite cycle forms two stable compounds, which is more thermodynamically favorable that solid solution formation, such as a ceria cycle. FIG. 29 illustrates that there is no slag in the hercynite redox cycle. The hercynite process is thought to include a third phase—the surface of the material. By altering pressure of the reactants, the free energy of the system can become more favorable. Thus, higher reactant concentrations generally lead to higher product output.

Testing was also conducted regarding the cyclability and robustness of the ALD coated mixed metal oxide particles at the National Renewable Energy Laboratory's (NREL) High Flux Solar Furnace (HFSF) [7]. Cycling was performed in a concentrating solar cavity reactor prototype, which was installed at the focal point of the NREL solar furnace.

Figure 3:
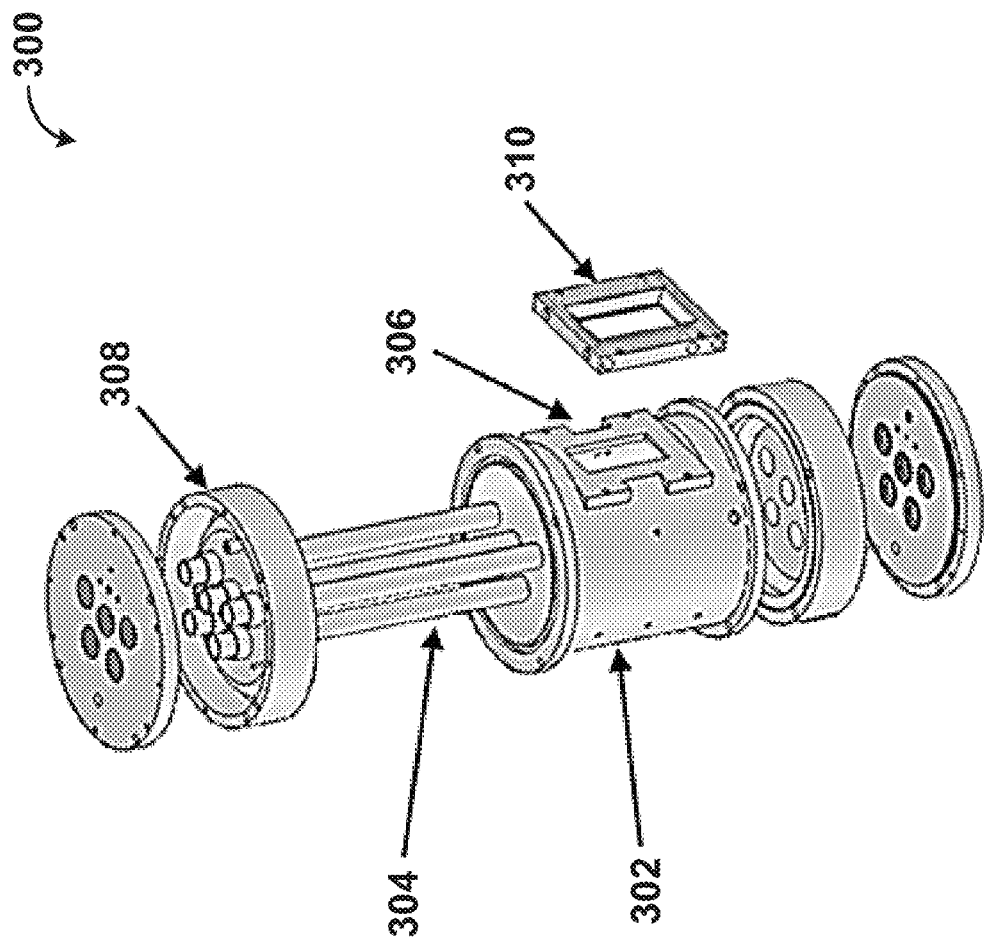
FIGS. 3 and 4 illustrate multi-tube reactors in accordance with exemplary embodiments.

An exemplary reactor 300 including a cooled reflective cavity 302 with 5 reaction tubes 304 arranged to intercept concentrated sunlight entering through a windowed opening 306 is illustrated in FIG. 3. The exemplary reactor also includes a cooling chamber and a cooling plate 310 and has a 10 kW maximum heating capacity and the concentration factor of the light entering the cavity after the secondary concentrator is ~2500 suns. This system has undergone testing and operational validation with various high temperature thermo-chemical reactions.

Solar experiments were conducted to measure the production of $H_2$ and CO using the high surface area ALD particles with a concentrated solar heating source and compare them to a bulk $Fe_2O_3$ nanopowder. A $2^2$ factorial design was used with redox material composition (bulk $Fe_2O_3$ nanopowder and ALD $CoFe_2O_4$ on $Al_2O_3$ skeletal support; hercynite cycle) and reduction gas ($H_2O$ and $CO_2$) as the factors. Control runs were conducted without redox material to ensure no reaction between the reduction gasses and the reactor materials under cycling conditions. An inert zirconia felt (Zircar, ZYF) was used to separate the absorber tube wall from the reactive particles. Central, e.g., SiC, tube 304 of the reactor was converted into a packed bed by placing a screen at the bottom of the tube and filling the space up to the focal point with large (1 mm) alumina particles.

Figure 4:
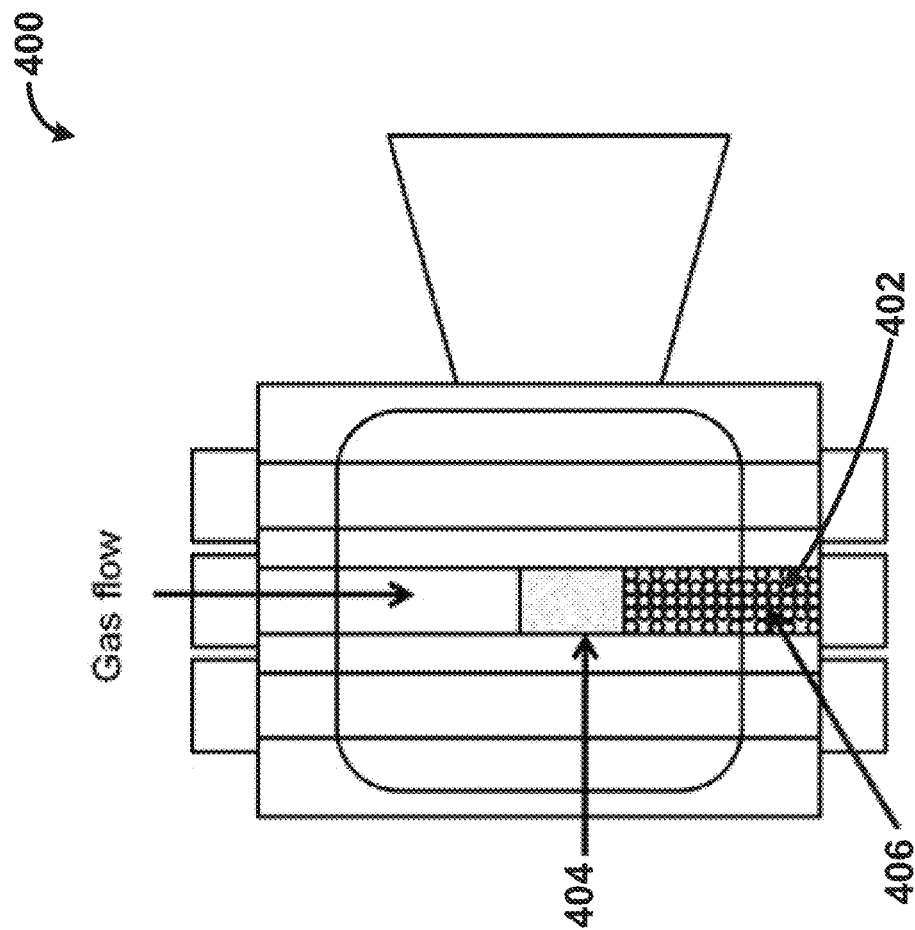

FIG. 4 illustrates a schematic view of an experimental system 400 used. A full bed 402 was not used because bulk $Fe_2O_3$ powder 404 over inert material 406 would not allow gas flow after a height of ~2 in. ALD coated skeletal materials 404 produced much less of a pressure drop but a similar amount was used to prevent axial differences in temperatures between the two powders. For these particular examples, the remaining 4 tubes in the system weren't filled with redox material due to limited quantities of the ALD skeletal active material powder at the time. However, the surrounding tubes were installed to mimic the radiative heat transfer that would occur during full capacity operation. The reactor temperature was monitored using a Heitronics KT-19.01 solar blind pyrometer, calibrated using a type B thermocouple. Incoming power was attenuated using a cooled shutter that was automatically controlled to maintain consistent power set points. Test samples were heated at ~50° C./min to 1350° C. for reduction and held for 10 min, then cooled down to 1100° C. for the oxidation step and held for 10 min. An inert helium environment was maintained during reduction at a flow rate of 750 sccm. During the oxidation step, reactive gasses were flowed for 5 min, then inert gas was flowed for 5 min to purge the system. During reactive gas flow, the helium was reduced to 500 sccm and 250 sccm of $H_2O$ or $CO_2$ was flowed. $H_2O$ was introduced using a syringe pump with a capillary, which injected water into the gas stream at a high temperature location. This redox cycling was carried out at above atmospheric pressure, ~1120 Torr. Products were analyzed using a Stanford Research QMS 200 mass spectrometer, a California Analytical Instruments Model 600 NDIR for CO and $CO_2$, and an AMI 201 oxygen analyzer. During $H_2O$ splitting, a cold trap and a desiccant column were used to scrub any excess water out of the product stream. Each test was conducted for 5 cycles to observe any production degradation.

Figure 5:
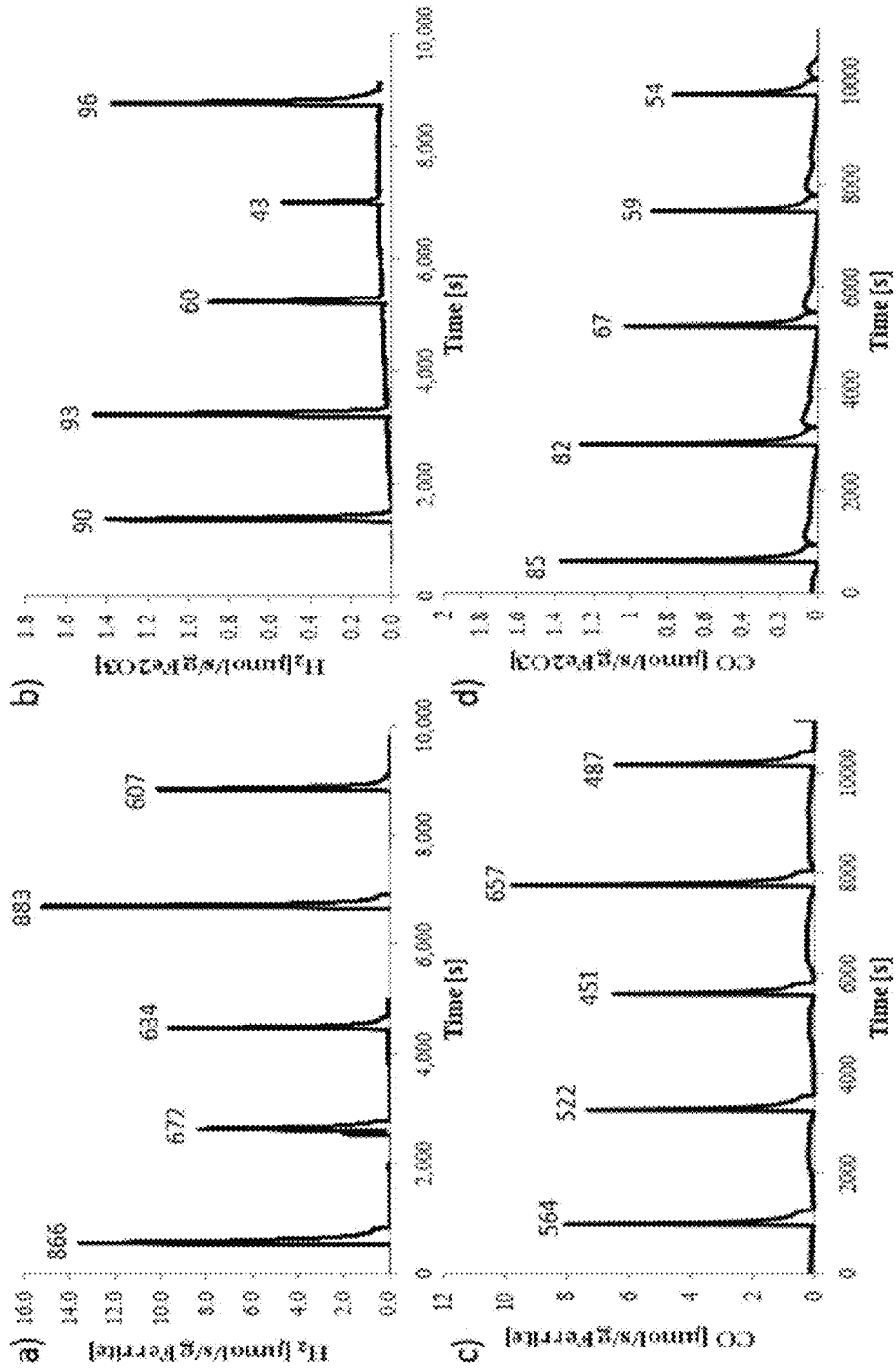

Testing on-sun at the HFSF produced similar results for $H_2$ and CO production compared to the stagnation flow testing. FIG. 5 illustrates the production of $H_2$ and CO over 5 cycles for the ALD $CoFe_2O_4/Al_2O_3$ skeletal active material and the $Fe_2O_3$ powder. The ALD $CoFe_2O_4/Al_2O_3$ skeletal active material again showed a 9× increase in production and better stability as compared to the $Fe_2O_3$ powder. The ALD hercynite cycle materials were capable of producing a maximum per cycle fuel value of 250 J/g as compared to 27 J/g for the $Fe_2O_3$ powder.

In comparing hydrogen productivity at elevated pressure using the HFSF (~1120 Torr), FIG. 5a, vs. operation at 150 Torr for the stagnation flow reactor (FIG. 2a), it is shown that increased pressure operation results in a hydrogen production rate (micromoles/s/g) that is much faster by about 10× when operating at above atmospheric pressure vs. subatmospheric pressure.

These experiments demonstrate that higher $H_2O$ pressure (FIG. 5a) oxidation results in faster hercynite cycle $H_2$ production rates compared to operations at lower pressure (FIG. 2a).

Ceria-Based Redox Cycling Using a Laser-Assisted Stagnation Flow Reactor

Figure 6:
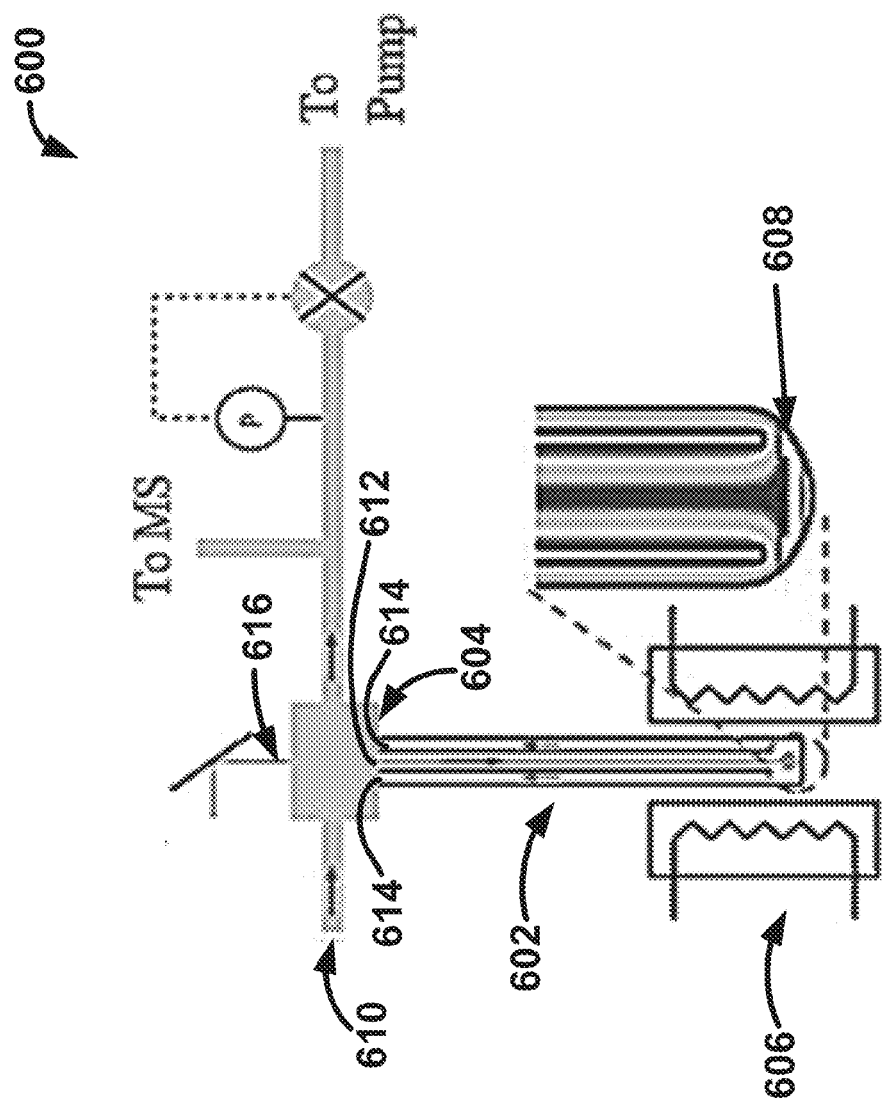

Laser-Assisted Stagnation Flow Reactor $CeO_2$ was thermochemically cycled with both $CO_2$ and $H_2O$ in the stagnation flow reactor (SFR) 600, illustrated in FIG. 6. Reactor system 600 includes a concentric alumina tube reactor configuration 602, stainless steel gas handling manifold 604, Carbolite STF16/180 high temperature SiC furnace 606, which are coupled to a modulated effusive beam mass spectrometer. The sample was placed on a $ZrO_2$ sample holder (Zircar Zirconia) 608 at the bottom of the outer round bottom alumina tube (McDanel Advanced Ceramics Technology). Incoming gasses flow through an inlet 610, through an inner alumina tube 612, turn 180°, and through an annular space 614 between the inner and outer alumina tubes to the mass spectrometer detector and out of the reactor chamber. During the oxidation step, $H_2O/CO_2$ was trapped by a liquid nitrogen trap before the effluent was sampled by the mass spectrometer.

To thermally reduce the sample, the material was irradiated with a NIR single fiber-coupled laser diode (Apollo Instruments model F500-NIR600). The laser was directed into the reaction chamber via a fiber optic line 616, through a quartz window at the top of the reactor tube. Controlling the power of the laser controls the heating rate and the final temperature. A single color pyrometer reads the local temperature of the sample.

Modulated Beam Mass Spectrometer

The product gasses were sampled by the Extrell C50, 500 amu modulated effusive beam mass spectrometer. A molecular beam is formed from the sampled gas by flowing through three different pumping stages. The beam is modulated by a resonant modulator at 200 Hz as it enters the second pumping stage and is ionized by electron impact at 30 eV. The modulated ion current from the electron multiplier is then passed through a lock-in amplifier to discriminate against DC background. This improved detector sensitivity and digital ion filtering of ions that persist in the ionization volume (a significant problem when using $H_2O$ vapor and producing $H_2$), in turn leads to real-time baseline correction and a higher degree of precision. A mixture of 5% $H_2$/and 5% CO in 90% Helium and 50% $O_2$/Helium is used to calibrate the mass spectrometer signal. A four point calibration on $H_2$, CO, and $O_2$ signal is performed daily.

High Temperature Thermochemical Cycling

In a typical redox experiment, the material is preheated with the SiC furnace to a desired temperature where oxidation is performed. To thermally reduce the material, the NIR laser is turned on to heat the material locally to achieve the thermal reduction temperature. Once thermal reduction is completed, the laser is turned off; the sample temperature is allowed to equilibrate to the furnace temperature. The reduced sample is then oxidized by flowing a mixture of steam/helium or $CO_2$/helium for a period of time. The pressure of the reactor system is feedback controlled between 1-760 torr. Helium is used as inert carrier gas. High purity 50% $CO_2$ in Helium was used to deliver $CO_2$. RASIRC Rainmaker Humidification System (RHS) was used to deliver steam into the system. Filtered D.I. water was fed into the RHS via a non-porous membrane that filtered particles, micro-droplets, volatile gasses, and reduced concentration of dissolved oxygen. Helium was used as the steam gas carrier as well.

In a typical cycle, $CeO_2$ is oxidized with $O_2$, to ensure that material is fully oxidized, reduced thermally at 1500° C., oxidized with $H_2O$ or $CO_2$, and reduced thermally again at 1500° C. Unless otherwise indicated, the thermal reduction and oxidation experiments are performed as the following: thermal reductions, $CeO_2$ is heated to 1500° C. at a rate of 16.7° C./sec with a dwell time of 4 minutes under helium flow at 75 torr (with background $P_{O2}=10^{-7}$ atm). $O_2$ evolution is monitored during this period. After the thermal reduction step is performed, the laser heating is turned off, and the sample is allowed to cool to the furnace temperature under helium sweep. Subsequently, the $H_2O/CO_2$ oxidation step is performed by flowing the different oxidizing agents, at three different concentrations, at 75 torr.

Typical Ceria Redox Results

Following reduction at 1500° C., oxidations were carried on for 10 minutes. Three different concentrations of $H_2O$ and $CO_2$ used were: 20%, 30%, and 40%. A range of oxidation temperatures is investigated: from 700-1050° C. for water and from 650-1050° C. for $CO_2$ oxidation. For all of these cases, the separation of CO or $H_2$ was carried out from $CO_2$ or $H_2O$ in a separate step according to reaction (5). $O_2$ was removed according to reaction (4). These are typical results for the $CeO_2$ cycle and are not shown here—reduction at 1500° C. followed by oxidation at or below 1050° C.

Simultaneous Reduction/Oxidation Using $CeO_2$

Simultaneous reduction/oxidation to simultaneously produce $H_2$ and $O_2$ from $H_2O$, or CO and $O_2$ from $CO_2$, occurs when the oxidation step is carried out at a high enough temperature where the material undergoes thermal reduction during the oxidation step. This phenomenon is observed when $CeO_2$ is used as an intermediate to split either $H_2O$ or $CO_2$ for reduced ceria at oxidation temperatures above ~1100° C.

Figure 7:
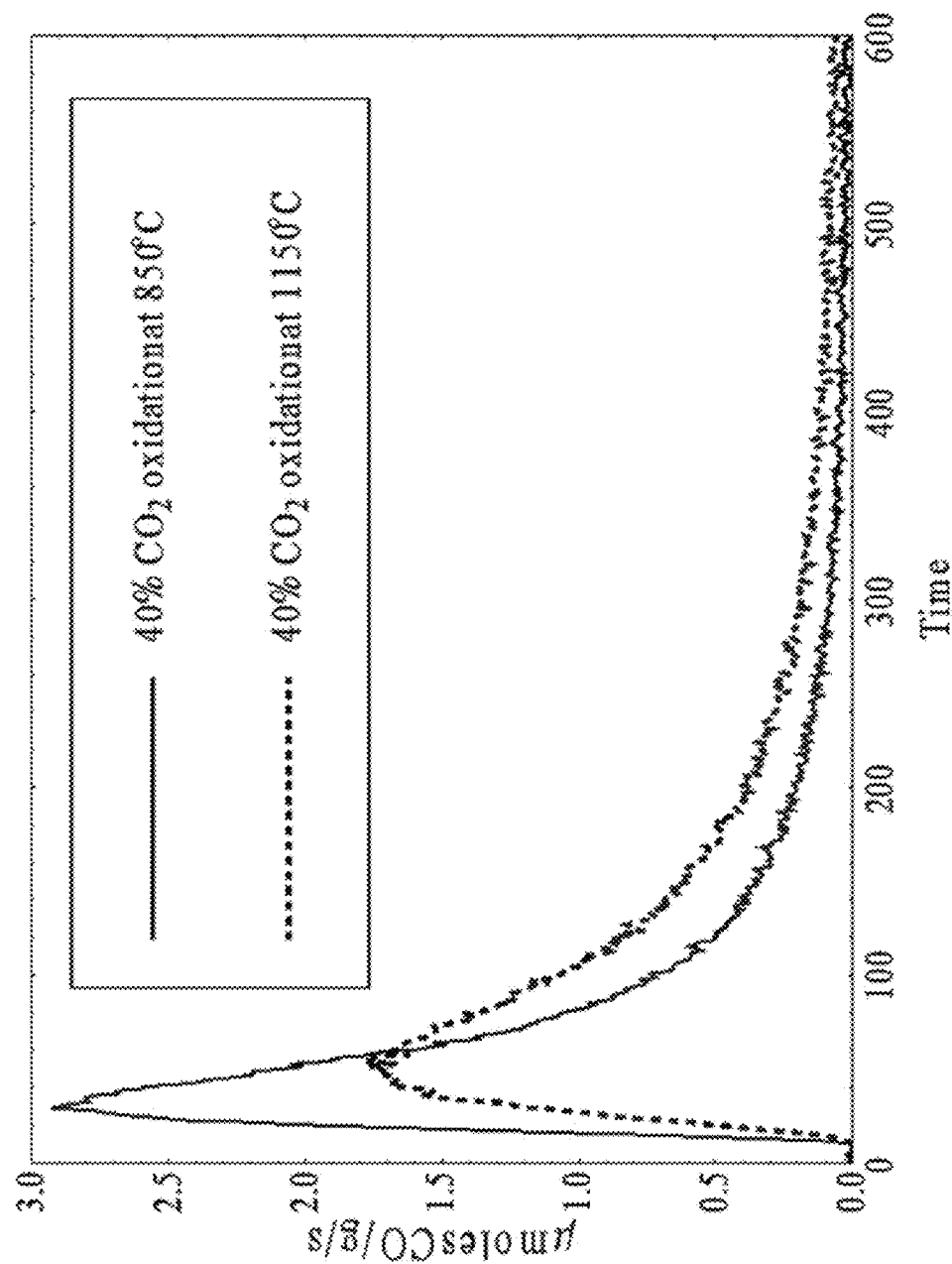

At high oxidation temperatures, competition between thermal reduction and oxidation occurs, resulting in the concurrent production of $H_2$ (for oxidation with steam) or CO (for oxidation with $CO_2$) and $O_2$. In this region, we observe a decrease in the peak rate of oxidation. For illustrative purposes, we will focus on the simultaneous redox activity during 40% $CO_2$ oxidation. In FIG. 7, we compare CO temporal behavior during 40% $CO_2$ oxidation at 850° C., where oxidation is kinetically controlled, with 40% $CO_2$ oxidation at 1150° C., where concurrent oxidation and thermal reduction are occurring. At 1150° C., it is apparent that not only is the peak rate lower, more CO is also produced after the initial peak. At 850° C., CO peaks at 2.9 μmoles CO/g/s and a total of 212 μmoles CO/g is produced, while the corresponding $O_2$ produced during thermal reduction is 106 μmoles $O_2$/g. This translates to CO:$O_2$ ratio of 2:1. On the other hand, at 1150° C., the CO peak production is lower at 1.7 μmoles CO/g/s; while the total CO produced is more (238 μmoles CO/g). The corresponding $O_2$ produced during thermal reduction is 116 μmoles $O_2$/g. This translates to a CO:$O_2$ ratio of 2.1:1, slightly over the stoichiometric/mass balance restriction. This suggests that additional CO is produced due to simultaneous reduction/oxidation activity, and that the lower CO peak could be caused by either thermodynamic limitations and/or recombination of CO and $O_2$.

Figure 8:
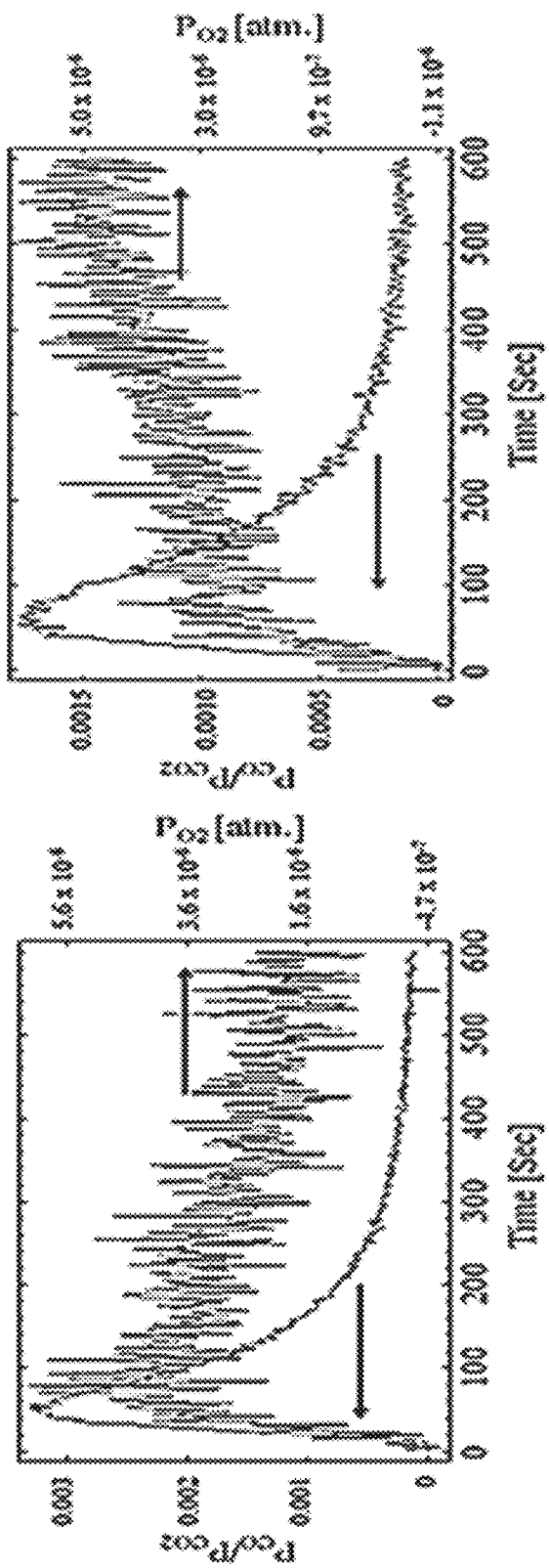

In FIG. 8a, we show the co-production of $O_2$ and CO during 40% $CO_2$ oxidation of reduced $CeO_2$ at an oxidation temperature of 1150° C. Due to the simultaneous reduction/oxidation activity, during $CO_2$ oxidation at 1150° C., $P_{O2}$ increased, as the material concurrently undergoes thermal reduction. This increase in $P_{O2}$ can be observed as low as 700° C., but it doesn't start to affect the production of either $H_2$ or CO until above 1150° C., where thermodynamically it is favorable for $CeO_2$ to undergo thermal reduction.

FIGS. 26 and 27 illustrate $H_2$ generation v. time for 50% $H_2O$ in an inert carrier gas. As illustrated, the ceria cycle performs better, i.e., produces more hydrogen at higher temperatures. $H_2O$ in the form of steam is applied to a system to oxide the ceria material at time intervals indicated by downward arrows.

To further illustrate the catalytic effect, we insert a platinum foil along with the ceria sample to show that additional catalytic effect can reduce the peak rate of CO or $H_2$ and increase total production. It has been well reported in the literature that platinum can catalytically split water and $CO_2$ at these temperature. As can be observed in FIG. 8b, $P_{O2}$ increased even further with the presence of platinum foil and $CeO_2$. In the presence of platinum, additional catalytic splitting of $CO_2$ (and $H_2O$ for oxidation with steam) occurs, further increasing local $P_{O2}$ and further affecting the temporal behavior of CO (and $H_2$) production. With the addition of the platinum foil, even with the same temperature and $CO_2$ flow conditions, peak CO decreases from 1.73 μmoles CO/g/s to 1.54 μmoles CO/g/s, and total CO produced goes up from 238 μmoles CO/g without Pt foil to 288 μmoles CO/g with Pt foil. 288 μmoles CO/g corresponds to a CO:$O_2$ ratio of 2.7:1, exceeding what is possible stoichiometrically for separate redox.

Figure 9:
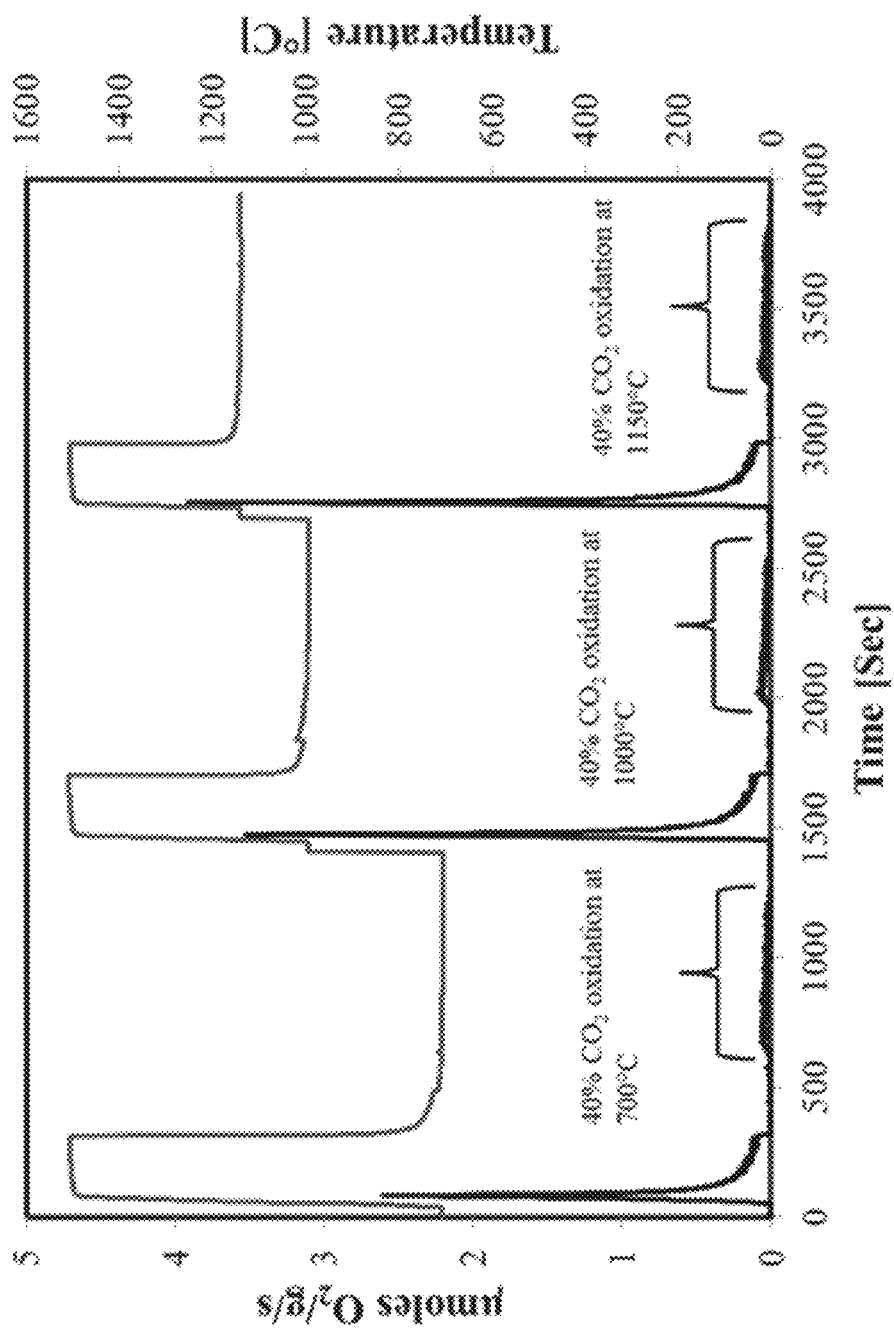

The oxygen production during ceria redox via thermal reduction at 1500° C. followed by $CO_2$ oxidation (40% $CO_2$) at 700°, 1000° C. and 1150° C. is shown in FIG. 9. The graph of oxygen production during the $CO_2$ oxidation is expanded in FIG. 10. It is important to note that the oxygen production is very rapid initially and then ramps down. This behavior combined with the behavior shown in FIGS. 7 and 8 indicates that, during simultaneous redox at 1150° C., both oxidation and reduction are fast. It is not possible to produce CO independently of $O_2$ at these higher temperatures. Hence, a preferred redox cycling system is reduction at 1500° C. followed by oxidation at ~1050° C. or lower temperature.

These examples demonstrate that conventional redox occurs for ceria when reduced at 1500° C. and then oxidized at temperatures ≤1050° C. For reduced ceria, oxidation at temperatures ≥1150° C., simultaneous redox occurs and $H_2$ & $O_2$ are produced for $H_2O$ oxidation and CO & $O_2$ are produced for $CO_2$ oxidation.

Hercynite Cycle Redox Using a Laser-Assisted Stagnation Flow Reactor

Simultaneous $CO_2$ or $H_2O$ redox splitting can be observed with the $CoFe_2O_4/Al_2O_3$ cycle, i.e., the hercynite cycle, when the $CO_2$ or $H_2O$ splitting oxidation temperature is increased T≥1200° C. In this temperature range, the material can undergo thermal reduction during the oxidation step. At 1200° C. and 600 Torr, $CO_2$ oxidation for 420 seconds of a sample reduced at 1320° C. for 300 seconds yields 160 μmoles CO/g-sample (or 340 μmoles CO/g-active material with 47% active material, 53% is excess/inert $Al_2O_3$), and the $O_2$ produced during the corresponding thermal reduction is 29 μmoles $O_2$/g-sample (62 μmoles $O_2$/g-active material). The CO produced at 1200° C. is more than 5 times the $O_2$ produced in the corresponding thermal reduction; this is more than the ideal value of 2:1 CO:$O_2$ governed by mass balance. This suggests that a simultaneous reduction/oxidation process occurs during the $CO_2$ splitting step: the concurrent production of CO and release of $O_2$. However, the integrated production rates for CO and $O_2$ don't show the dynamics of the reduction and oxidation processes. These have been investigated further.

Figure 11:
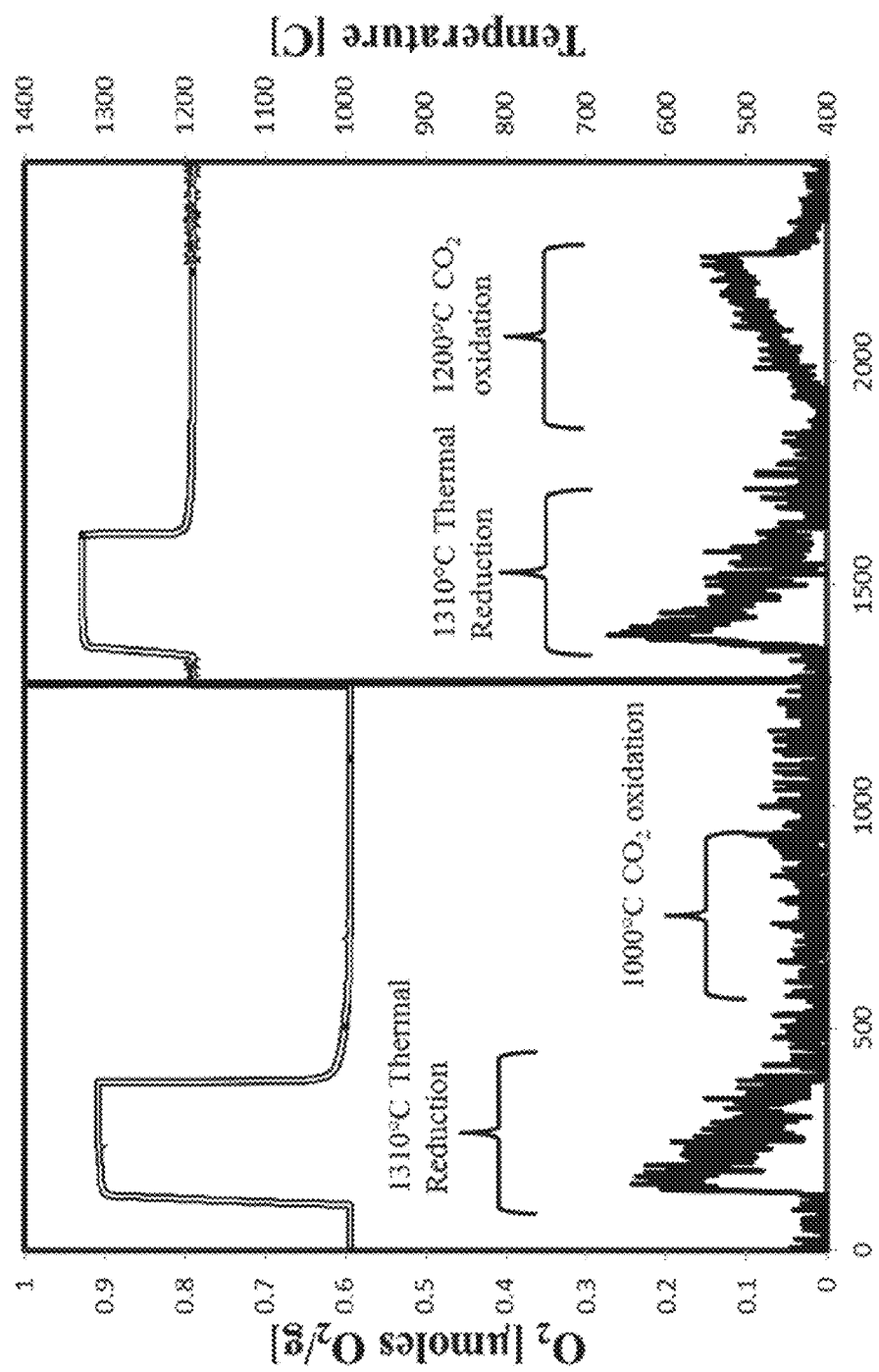

The $O_2$ behaviors of two different cycles are shown in FIG. 11. The first cycle (FIG. 11a) is when the material is thermally reduced for 300 seconds at 1310° C. and oxidized with $CO_2$ for 420 seconds at 1000° C. The second cycle is when the material is thermally reduced for 300 seconds at 1310° C. and oxidized with $CO_2$ for 420 seconds at 1200° C. In both cases, pressure is maintained at 600 Torr. In the latter case, two $O_2$ peaks are observed. The first is due to the 1310° C. thermal reduction. The second is the $O_2$ released during $CO_2$ splitting. It is important to note that the simultaneous $O_2$ shown in FIG. 11b (release during $CO_2$ splitting) is generated much more slowly than the $O_2$ resulting from the reduction step. A challenge for simultaneous reduction/oxidation is separation of $H_2$ from $O_2$ in-situ. It appears from the $O_2$ dynamics that the oxygen release from the thermal reduction is much faster than the oxygen release from the high temperature $CO_2$ oxidation.

This set of examples demonstrates that $O_2$ is released during $CO_2$ oxidation when the oxidation is carried out at 1200° C. and not when oxidation is carried out at 1000° C. for the hercynite cycle. However, the oxygen release is much slower for the oxidation than for the reduction for the hercynite cycle materials. In comparing oxygen release for the hercynite cycle during oxidation at 1200° C. (FIG. 11b) to that for the ceria cycle oxidation at 1150° C. (FIG. 10), it is clear that oxygen release is much slower for the hercynite cycle materials, i.e., the slope of the oxygen release is positive whereas for ceria it is negative following a large immediate initial oxygen release.

Redox Activity of M-Ferrites Using a Stagnation Flow Reactor

The redox activity and oxidation chemical kinetics of a $CoFe_2O_4$/$ZrO_2$ composite (i.e., M-ferrite), synthesized via atomic layer deposition, was investigated experimentally in a stagnation flow reactor. Materials were thermally cycled at a reduction temperature of 1450° C. followed by oxidation with steam at temperatures ranging from 900° C. to 1450° C. and steam concentrations of 20-40 vol-% $H_2O$. The reaction extents ($H_2$ and $O_2$ yields) increased proportionally to the oxidation temperature and were limited by the chemical kinetics of the oxidation reaction rather than thermodynamics. Above oxidation temperatures of ~1100° C. the influence of the reverse thermal reduction reaction could not be discounted. In fact, simultaneous production of $H_2$ and $O_2$ was observed for an indeterminate amount of time at these elevated temperatures.

Materials were synthesized via sequential deposition of CoO and $Fe_2O_3$ films onto porous $ZrO_2$ supports via atomic layer deposition (ALD) as described above for deposition on $Al_2O_3$ (deposition on inert $ZrO_2$ is the M-ferrite cycle, reactions (6) and (7); deposition on $Al_2O_3$ is the hercynite cycle, reactions (1) and (2)). Following ALD synthesis, materials were heat treated at 1450° C. in air for two hours.

Samples were reduced and oxidized in a stagnation flow reactor (SFR) which has been described above. Salient features of the experimental apparatus include a stainless steel gas-handling manifold, ceramic reactor core, high temperature furnace, and modulated effusive beam mass spectrometer. In stagnation flow, the gas-phase region above the sample between centerline and reactor wall can be considered an ideal one-dimensional stagnation plane governed by diffusive transport. This is an important attribute that distinguishes the fluid dynamics of this reactor type from others typically used to characterize kinetic behavior of these materials, namely packed bed reactors, flow tube reactors, and flow geometries common to thermogravimetric analyzers (TGA). It is also important to note that in the SFR, sample material is placed in a loosely-packed shallow bed where gasses have access to all exposed surfaces and are well mixed within the control volume at the temperatures and pressures used in this experiment.

Mass flow controllers were used to meter all gas feed rates. The reactor exhaust was throttled, allowing for feedback control of the reactor pressure to any desired setpoint within the range 1-760 Torr. Water was delivered through an evaporator fed by a micro-syringe pump. Liquid nitrogen traps were used to condense $H_2O$ prior to sampling the reactor effluent with the mass spectrometer. Between 50-200 mg of sample material, in the form of powder or ALD-coated m-$ZrO_2$ support, were placed in the reactor. Thermal reduction was accomplished by heating the sample to 1450° C. in a He environment (500 sccm) for 75 minutes. Oxidative water splitting (WS) was performed using 20 to 40 vol.-% steam in He with a total flowrate of 500 sccm over a 1000 s time interval. Oxidation temperatures ranged from 900° C. to 1300° C. A single sample was used over the course of the of these examples and sequentially cycled. It was never removed from the reactor or tampered with in any way. The total pressure for both thermal reduction and oxidation (WS) was 75 Torr.

Gasses exiting the flow reactor were sampled using a differentially pumped, modulated effusive beam mass spectrometer (Extrell C50, 500 amu). Molecular oxygen (m/e=32) was monitored during thermal reduction, and molecular hydrogen (m/e=2) during WS, at a repetition rate of approximately 2 Hz. A liquid nitrogen-filled cryogenic trap was used to condense water before gasses were sampled by the mass spectrometer. A numerical procedure was used to account for detector time lag and dispersion/mixing downstream of the reactor in order to reveal the true nature of the kinetic phenomena. Analytical standards for $O_2$ and $H_2$ were used to calibrate the mass spectrometer.

Following heat treatment in air, the resulting cobalt ferrite was thermally reduced at 1450° C. followed by oxidation between 900 and 1300° C. A total of 15 cycles (20, and 40 $H_2O$ vol-% at 900, 1000, 1100, 1200 and 1300° C.) was performed. Representative temporal evolution of $H_2$ (1100° C./30 vol % $H_2O$) and $O_2$ is shown in FIGS. 12a and 12b and clearly shows the redox capability of the heat treated sample. Oxidation is more rapid than thermal reduction, and occurs primarily within the first 1000 s. It is characterized by a sharp peak followed by an exponential decay, which is very characteristic of, and similar to, other ferrite water splitting rates observed in the literature. Note the $H_2$ plateau which was even more pronounced at higher oxidation temperatures. Even after continued exposure to steam for longer times, the $H_2$ rate never returned to baseline. Thermal reduction, shown in FIG. 12b, is much slower than oxidation, and after 6000 s has still not reached completion. A near stoichiometric amount of $H_2/O_2$ (2.05), calculated by integrating the areas under the respective oxidation and thermal reduction curves, was observed for this experiment. So, for reduction at 1450° C. followed by oxidation at 1100° C., M-ferrites behaved as expected for standard redox reaction.

The total amount of $H_2$ and $O_2$ produced was highly dependent upon the oxidation temperature. Total $H_2$ produced verses $O_2$ for all experimental cycles is summarized in FIG. 13, and indicates an increasing trend in $H_2$ and $O_2$ production as the oxidation temperature is increased. Because oxidation thermodynamics are more favorable at lower temperatures, this trend is attributed to kinetic limitations. The yields presented here are simply limited by the amount of time the sample experienced oxidative conditions (1000 s). Cobalt ferrite samples were also compared to $Fe_3O_4$, and there is a negligible difference in the $H_2$ and $O_2$ yields between the samples. This is contrary to thermodynamic equilibrium calculations, which predict larger yields for cobalt ferrite compared to $Fe_3O_4$. This also suggests that kinetics, rather than thermodynamics is limiting the reaction extents observed. In fact, nearly 4000 micromoles $H_2$/g cobalt ferrite are expected at these conditions based on equilibrium calculations, which is nearly 3 times more than we observed. A recent study by Coker et al. has indicated that there is a distinct difference in the iron utilization upon oxidation depending if it is dissolved in YSZ or undissolved. Nearly all of the iron that was capable of being oxidized with $CO_2$ was dissolved in YSZ, while the rest remained mostly unoxidized due to diffusion limitations through the iron oxide shells. It was reported that the maximum solubility of $Fe^{2+}$ in YSZ is 9.4% at room temperature, and this may explain in part why the yields we observe are significantly less than predicted by thermodynamic calculations. Additionally, this observation explains in part why there are no observable differences between $H_2$ yields of $CoFe_2O_4$ and $Fe_3O_4$, as both oxidation reactions were limited by the amount of iron dissolved in the $ZrO_2$ support.

Figure 12:
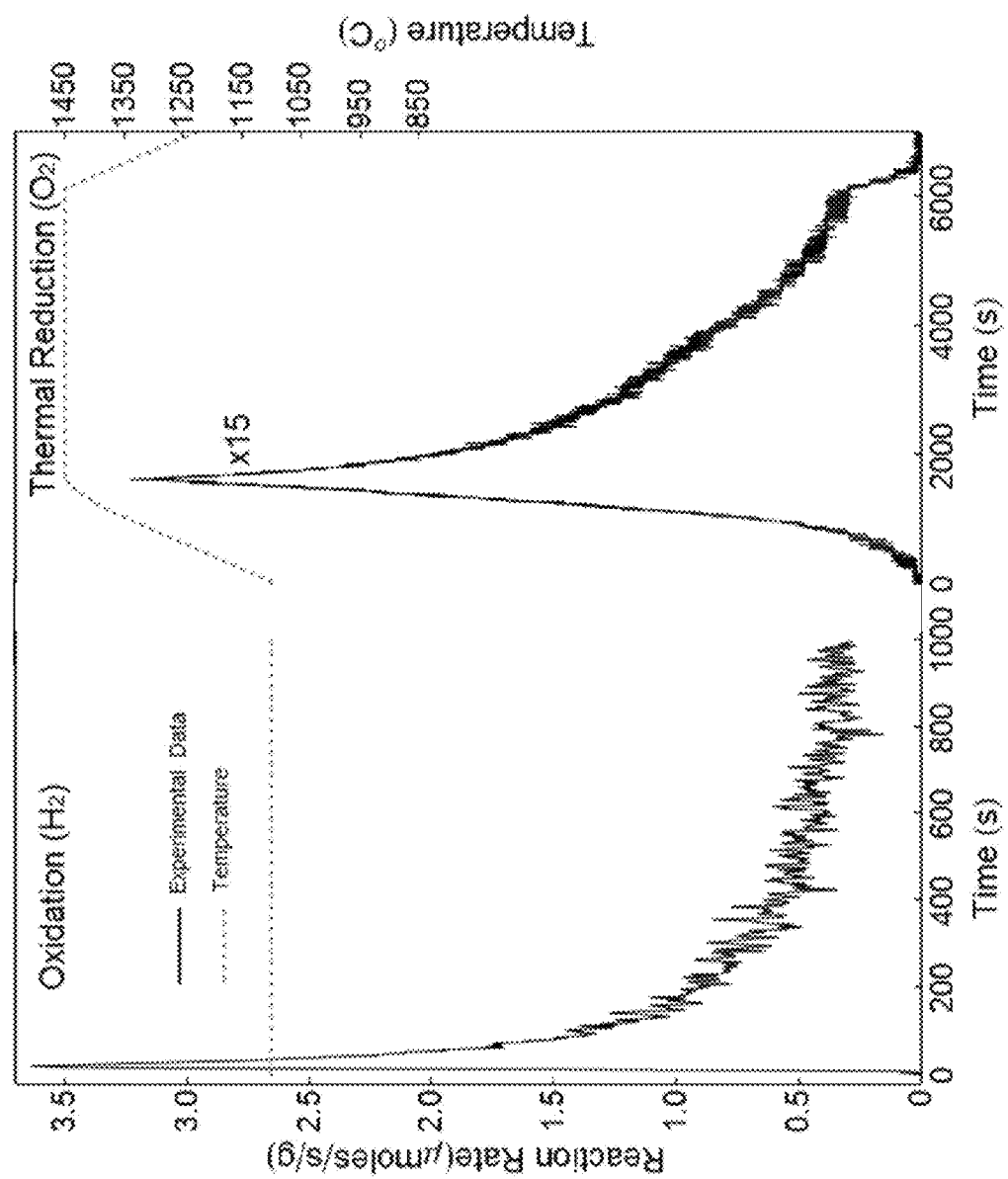
Figure 13:
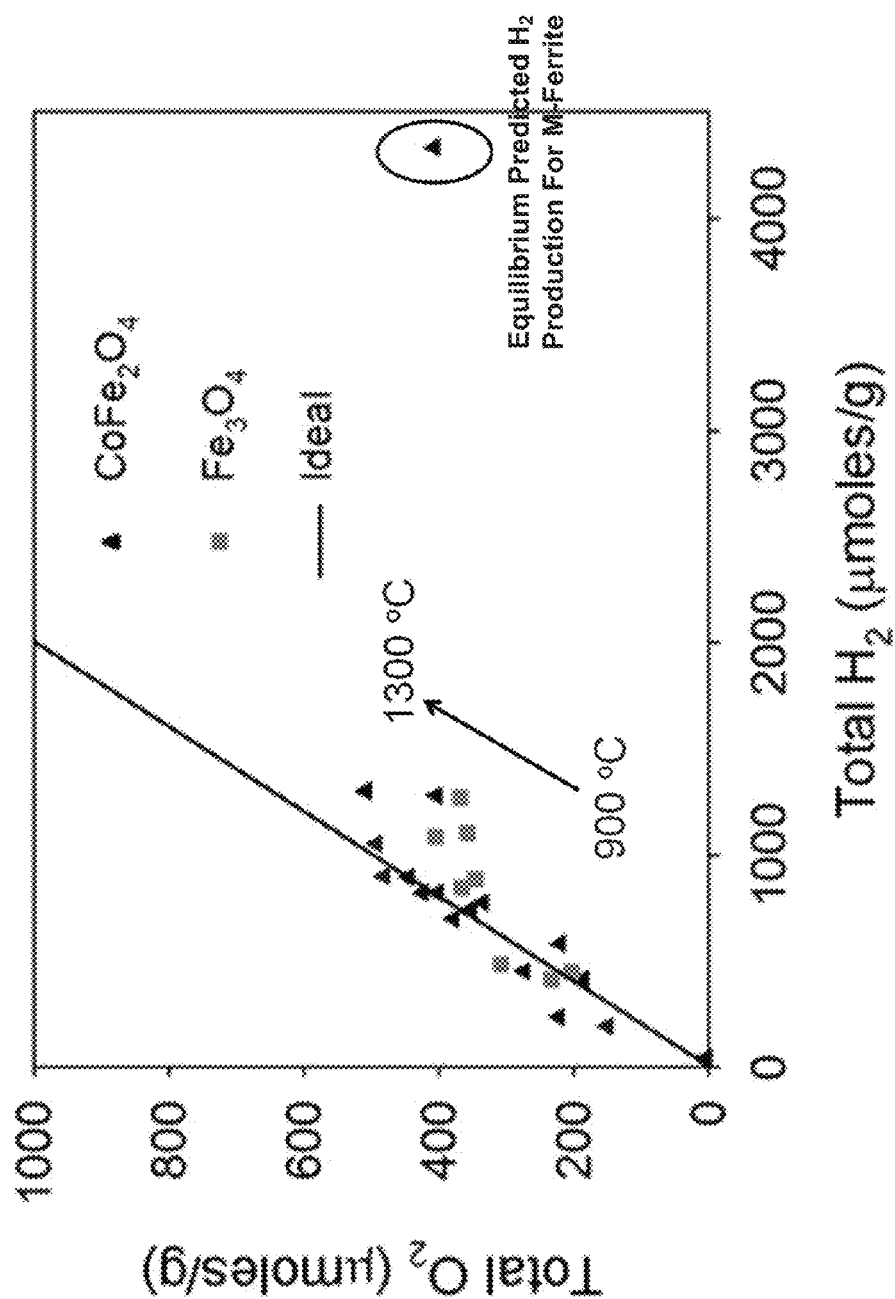
Figure 14:
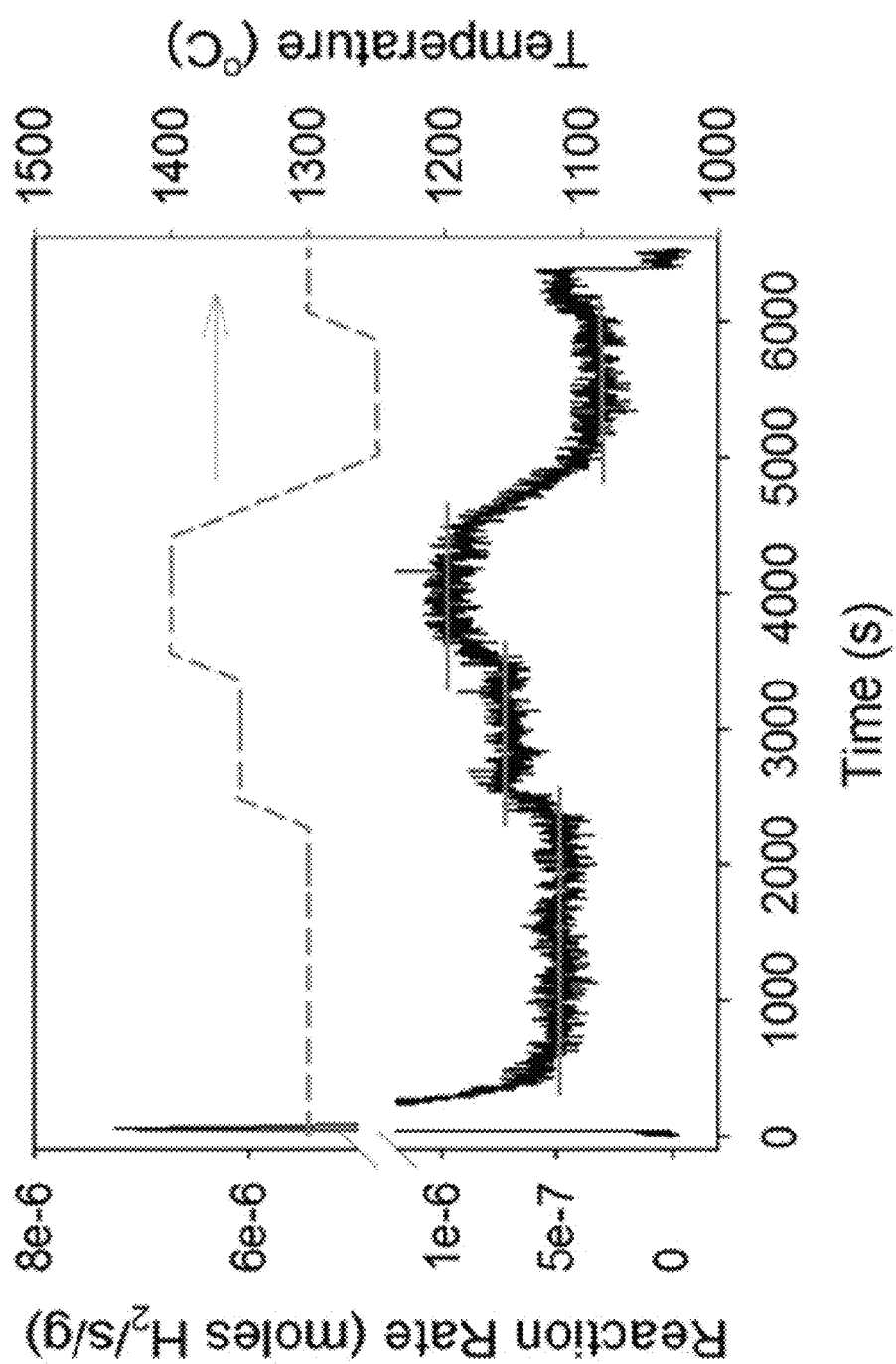

At lower oxidation temperatures, there is nearly a stoichiometric amount of $H_2$ and $O_2$ produced every cycle, indicated clearly in FIG. 13. However, at higher temperatures a larger ratio of $O_2$ to $H_2$ is observed, as evidenced by the deviation from the ideal stoichiometric line of 1:2. Interestingly, the $H_2$ plateau that is observed in FIG. 12a at 1100° C. is more pronounced at higher temperatures and even after several hours of experimentation did not show any signs of decreasing. To explore this phenomenon further we performed an extended oxidation for 6000 s and varied the oxidation temperature between 1250° C. and 1400° C., as shown in FIG. 14. Oxidation was initially attempted at 1300° C./40% $H_2O$. The initial reaction rate is very rapid and is preceded by an exponential decay to a plateau of 5e-7 moles/g/s. This rate stays constant for up to 1500 s without showing any sign of decreasing. After holding for 2000 s at 1300° C., the temperature was increased to 1350° C., and finally 1400° C., while continuing to flow steam. There was a corresponding increase in the $H_2$ rate as the temperature was increased, and after continuing to oxidize the sample for 6000 s, the rate of change of $H_2$ was zero except for when the temperature was changed, indicating that this is an activated process with simultaneous redox. In addition to continued $H_2$ production, the evolution of oxygen was observed in a proportional manner. The $H_2$ plateaus are not due to the slow oxidation of the sample because the amount of $H_2$ generated was much greater than the amount of $O_2$ liberated during the subsequent reduction (4332 micromoles $H_2$/g vs. 407 micro-moles $O_2$/g, see FIG. 13). In fact, more $H_2$ is produced than predicted if all of the available $Fe^{3+}$ were reduced to $Fe^{2+}$ and then re-oxidized. Experiments were also performed without samples to see if the simultaneous $H_2$ and $O_2$ production was due to water thermolysis. However, there was no evidence of any $H_2$ until 1400° C., but even at that temperature the increase was very minimal and much less than the values of the $H_2$ plateaus observed in the presence of a sample. This behavior is indicative of a reaction operating at equilibrium, where both thermal reduction and water oxidation occur simultaneously, similar to the behavior observed in water gas shift (WGS) reactions. In the case of WGS reactions, an oxidant ($H_2O$) and reductant (CO) are reacted over a metal oxide surface to produce $H_2$ and $CO_2$, whose yields are dictated by equilibrium. This is conceptually similar to the behavior observed here, but reduction is achieved via thermal reduction rather than a chemical reducing agent (CO). These results indicate that it is possible to split $H_2O$, in the presence of M-ferrite, $CoFe_2O_4$, into $H_2$ and $O_2$ for an indefinite period of time without going to extreme temperatures which are required for water thermolysis. However, while theoretically interesting, the practicality of a process such as this for solar $H_2$ production is likely not feasible if $H_2$ and $O_2$ must be separated at high temperatures. However, if the rate of simultaneous reduction is delayed for any extent of time relative to the simultaneous oxidation, then the redox process could be run isothermally at a given temperature with the oxidant pulsed into the system at high temperature where reduction will also eventually occur.

This set of examples shows that, for M-ferrites, above 1100° C., the influence of the reverse thermal reduction reaction cannot be disregarded. In fact, at these elevated temperatures $H_2$ and $O_2$ are observed simultaneously for an indefinite amount of time. This behavior is analogous to lower temperature catalytic processes such as the water gas shift reaction in which the yields of $H_2$ and CO are dictated by thermal equilibrium. We have simultaneous reduction/oxidation.

Effect of Pressure on Hercynite Cycle Redox

Figure 15:
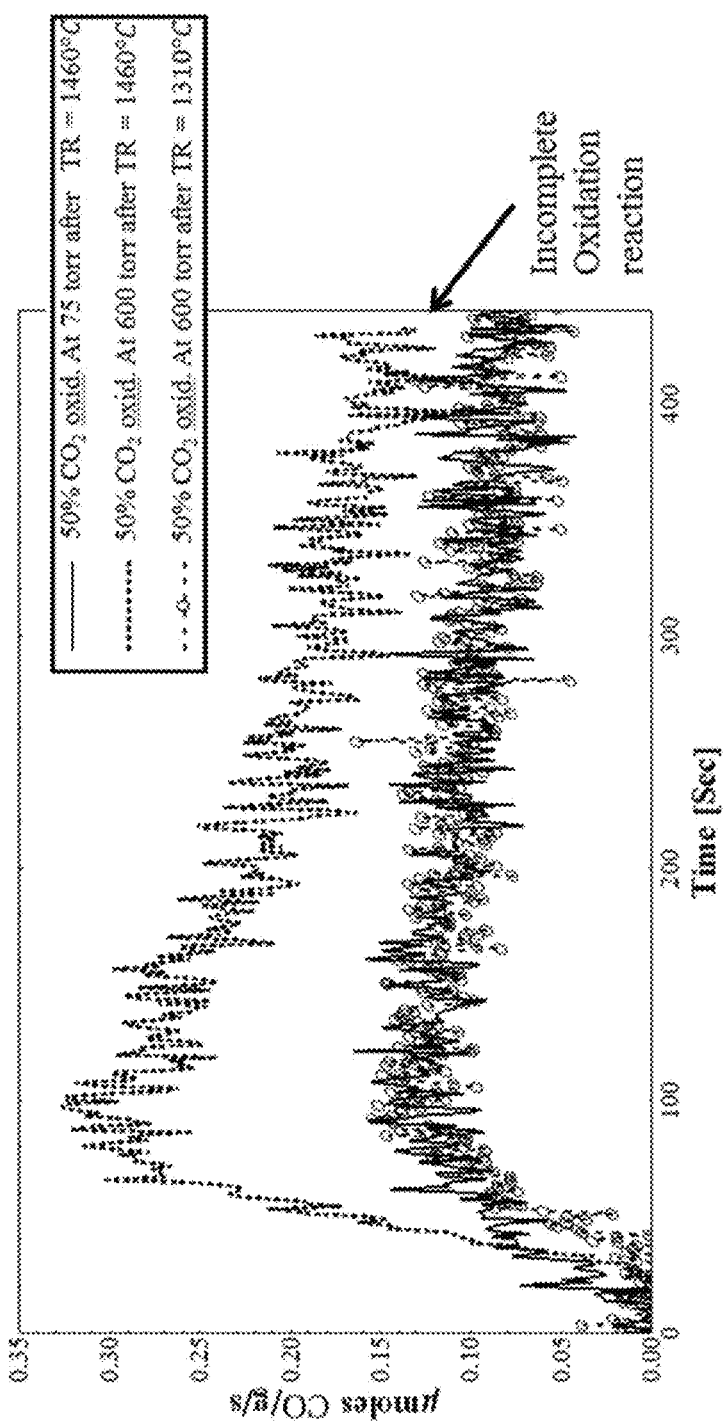

The temporal behaviour of CO produced during $CO_2$ splitting under various conditions is shown in FIG. 15, and the total CO produced is summarized in Table 1. Here we examine the effects of thermal reduction temperature, oxidation temperature, and pressure on CO production. CO production is highly dependent on the thermal reduction temperature and partial pressure of $CO_2$. The higher the thermal reduction temperature, the more CO produced in the oxidation step. This is as expected, since the higher thermal reduction temperature increases the extent of reduction and yields more aluminate species to be oxidized (reaction 1).

TABLE 1

| | Summary of CO Production after oxidation by 50% $CO_2$; "hercynite cycle" | | |
|---|---|---|---|
| P [torr] | Thermal Reduction Temperature [° C.] | $CO_2$ Oxidation Temperature [° C.] | Total CO released during oxidation [µmoles CO/g] |
| 600 | 1310 | 1000 | 41.5 |
| 600 | 1460 | 1000 | 82.5 |
| 75 | 1460 | 1000 | 42.4 |

The $CoFe_2O_4/Al_2O_3$ ALD material is capable of being cycled at low thermal reduction temperature of 1300° C. while maintaining CO production during the oxidation. This observation is in agreement with results published previously showing reduction at 1200° C., and is ~150° C. lower than values reported for a ferrite based system and $CeO_2$.

Although increasing the thermal reduction temperature increases the yield, there are advantages in performing the thermal reduction at a lower temperature: mitigation of sensible heat loss, reactor design considerations, and material stability issues. As can be seen in Table 1, reducing the thermal reduction temperature from 1460° C. to 1310° C. reduces the amount of CO produced by half. Therefore, a suitable optimal thermal reduction temperature may be determined so as to achieve optimum efficiency.

$CO_2$ splitting may be surface limited. Pressure increase within the reaction chamber, and thus increase flux of $CO_2$ onto the surface of the active material, increases the CO production. Increasing the pressure from 75 torr to 600 torr has a similar effect as increasing the thermal reduction temperature from 1310° C. to 1460° C. (Table 1).

This set of examples demonstrates that increasing oxidant pressure of $CO_2$ or $H_2O$ increases the rate of oxidation for the hercynite cycle active materials.

Summary of Standard Redox Reaction Runs

All of the examples provided above have shown that hercynite cycle, M-ferrite, iron oxide and ceria-based active materials can all be used to carry out conventional reduction/oxidation (redox) splitting of $H_2O$ and $CO_2$ for a high reduction temperature and a lower oxidation temperature. A reduction temperature of 1500° C. for ceria, 1450° C. for M-ferrites and only 1310° C. for hercynite have been demonstrated. Reduced ceria can then be oxidized at between ~850° C. and 1050° C. to produce nearly pure CO or $H_2$. Likewise, reduced M-ferrites can be oxidized at <1100° C. to produce nearly pure CO or $H_2$ and reduced hercynite cycle materials can be oxidized at <1150° C. to produce nearly pure CO or $H_2$. It is also clear that increased pressure of the oxidant, above atmospheric, has a beneficial effect on the oxidation rate of reduced hercynite cycle active materials (see FIG. 5).

Figure 10:
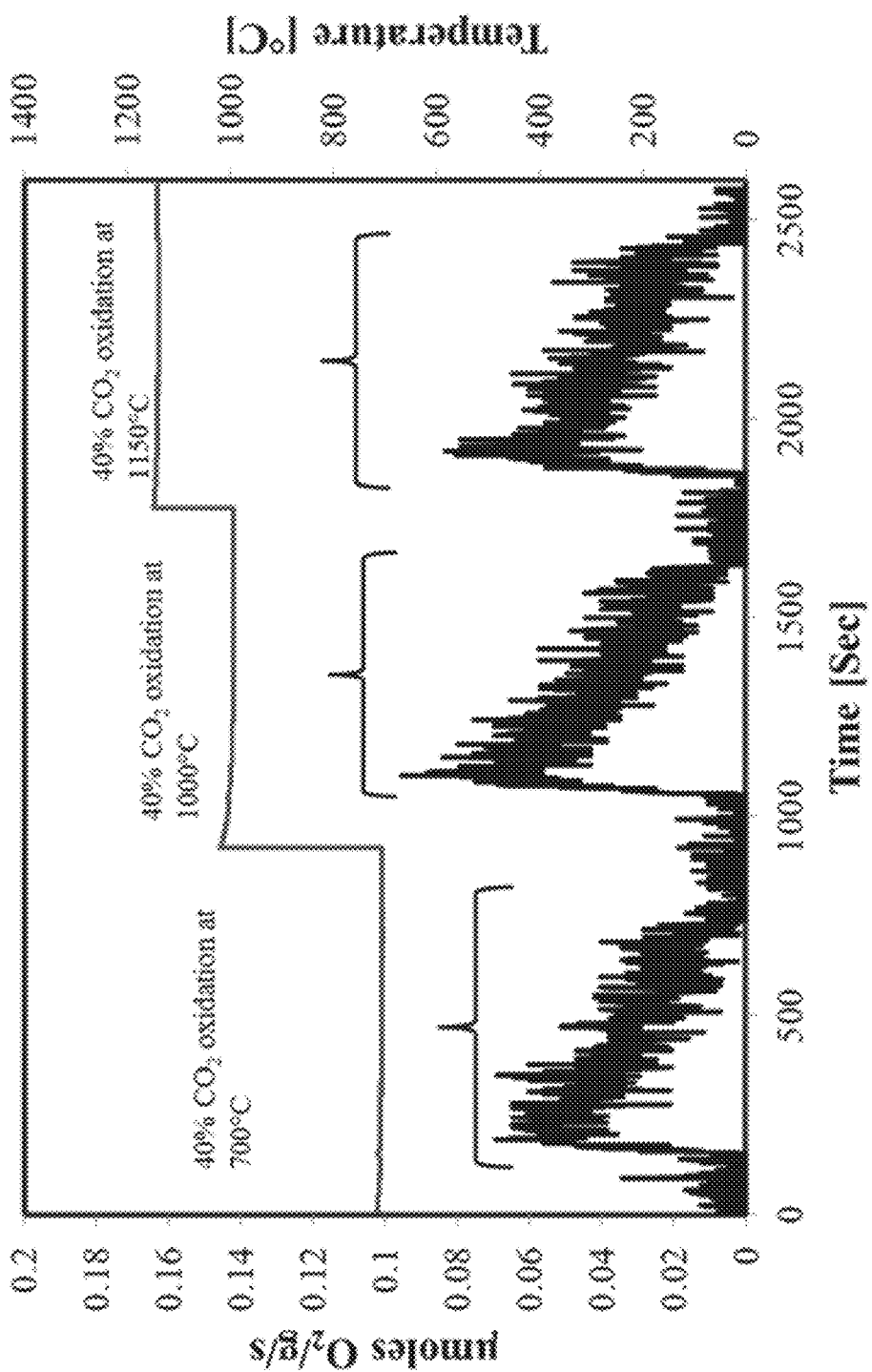

It has also been shown that for oxidation temperatures ≥1050° C. for ceria (FIGS. 7 and 8) ≥1100° C. for M-ferrite (FIGS. 12 and 14) that simultaneous oxidation/reduction occurs and is fast with water and $CO_2$ being split into $H_2/O_2$ and $CO/O_2$, respectively. Likewise, $O_2$ production during oxidation at elevated temperatures is much slower for the hercynite cycle materials (FIG. 11b), relative to that for ceria (FIG. 10).

This difference in $O_2$ production rate during oxidation by $CO_2$ or $H_2O$ provides for a unique opportunity to carry out reduction/oxidation (redox) under isothermal conditions for the hercynite cycle. Under similar conditions, ceria will undergo simultaneous redox producing $H_2/O_2$ and $CO/O_2$ simultaneously, requiring separation.

Isothermal Redox for Hercynite Cycle Active Materials Using a Stagnation Flow Reactor A stagnation flow reactor shown in FIG. 6, but without laser assistance, was utilized for the isothermal solar splitting of water using the hercynite cycle. The stagnation flow reactor set up consists of a steam generator before the inlet with an inert carrier gas, and a steam free inert sweep gas line that carries the gasses into the reactor inlet. The gasses travel down the inner portion of the annulus shaped reactor tube, which is held in an electric furnace, and impinges on the $CoFe_2O_4$ deposited on $Al_2O_3$ (hercynite cycle) sample which was placed in an $Al_2O_3$ crucible positioned in the stagnation zone of the stagnation flow reactor. The gasses then make a 180° turn and exit at the top of the reaction tube. The gasses flow through a cryotrap removing any unreacted water before being pulled out of the system by a vacuum pump. A small portion of the flowing gas was diverted to an online mass spectrometer.

In the illustrated examples, 0.1 g of the $CoFe_2O_4$ deposited by ALD on $Al_2O_3$ powder was placed in the crucible. The system was heated to 1100° C. and held there for 20 min to ensure that all water had evaporated from the sample and for consistency. The furnace temperature was then raised to temperature at which the isothermal water splitting was carried out (i.e., 1300° C. or 1400° C.), the system was then held at this temperature for the reduction step for various lengths of time (60 min, 40 min, 20 min) with 10 sccm of He flowing through the system. After the desired reduction time, 250 sccm of a steam/inert stream from the steam generator (40% $H_2O$, 60% He) was flowed into the reactor for the water splitting step. After the $H_2$ production stabilized, the steam stream was turned off, and the inert purge gas stream was re-introduced and the cycle repeated. A crucible without any powder was also tested at the different temperatures and results are reported with the $H_2$ produced by thermolysis subtracted from the total. All work was carried out at a low 150 Torr pressure.

Figure 16:
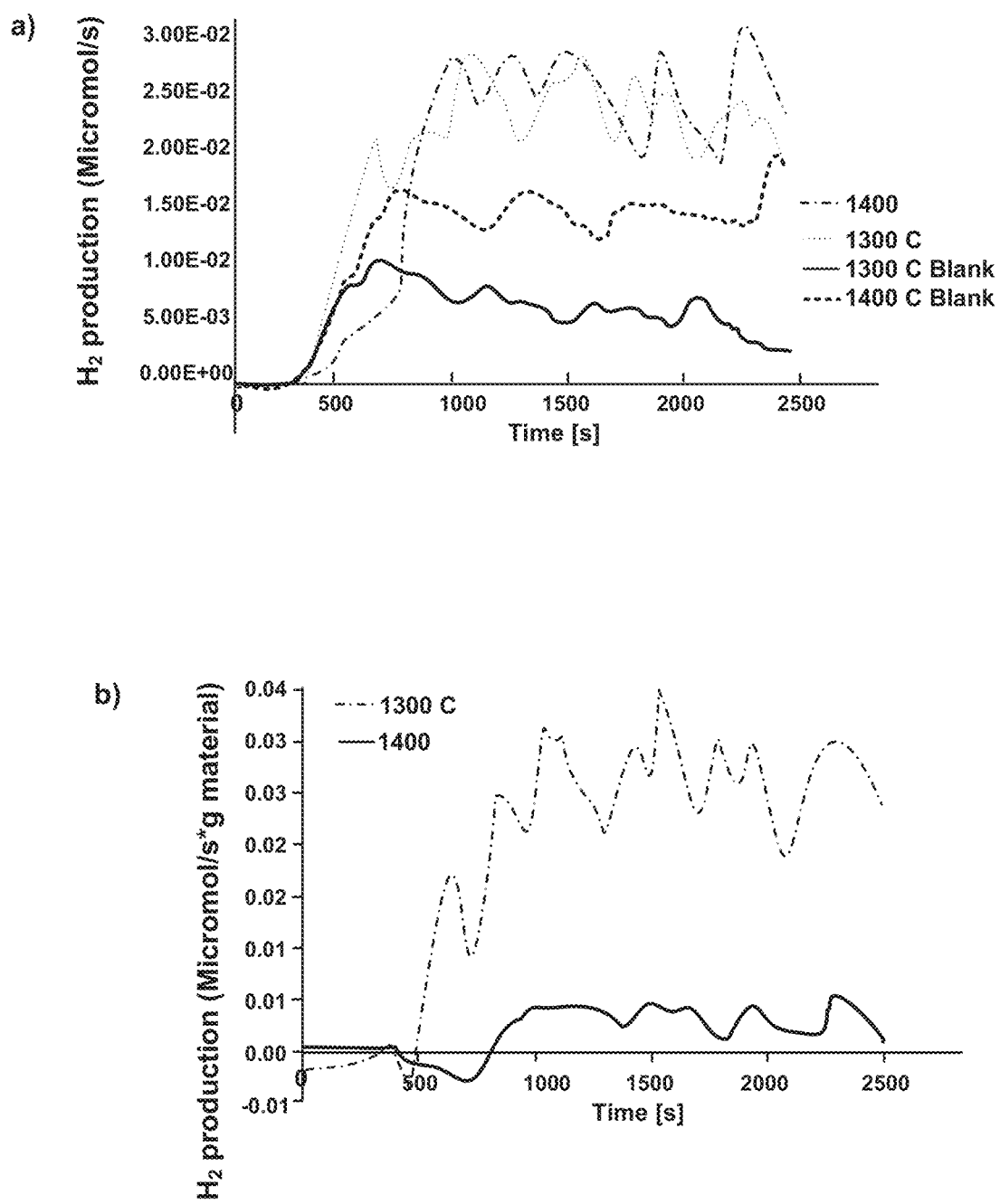

The capacity for the hercynite cycle system to undergo isothermal water splitting was tested at 1400° C. and 1300° C. After 60 min. of reduction, steam was injected into the system, the $H_2$ production rate measured by the mass spectrometer is shown in FIG. 16a and the $H_2$ production rate that can be attributed to the hercynite material is shown in FIG. 16b. As can be seen in FIG. 16a, a significantly higher $H_2$ production rate is found for water splitting when the active material is present than when thermolytic water splitting occurs. After the thermolytic water splitting has been taken into account, as shown in FIG. 16b, we see a relatively stable $H_2$ production capacity for both 1400° C. and 1300° C. water splitting, an average of ~0.005 and ~0.03 $\mu$mol $H_2/(s*g_{material})$ respectively. We believe that isothermal water splitting at 1300° C. is more active than at 1400° C. because, as can be seen in FIG. 16a, more water splits thermolytically at 1400° C. than at 1300° C. which results in a smaller amount of $H_2$ production than can be attributed to the material at 1400° C. than at 1300° C. It is actually beneficial that a lower operating temperature results in more $H_2$ generation than at higher temperatures because there are more, and lower cost, reactor construction materials that are capable of withstanding 1300° C. temperatures than are capable of withstanding 1400° C. temperatures.

Figure 17:
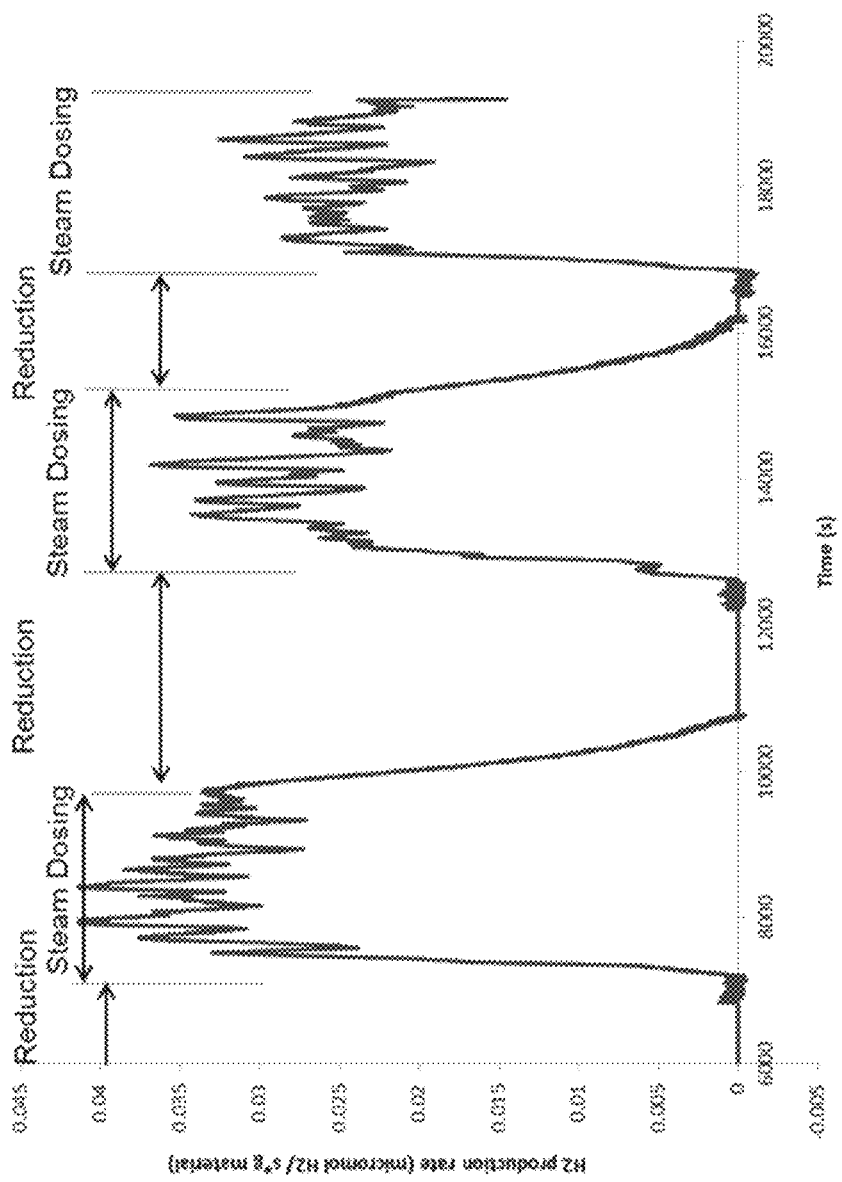

As isothermal water splitting at 1300° C. appears to be more favorable than at 1400° C., the effect of reduction time was investigated at 1300° C., and can be seen in FIG. 17. Reduction times of 60, 40 and 20 minutes were investigated. As can be seen, the longest reduction time results in the highest $H_2$ average production rate of 0.034 $\mu$moles $H_2/(s*g_{material})$, while lower reduction times have an average production rate of 0.027 and 0.025 $\mu$moles $H_2/(s*g_{material})$ for 40 and 20 minute reduction times, respectively. The larger $H_2$ production rate for the longer reduction time is most likely caused by the large extent of reduction that was achieved. Two possibilities exist for why the larger extent of reaction increases the isothermal water splitting capacity. Either the aluminate species that make up the reduced solid solution have a larger catalytic behavior than the ferrite species that are present in the unreduced solution, or as $H_2$ is produced, the reduced spinel species are being oxidized back to their original ferrite and alumina forms.

FIG. 30 and table 2 below illustrate gas production rate versus time for an isothermal hercynite cycles for varying $H_2O$ partial pressures (or percent in inert gas). As illustrated and noted herein, increased $H_2O$ pressure increases an amount of $H_2$ produced. The increased $H_2O$ pressure also increases peak rates of $H_2$ production and decreases time for complete reoxidation. It is noted that the weight of material includes the weight of any inert material, so the actual $\mu$mol/g of material should be multiplied by 2.13 to get $\mu$mol/g of active material.

TABLE 2

| Steam flow rate (sccm) | P $H_2O$ (Torr) | $H_2$ production[a] (µmole/g)[b] | Peak rate[b] (µmole/g/s) |
|---|---|---|---|
| 50[c] | 253.3 | 40 ± 9 | 0.06 ± 0.02 |
| 75[c] | 325.7 | 72 ± 8 | 0.15 ± 0.07 |
| 100[d] | 380 | 102 ± 18 | 0.35 ± 0.18 |

Figure 18:
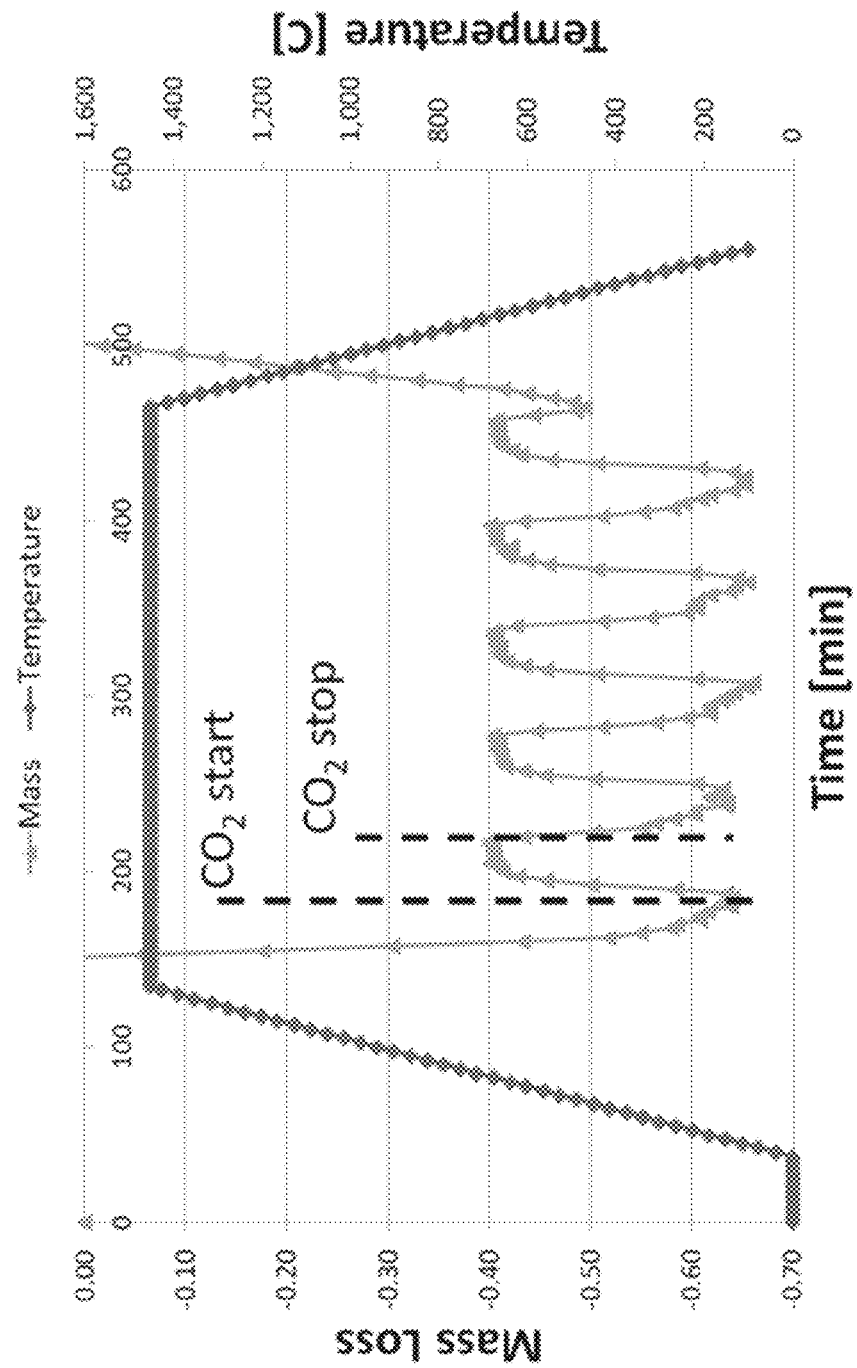
Figure 19:
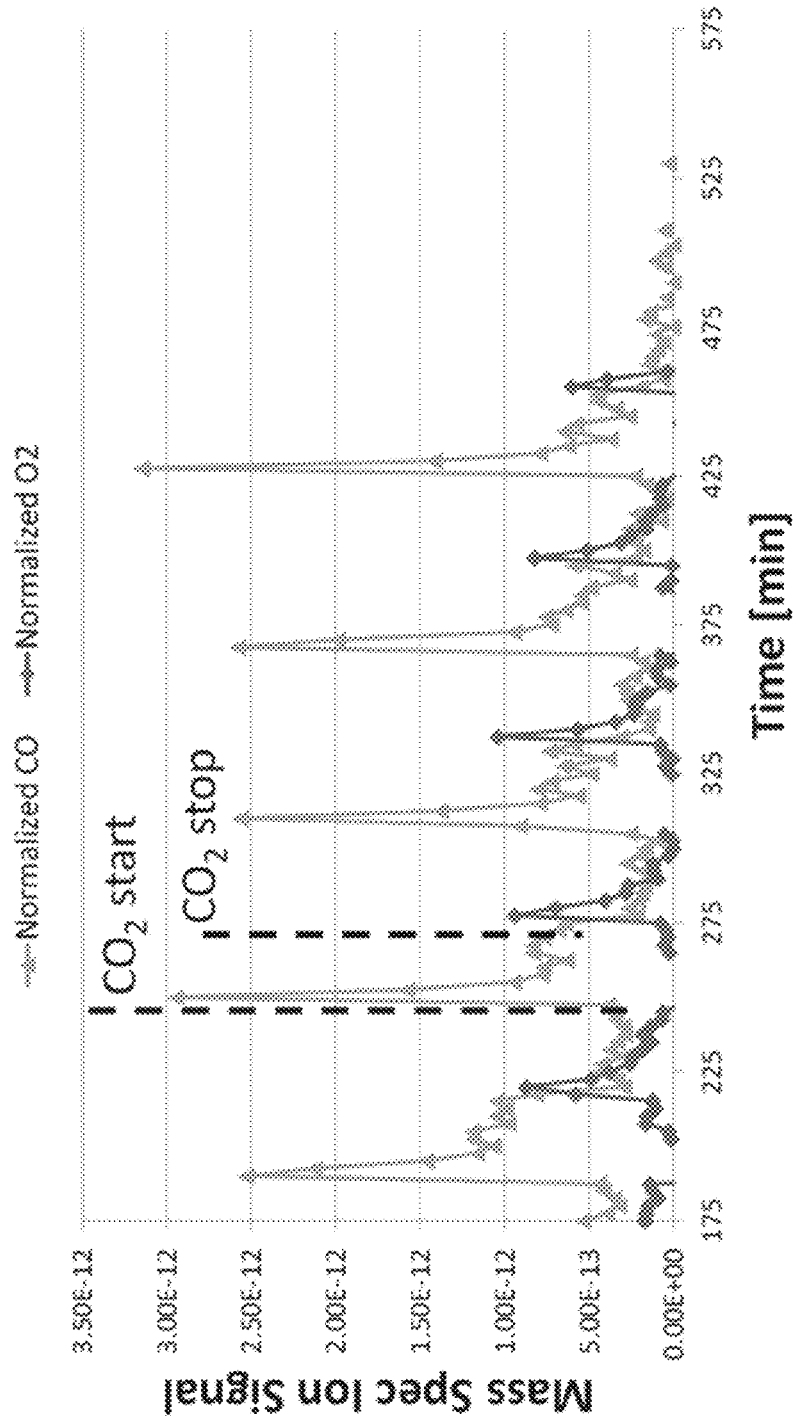

Isothermal Redox for Hercynite Cycle Active Materials Using a Thermogravimetric Analyzer $CoFe_2O_4$ thin films deposited by ALD on thin porous $Al_2O_3$ substrate as described above were tested using a NETZSCH TGA to observe $CO_2$ splitting at a uniform high temperature with only gas cycling. Active material was loaded in an alumina crucible and heated to ~1450° C. at 15° C./min. Pressure was slightly above atmospheric pressure (>760 Torr) as gasses flowed through the active materials sample. Helium was used as an inert and was introduced at 60 ml/min during heatup, cooldown, and during reduction steps. During powder oxidation, 40 ml/min of He was replaced with $CO_2$ gas. Five cycles were completed through gas cycling. Products were detected using mass spectrometry. A blank run was first completed to obtain baselines for mass and gas signals. Next, 414.1 mg of hercynite powder was loaded and cycled according to the same schedule as the blank run. FIG. 18 shows the temperature schedule and mass change profile. A decrease in mass corresponds to reduction and oxygen leaving the sample, reaction (1). An increase in mass corresponds to oxidation and oxygen being added back into the sample, reaction (2). FIG. 19 shows the mass spectrometer signal corresponding to redox being carried out in the TGA using $CO_2$ gas injections. CO and $O_2$ production is due to the oxidation and reduction reactions corresponding to when $CO_2$ is fed and then the $CO_2$ flow stopped. As can be seen in FIG. 18, the CO production starting at ~180 minutes corresponds to a mass increase of the TGA signal, both resulting from $CO_2$ being fed to the TGA and oxidizing the reduced sample according to reaction (2). The subsequent oxygen mass spectrometer signal corresponds with the mass loss in the TGA and reduction of the oxidized sample according to reaction (1). These five redox cycles have been conducted at a constant temperature of 1450° C. and with control (blank) signals subtracted out.

As illustrated, redox using active hercynite cycle materials can be carried out isothermally, a result which is quite different from the simultaneous redox characteristic of the ceria cycle. Isothermal operation provides for significant process advantages including inherent heat recuperation since there are no sensible heat change requirements needed between reduction and oxidation steps. The fact that temperature changes are not required also provides for an opportunity to quickly switch from reduction to oxidation and vice versa, thus, carrying out redox cycling quickly. Another advantage is avoidance of the requirement to separate oxygen from hydrogen as is the case if isothermal redox using ceria was carried out.

For the hercynite cycle, increasing the steam partial pressure increases the rate of isothermal $H_2$ production from $H_2O$ oxidation, or CO production from $CO_2$ oxidation, and slows down the oxide reduction ($O_2$ generation) rate. This stems from the thermodynamics of the system. As the steam or $CO_2$ partial pressure increases the water or $CO_2$, and hence the oxygen, chemical potential on the surface of the oxide increases driving the hercynite cycle oxidation reaction towards the formation of $CoFe_2O_4$, $Al_2O_3$ and $H_2$ or CO and away from the formation of molecular $O_2$. Increasing the $H_2O$ or $CO_2$ partial pressure delays the formation of $O_2$ for similar reasons. Additionally, the high partial pressure of steam ensures that the surface is covered in water and may make it difficult for single O atoms to move around, find another O and form $O_2$, as incoming $H_2O$ molecules are likely to donate H atoms to single O atoms they encounter at the surface.

Differences in Oxidation Behavior Between Ceria, M-Ferrite and Hercynite Cycles

Ceria and the M-ferrite/alumina (i.e., hercynite cycle) exhibit different oxidation behavior when undergoing reduction/oxidation for water or carbon dioxide splitting (see FIGS. 10 and 11). High temperature $CO_2$ or $H_2O$ splitting using reduced $CeO_2$ is characterized by an initially fast simultaneous production of CO and $O_2$ followed by a decrease in the production of both, see FIG. 8a, while the hercynite cycle shows an initially fast CO production which falls off substantially before $O_2$ production is observed, see FIG. 19. This may be explained by the different mechanisms of reduction for each system.

$CeO_2$ reduces and oxidizes quickly without going through a phase change and merely by creating oxygen vacancies, which is normally considered beneficial. On the other hand, for the hercynite cycle, reduction and oxidation is through the solid state reaction between M-ferrite and alumina according to Reactions (1) and (2). During $CeO_2$ oxidation, $H_2O$ or $CO_2$ adsorb to the surface, then dissociate. This is aided by the surface oxygen vacancies which oxygen readily fills, thus, reducing the energy of $CO_2$ reduction to CO or $H_2O$ to $H_2$. As explained for the case of $CO_2$ oxidation, once formed, CO desorbs from the surface and the O diffuses into the $CeO_2$ to fill the oxygen bulk vacancies before the oxygen adatom can recombine with another O adatom and leave the surface as $O_2$. It is believed that at high temperatures, such as that at 1150° C. shown in FIG. 8a, there is sufficient thermal energy for $O_2$ on the surface, created by O adatoms on the surface recombining, to leave the surface causing the high initial rate of $O_2$ (FIG. 10). The initially high rate of CO production (FIG. 9) is due to the initially large number of $CeO_2$ surface vacancies. As time goes on, there are fewer sites for $CO_2$ dissociation leading to a slowing of CO and $O_2$ production. Hence, ceria is an optimal material for simultaneous redox, but not for isothermal redox where $H_2$ and $O_2$, or CO and $O_2$ are produced as separate products separated in time via relative reaction rates.

On the other hand, during hercynite cycle oxidation, O does not have to diffuse into the hercynite (reaction (2)), rather the O, once $CO_2$ or $H_2O$ has dissociated leaving the O on the surface, becomes "covered" by Fe and Co, which migrates from the bulk onto the surface during oxidation. This effectively seals in the O atoms making $O_2$ formation and removal from the surface more difficult. As the oxidation continues, however, Fe and Co migration onto the surface becomes slower because the reduced Co and Fe travel farther distances to reach the surface. This slows down the "oxygen sealing" process. As the oxygen atoms are not sealed in as perfectly or quickly, $O_2$ can more readily leave the surface, allowing for $O_2$ formation as oxidation continues, seen in FIG. 11b. Hence, the hercynite cycle is ideal for isothermal redox where $H_2$ or CO production via $H_2O$ or $CO_2$ oxidation is fast, and then followed by a delayed reduction to produce $O_2$ all at an isothermal temperature (FIG. 19). Such a process can be carried out at an isothermal temperature (FIG. 11b) with a minimal or substantially reduced requirement to separate $H_2$ from $O_2$, or CO from $O_2$. The $H_2$ or CO production is more decoupled from the $O_2$ release (FIGS. 18 and 19).

Differences in Redox Behavior Between Ceria, M-Ferrite and Hercynite Cycles and Impact on Isothermal Redox The isothermal water or $CO_2$ splitting by the hercynite, ceria and ferrite cycles has different behavior and as such, one may choose the material whose chemistry and physics provides the most advantageous characteristics. Hercynite cycle isothermal water splitting exhibits a large initial rate of $H_2$ or CO production, followed by $O_2$ formation (FIGS. 11 and 18, 19, and 30), whereas ceria exhibits large simultaneous $H_2$ and $O_2$ formation (FIGS. 7 to 10). Ceria would require separation of the $H_2$ and $O_2$ at high temperature, whereas the hercynite cycle would avoid this need (FIG. 19). It is believed that ferrite will behave in a similar fashion to the hercynite cycle as they both undergo phase changes during oxidation and reduction. In fact, the results provided in FIG. 12 show that oxidation is fast and reduction is slower and so it is believed that M-ferrite would also be suitable for isothermal redox. Though the ferrite cycle may serve well in isothermal water splitting, e.g., the production of $H_2$ before the production of $O_2$, the temperatures required for ferrite reduction, and hence isothermal water splitting, are close to the formation of a liquid solution, greatly increasing the chances of the ferrites sintering and inhibiting the water or $CO_2$ splitting cycle. Because of this, the hercynite cycle is preferred for operating in an isothermal redox mode and also with a relatively high $H_2O$ or $CO_2$ pressure.

FIG. 31 gas production rate as a function of time for temperature swing and isothermal hercynite processes described herein. As illustrated at 1450° C. isothermal hercynite process, produces more $H_2$ compared to the temperature swing process. In is noted that the $H_2$/g of material can be multiplied by 2.13 to get H2 produced/g of active material. Table 3 below illustrates that At high reduction temperatures, temperature swing $CeO_2$ produces ~equal $H_2$ as isothermal "hercynite cycle" per total g of material ("hercynite cycle" produces about 2× more on active material basis). At low reduction temperatures, isothermal "hercynite cycle" produces ~5× more $H_2$ compared to $CeO_2$ and ~10× more on basis of active material. In addition, the isothermal hercynite cycle produces substantially more $H_2$ than temperature swing "hercynite cycle."

TABLE 3

Water splitting comparisons

| Temp Swing (TS) & Isothermal (IT) (Red/Ox) | $CeO_2$ (μmole/g) | Nano-structured Hercynite (μmole/g) × 2.13/g active | $CeO_2$ Peak Rate (μmole/g/s) | Nano-structured Hercynite Peak Rate (μmole/g/s); × 2.13/g active |
|---|---|---|---|---|
| 1500/1200 | 159.1 ± 15.7 | 93.7 ± 19.2 | 1.28 (avg) | 0.32 (avg) |
| 1350/1000 | 16.4 ± 3.6 | 31.4 ± 2.3 | 0.15 (avg) | 0.03 (avg) |
| 1350/1350 | | 102 ± 18 | | 0.55 ± 0.16 |
| 1450/1450 | | 167.4 (avg) | | 1.34 (avg) |

50% [$H_2O$], at P = 760 Torr

Isothermal Redox Reactor Operations

As described above, the ceria and the hercynite redox cycles behave differently. In carrying out ceria redox at temperatures where simultaneous reduction/oxidation occurs, a significant amount of oxygen is produced at the onset of steam or $CO_2$ injection into the system. However, for the hercynite cycle, oxygen is not produced in water or carbon dioxide splitting until later in the hercynite cycle, thus, allowing for isothermal redox to be carried out most efficiently. Because of these different reaction behaviors and the temporal change in $O_2$ production during gas splitting, several different operation schemes are available to optimize $H_2$/CO production rates during isothermal redox: 1) conventional redox cycling, but under isothermal conditions; 2) the use of a high temperature membrane based $O_2$ separation system to remove any produced $O_2$; 3) the use of a re-generable $O_2$ sorbent that adsorbs $O_2$ and can be regenerated during thermal reduction and 4) the use of a consumable material that reacts with the $O_2$, producing a more desirable product gas.

Figure 20:
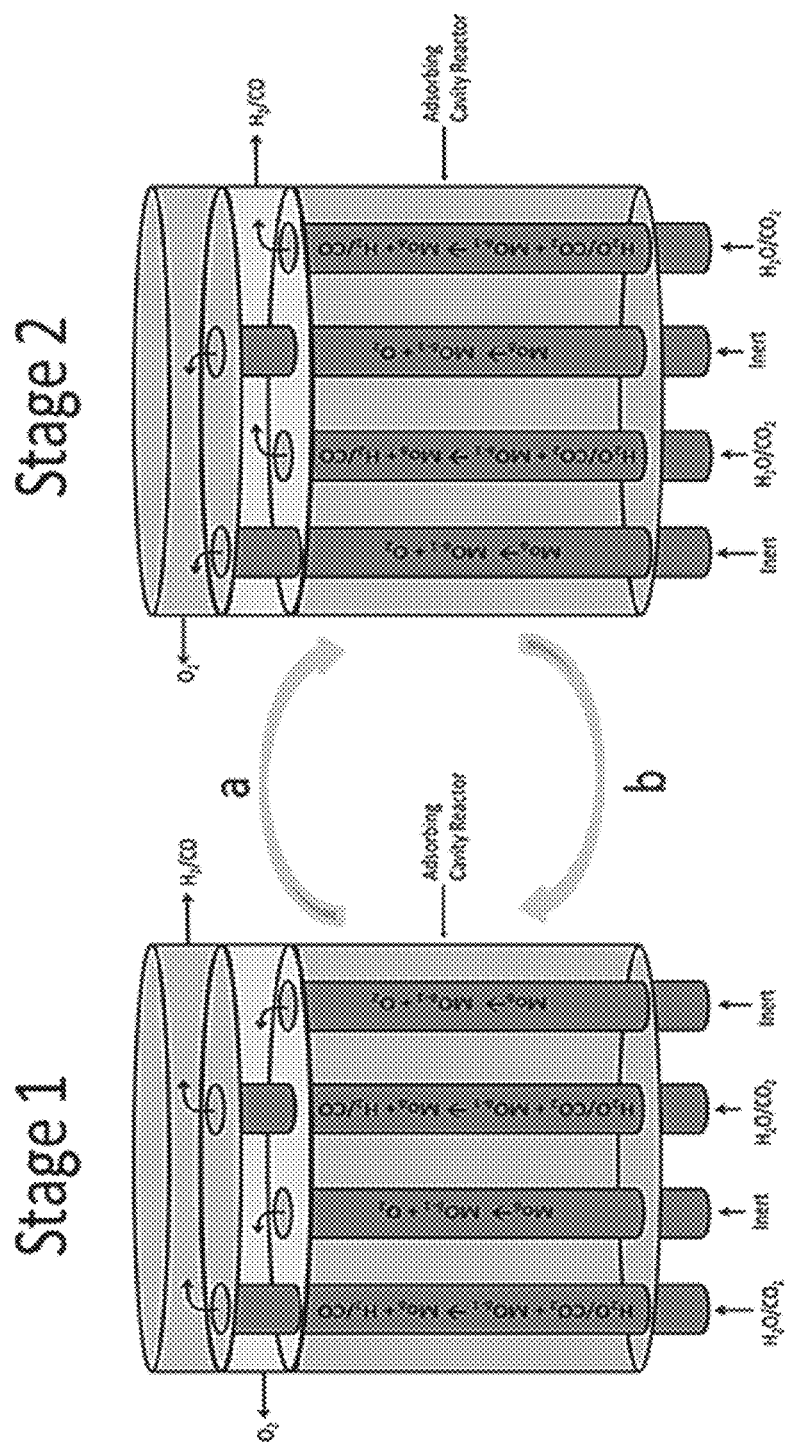
FIGS. 20-22 illustrate isothermal reactor configurations in accordance with exemplary embodiments.

Isothermal redox cycling, shown in FIG. 20 and FIG. 32, takes advantage of the fast reaction and, particularly for the hercynite cycle, the lag in the $O_2$ product during the gas splitting oxidation step, by pulsing either $CO_2$ or $H_2O$ into the system with enough time in between each injection to allow for the active oxide to reduce. By carefully selecting the length of the $H_2O$ or $CO_2$ pulse, one can maintain very high rates of $H_2$/CO production while minimizing simultaneous $O_2$ production during $H_2$ or CO production. By way of example, half or a first number of the reaction tubes are used for thermal reduction and half or a second number for gas splitting (FIG. 20 Stage 1). After the optimal time has passed, meaning significant amounts of $O_2$ are being produced and the $H_2$/CO gas production is decreasing, the inlet flow of $H_2O$ or $CO_2$ is switched from the gas splitting tubes to the reducing tubes and the inert is switched to the newly oxidized tubes to allow for reduction to take place, step a in FIG. 20 creating the Stage 2 configuration. The advantage of the isothermal cycling is that no temperature change is required, and $H_2$/CO and $O_2$ are produced in different steps greatly reducing the amount of gas separation required. Because no temperature change is required, expensive optics necessary to direct sun light from one set of tubes to another is no longer needed. Also, as temperatures are kept constant, or substantially constant, irreversible losses due to heating and cooling of the reactor are minimized, thereby increasing $H_2$ or CO generating efficiencies. Additionally, because the switch is made before significant quantities of $O_2$ are being produced and the initial $H_2$/CO production rates are high, the average rate of $H_2$/CO production per cycle is high. The system illustrated in FIG. 32 includes an oxygen transport membrane 3202 to separate inert gas from oxygen produced by the system. Exemplary oxygen membranes are available from Cermamatec, Inc.

Figure 21:
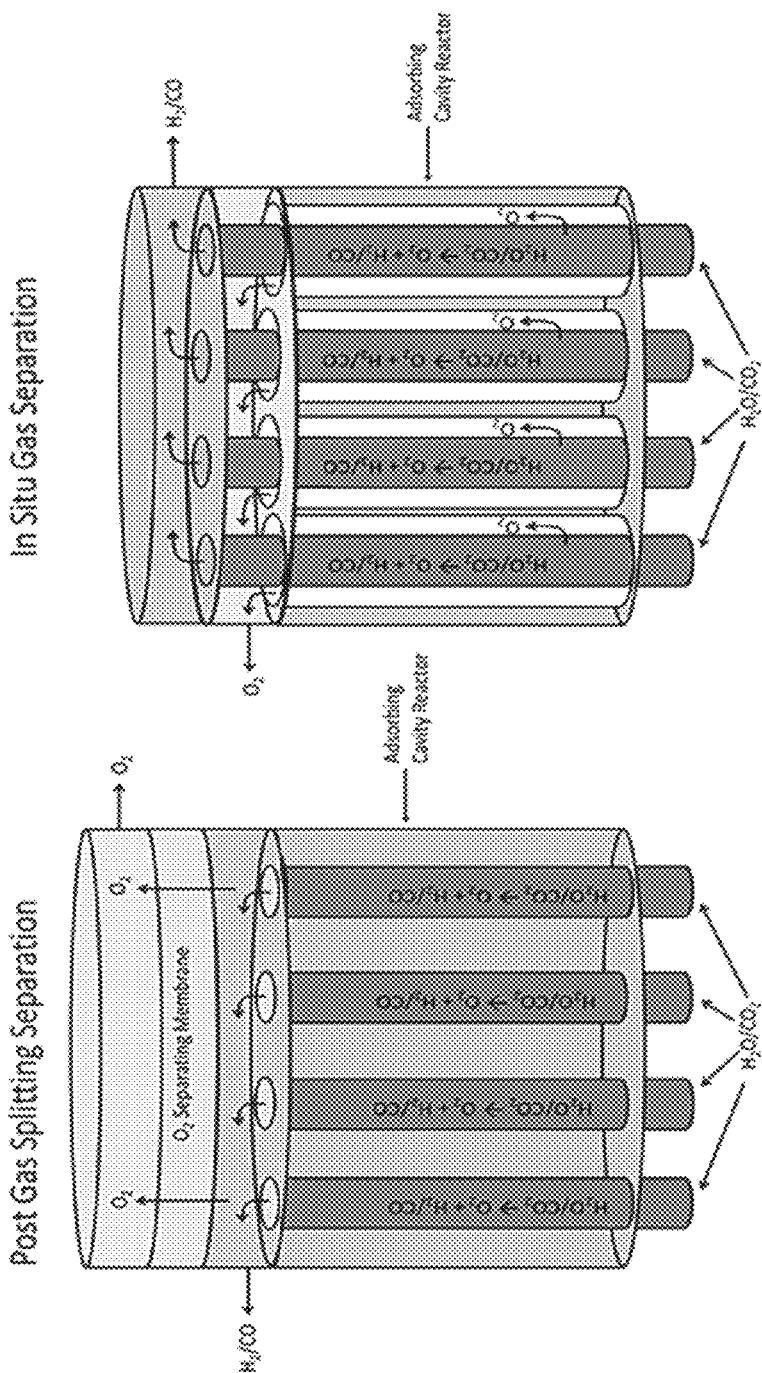

The system can also be run with a built in $O_2$ separation system. By using an oxygen transport membrane, $O_2$ produced simultaneously with CO/$H_2$ can be removed from the system. This effectively solves two problems: (1) it separates out the $O_2$ in-situ making downstream handing of product gasses safer, simpler and cheaper, and (2) it increases the desired gas product production by reducing CO/$H_2$ and $O_2$ recombination which is hypothesized to be responsible for the reduced peak CO/$CO_2$ after short metal oxide re-oxidation periods (FIG. 8), while at the same time favoring higher CO/$H_2$ concentrations at thermodynamic equilibrium. In addition to the benefits described above, high temperature separation of $O_2$ from the product gasses is potentially more economical than at lower temperatures because high temperatures $O_2$ permeable membranes require high temperature operation, the efficiencies of which tend to increase with temperature; such processing would eliminate the need for pressure swing adsorption or distillation to separate $O_2$ from the desired product gasses. The oxygen transport separation membrane can easily be integrated into the gas splitting system, either directly after the gas leaves the reactor or potentially in the reactor itself. In the former case, as shown in FIG. 21, directly after leaving the reactor, the gas comes in contact with any one of a number of oxygen separating membranes such a zeolite or yttria stabilized zirconia (YSZ) membrane, which may require a slight voltage across to help drive the separation. YSZ is a common solid oxide oxygen transport membrane and it is also commonly used in high temperature applications due to its refractory nature. Either the high pressure of the flowing gas or a vacuum can be drawn on the $O_2$ side of the membrane to provide the pressure drop needed to drive separation. In an integrated reactor, shown in FIG. 21, YSZ tubes act not only as the walls containing the reacting gasses and metal oxides, but also as the separation medium. The YSZ tubes are encased in another tube and the space between the tubes as an $O_2$ collection area. Just as with an external separation membrane, either the pressure in the reaction tube or a vacuum can be used to provide the driving force for $O_2$ separation. YSZ is often not employed in high temperature solar applications because of its susceptibility to thermal shock, but in an adsorbing tube cavity under isothermal operation thermal gradients can be kept to a minimum, preventing degradation of the tubes. High temperature separation increases $CO/H_2$ production rates without the need to change between an oxidation and reduction stage, and utilizes the high temperatures required for catalytic gas splitting to provide fast oxygen transfer through the gas separating membrane. Additionally, by integrating the membrane into tubes containing the gas splitting oxide, $O_2$ can be removed in close proximity to its production location reducing the $O_2$ concentration throughout the reactor—amplifying the $O_2$ removal benefits of pushing the oxidation reaction towards products.

Figure 22:
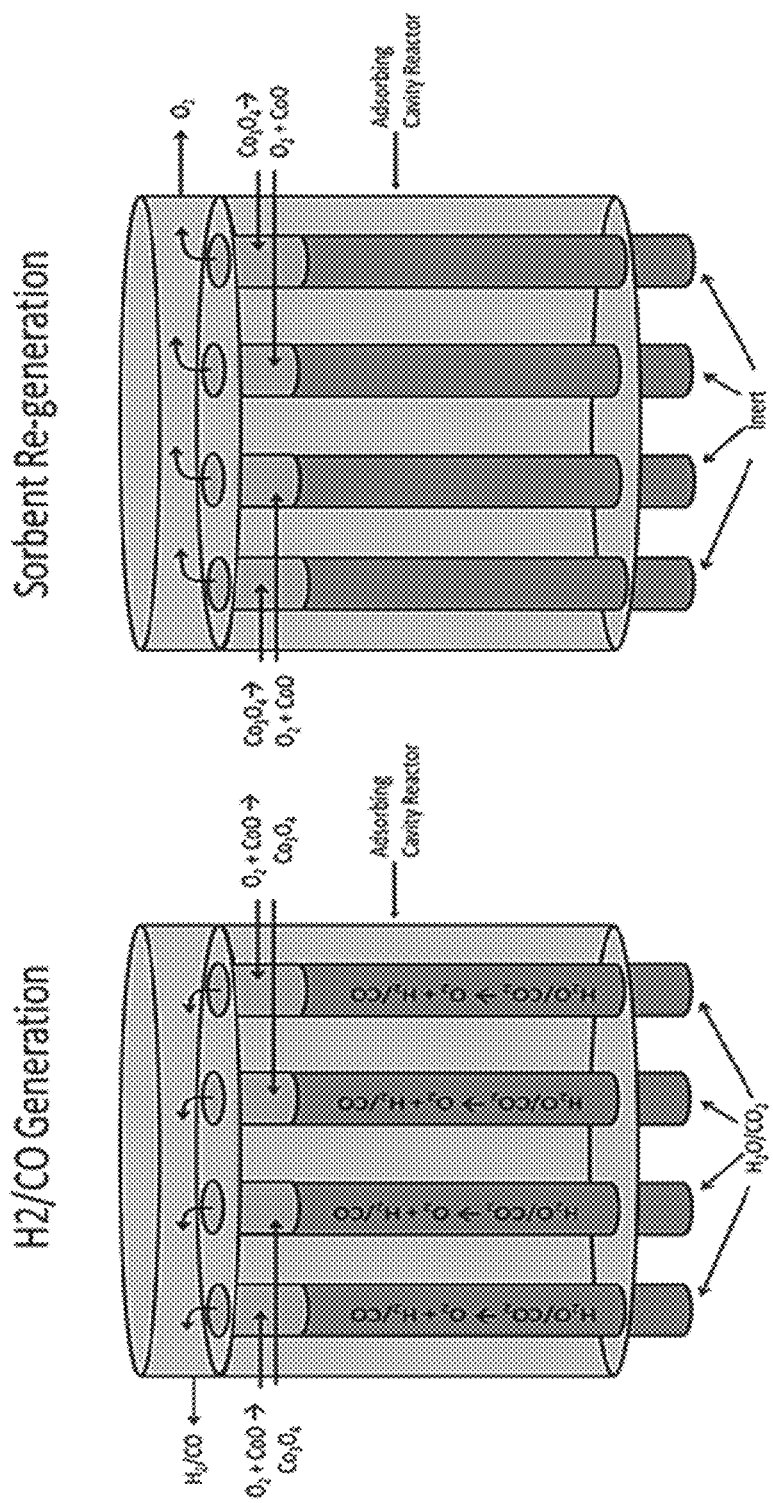

Using an oxygen adsorbent, shown in FIG. 22, can provide similar benefits of a membrane based $O_2$ separation system, increasing $CO/H_2$ production while removing the need for low temperature $O_2$ separation. This system could use an oxide such as, for example, CoO. CoO is then oxidized by $O_2$, not oxidized by $CO_2$ or $H_2O$, producing $Co_3O_4$ which is thermally reducible at the temperatures only slightly higher than those needed for gas splitting. During $H_2$/or CO generation, $H_2O$ or $CO_2$ flows through the system generating $O_2$ and the desired product gasses. As the gas continues through the reactor it comes in contact with the sorbent, and upon exposure to the $O_2$, CoO oxidizes to $Co_3O_4$ removing the $O_2$ from the product stream, as shown in FIG. 22a. Once the $Co_3O_4$ becomes saturated, the $H_2O$ or $CO_2$ stream can be stopped and the temperature increased slightly causing both the $Co_3O_4$ and active oxide to reduce, regenerating both the adsorbent and the active oxide, shown in FIG. 22 b. Using an oxygen adsorbent would remove the need for expensive membranes or vacuum systems, while still achieving $O_2$ separation. The adsorbent method may be especially useful in combination with the isothermal water splitting method, by extending the viable $CO/H_2$ production times.

A reactor embodiment that incorporates a consumable material that is capable of upgrading the product gas stream might use a carbonaceous material to produce a CO product gas stream. In a reactor design where reduction gasses (inert and $O_2$) from half of the reaction chambers are directed towards one stream and oxidation gasses ($H_2$ or CO) directed towards another, a reaction vessel that contains a consumable reactant could be used to react with the reduction gas stream. For example biomass or biochar can be replenished in a reduction gas vessel that converts the $O_2$ product, to a more desirable CO stream. This embodiment can increase the overall usable gas production capacity and increase process efficiency by utilizing the latent heat in the reduction gas stream to carry out the carbonaceous reaction.

The afore described reactor operation techniques work to increase the general efficiency of the isothermal $CO_2/H_2O$ redox process by eliminating the need for low temperature separation of $O_2$ and the desired $CO/H_2$, and increasing the average $CO/H_2$ production rate by reducing recombination either directly by conventional redox switching between reaction tubes, or by removing $O_2$ from the effluent gas stream with the use of an in-situ oxygen transport membrane, oxygen adsorbent, or consumable reactant.

Turning now to FIG. 33, another reactor 3330, suitable for solar, isothermal gas-phase reduction/oxidation, is illustrated. Reactor 3300 may use any of the reactants and active redox or high surface area material described herein. However, rather that material coated on porous high surface area material, the active material may be coated onto or comprise nanoparticles—e.g., have average diameters in the range of about 20, 40, 60, 80, 100, 200, 300, or 500 nm. In operation, active or redox particles enter at the bottom of the reduction zone 3302 and flows upward and the reduction process takes place very fast. The oxygen produced will be removed by a membrane system 3304 installed downstream and the redox particles will follow to the oxidation zone 3306. The oxidation process of the particles will take place by introducing steam from the bottom and produced hydrogen and excess steam will exit the reactor and enters a heat exchanger to condense the excess steam. Although illustrated with a inert gas (helium) in both zones 3302, 3306, the inert gas is not required in oxidation zone 3306. Filters 3308, 3310 allow the inert gas to be separated from particles and recycled back to the system. Potential advantages of the reactor 3300 include: providing an efficient heat transfer to the entrained particles, and the particles will be preheated in the oxidation zone and take advantage of the exothermic reaction.

As noted above, various redox reactions noted herein may be performed using a solar reactor. FIGS. 23-25 illustrate additional solar reactors suitable for use in accordance with exemplary embodiments of the disclosure. FIG. 23 illustrates a system 2300, including reactor tubes 2302, 2304. In the illustrated example, concentrated solar energy 2306 is provided to a cavity 2308 through an aperture 2310. FIG. 24 illustrates a reactor system 2400, including reactor tubes 2402, 2404. System 2400 is similar to system 2300, except concentrated solar energy 2406 is provided to a cavity 2408 through an aperture 2410.

FIG. 25 illustrates a system 2500, which includes multiple reactor tube assemblies 2506, each assembly including an inner tube 2502 and an outer tube 2504. As shown in this figure, the bottom end of the outer tube is closed and the bottom end of the inner tube is porous, establishing a stagnation flow reactor configuration. Active redox material (e.g., metal oxide or reduced metal oxide on a porous support structure) (sometimes referred to herein as active material) is located within the annular region between the two tubes, allowing for efficient heat and mass transfer and consequently, fast overall kinetics. The inner tube may be packed with porous media providing increased surface area for heat transfer, for example, to drive the vaporization of water to steam. In the embodiment shown in FIG. 25, water or another reactant flows downward through the inner tubes of the tube assemblies operating in oxidation mode before exiting the inner tube and moving upwards through the supported reduced metal oxide in the annular space between the tubes. Hydrogen gas, the product of the oxidation reaction, exits the annular space between the tubes in the oxidation tube assemblies. As illustrated, inert gas or air may be provided to the inner tubes of the tube assemblies operating in reduction mode. This inert gas or air acts as a sweep gas help remove oxygen gas, the product of the reduction reaction, from the reduction tube assemblies. Concentrated solar energy 2508 may be provided to a cavity 2510 via an opening 2512.

A method of splitting a gas phase reactant using a solar reactor in accordance with exemplary embodiments of the disclosure includes the steps of a) providing a reactor comprising i) a cavity, the wall of the cavity being thermally insulated and opaque and comprising an aperture for entry of concentrated solar radiation, the aperture optionally comprising a window; ii) a number of reactor tube assemblies at least partially located within the cavity wherein each of reactor tube assemblies is part of either a first or a second set of reactor tube assemblies, the number of reactor tube assemblies in the first and second sets may be equal; iii) active material (e.g., metal oxide) located within the first set of the reactor tube assemblies; iv) a reduced form of the active material of step c) (e.g., reduced metal oxide) located within the second set of the reactor tube assemblies; b) operating the reactor in a first mode during a first reaction period, wherein in the first mode the reduction reaction simultaneously occurs in the first set of reactor tube assemblies and the oxidation reaction occurs in the second set of reactor tube assemblies, the reactor being operated in the first mode by i) heating the first set of reactor tube assemblies at least in part by exposing the reactor to a source of concentrated sunlight so that at least a portion of the active material in the first set is maintained at a reduction temperature (or within a reduction temperature range), thereby forming reduction reaction products comprising the reduced metal oxide and oxygen; ii) contacting at least a portion of the reduced active material in the second set of reactor tube assemblies with an oxidizing agent; iii) heating the second set of reactor tube assemblies at least in part by exposing the reactor to a source of concentrated sunlight so that at least a portion of the reduced metal oxide in the second set is maintained at an oxidation temperature (or within an oxidation temperature range) thereby forming oxidation reaction products comprising e.g., metal oxide and a gaseous oxidation reaction product; iv) removing the oxygen formed in step b i) and the gaseous oxidation products formed in step b iii) from the reactor tube assemblies; c) operating the reactor in a second mode during a second reaction period, wherein in the second mode the reduction reaction occurs in the second set of reactor tube assemblies and the oxidation reaction occurs in the first set of reactor tube assemblies, the reactor being operated in the second mode by i) contacting at least a portion of the reduced active material in the first set of reactor tube assemblies with an oxidizing agent, wherein the oxidizing agent is in the form of a gas or vapor; ii) heating the first set of reactor tube assemblies at least in part by exposing the reactor to a source of concentrated sunlight so that at least a portion of the reduced active material in the first set is maintained at the oxidation temperature (or within the oxidation temperature range), thereby forming oxidation reaction products comprising the active material and a gaseous oxidation reaction product; iii) heating the second set of reactor tube assemblies at least in part by exposing the reactor to a source of concentrated sunlight so that at least a portion of the active material in the second set is maintained at the reduction temperature (or within a reduction temperature range) thereby forming reduction reaction products comprising the reduced active material and oxygen; and iv) removing the oxygen formed in step c iii) and the gaseous oxidation products formed in step c ii) from the reactor tube assemblies.

The reactant to be reduced may be supplied to the reaction tube assembly in gas or vapor form. Alternatively, a reactant such as water may be converted to vapor form within the reaction tube assembly. The reactant to be reduced may be provided as part of a gas mixture. For example, the reactant may be provided in a carrier gas such as air or an inert gas which does react significantly with the reduced metal oxide at the oxidation temperature range.

Oxygen may be removed from the reactor tube assembly by using a compatible gas stream (i.e., inert gas, or a gas stream containing a lesser amount of oxygen such as air) to sweep it out. Additionally or alternatively, a downstream vacuum pump may be used to remove the oxygen as it is released via the thermal reduction process. Or, an oxygen membrane or adsorbent as described herein may be used to remove the oxygen.

In accordance with some embodiments, the reaction tube assemblies operate at greater than ambient pressure. By way of example, the reaction tubes are targeted to operate at about 300 psig in order to supply a plant gate $H_2$ pipeline.

Exemplary methods may further include a step of switching the reactor from the first mode to the second mode by bringing the temperature of at least a portion of the reduced metal oxide in the first set of reactor tube assemblies to the oxidation temperature (or within the oxidation temperature range) and bringing the temperature of at least a portion of the reduced metal oxide in the second set of reactor tube assemblies to the reduction temperature or within the reduction temperature range), or operating the reactor in an isothermal or substantially isothermal mode. The lower temperature of oxidation may be controlled primarily by the flow of water/steam and/or $CO_2$ through the active material. A time for each cycle (completion of first and second mode) may be, for example, from 1 to 15 minutes, from 1 to 10 minutes, or from 1 to 5 minutes, or less.

Exemplary methods may also include a step of monitoring gases exiting the reactor tube assemblies. Such monitoring allows determination of when the oxidation and/or reduction reaction is near completion (and when the reactor modes can be switched). For example, when an amount or concentration of reduced oxidizing agent exiting the tube assemblies operating in oxidation mode approaches zero or some other predetermined setpoint (e.g., 1%, 5%), the oxidation reaction may be judged to be near completion. Similarly, when an amount or concentration of oxygen exiting the reactor tube assemblies operating in reduction mode approaches zero or some other predetermined setpoint (e.g., 1%, 5%) the reduction reaction may be judged to be near completion. The concentration may be judged by any analytical technique known to those skilled in the art, including, but not limited to, mass spectrometry, gas chromatograph, or thermal conductivity.

In accordance with yet additional embodiments of the disclosure, a method for simultaneously performing an oxidation and a reduction reaction includes the steps of: a) providing a reactor comprising i) a cavity, the wall of the cavity being thermally insulated and opaque and comprising an aperture for entry of concentrated solar radiation, the aperture optionally comprising a window; ii) a number of reactor tube assemblies at least partially located within the outer cavity, and wherein some (e.g. half) of the reactor tube assemblies comprise a metal oxide material (the metal oxide) and some other (e.g., the other half) of the reactor tube assemblies comprise a reduced form of the metal oxide material (the reduced active material); b) conducting the reduction reaction by i) heating the active material at least in part by exposing the reactor to a source of concentrated sunlight so that at least a portion of the active material is maintained at a reduction temperature thereby forming reduction products comprising the reduced active material and oxygen; ii) removing the oxygen formed in step b i); c) conducting the oxidation reaction by i) contacting an oxidizing agent with at least a portion of the reduced active material; ii) heating at the reduced active material at least in part by exposing the reactor to a source of concentrated sunlight so that at least a portion of the reduced active material is maintained at an oxidation temperature thereby forming oxidation products comprising the active material and a gaseous oxidation product; and iii) removing the gaseous oxidation products.

In accordance with exemplary aspects of these embodiments, the oxidizing agent is water vapor, the oxidation reaction comprises reaction of the reduced metal oxide with the water vapor to produce the metal oxide and hydrogen and the oxidation and reduction reactions together form a two-step water splitting cycle. In accordance with other aspects, the oxidizing agent is carbon dioxide, the oxidation reaction comprises reaction of the reduced metal oxide with carbon dioxide to produce the metal oxide and carbon monoxide and the oxidation and reduction reactions together form a two-step carbon dioxide splitting cycle. In accordance with further aspects, the reduced metal oxide is reacted with a combination of water vapor and carbon dioxide. In this case, a molar ratio of $H_2$ to CO may desirable be from 0.5 to 2.5, 0.75 to 2.25 or 1.0 to 2.0. Generally, it may be desirable to produce a synthesis gas having a molar $H_2$ to CO ratio of 1:1 for Fischer-Tropsch downstream synthesis and 2:1 for producing methanol.

In accordance with further exemplary embodiments, the oxidizing agent is air and the oxidation reaction includes a reaction of the reduced active material with air to produce the active material and a product gas enriched in nitrogen. In accordance with various aspects of these embodiments, less than 5% or less than 1% of oxygen remain in the product gas. The amount of oxygen remaining in the product gas depends in part on the mass flow rates and reaction kinetics. Argon and other typical components of air may remain in the product gas exiting the reactor tube. The oxidation and reduction reactions together form a two-step air separation cycle. Pure or concentrated $N_2$ and $O_2$ are valuable commodities, and $O_2$ is especially needed for autothermal gasification and oxy-combustion. In other embodiments, $NO_x$ may be reduced to $N_2$ and $SO_3$ reduced to $SO_2$, wherein x is a positive integer, e.g., 1 or 2.

Metal oxides suitable for use as active material are compounds including or consisting essentially of one or more metals and oxygen, wherein the compounds are solid at room temperature, such as the ceria, M-ferrite and M-ferrite on alumina (hercynite) materials described above. In an embodiment, the impurity level of these materials is less than or equal to 1%. As noted above, metal oxide materials suitable for use with the methods and apparatus of the disclosure can be cycled between lower and higher oxidation or valence states multiple times. The metal oxide may be described by a single chemical formula or may be a combination of chemically different oxide materials.

The active material may be located on a porous supporting substrate material. Supporting materials include, but are not limited to alumina, zirconia, and ceria. The porous substrate material can be inert and inactive or an active material. Inert supporting substrate materials include, but are not limited to zirconia ($ZrO_2$). Active supporting substrate materials include, but are not limited to, alumina ($Al_2O_3$). The support material may be a porous packed bed of particles or a porous structure. In different embodiments, the particles may be porous or nonporous. The packed bed of particles or porous structure may desirably be sufficiently porous that gas can flow through without a substantial pressure drop. In addition, the presence of large pores in the substrate can allow heat transfer through radiation within the pores. By way of specific examples, the supporting material has a surface area of 1-1000 m2/g.

Suitable porous structures include, but are not limited to honeycombs, foams, reticulated ceramics, or a felt or other structure formed of refractory fiber. The porous structure may be placed into the reactor tube assembly or may be formed in situ. One method for forming a porous structure inside a reactor tube assembly can involve placing a hybrid inorganic/organic material inside the reactor tube assembly then removing the organic component, leaving behind a porous inorganic substrate, as described above.

In accordance with further exemplary embodiment of the disclosure, a solar reactor system includes: a) a cavity, the wall of the cavity being thermally insulated and opaque and comprising an aperture for entry of concentrated solar radiation, the aperture optionally comprising a window; b) at least two reactor tube assemblies at least partially located within the cavity, each reactor tube assembly comprising a nonporous outer sidewall, each reactor tube assembly being part of either a first or a second set of reactor tube assemblies, wherein the total number of reactor tube assemblies may be an even number, the number of reactor tube assemblies in the first and second sets may be equal and the reactor tube assemblies are not separated from each other by partitions; c) a supply system in fluid communication with an inlet of each reactor tube assembly; and d) an extraction system in fluid communication with an outlet of each reactor tube assembly.

Generally, the solar reactor systems in accordance with these embodiments include a cavity, which may also be termed a cavity-receiver. The cavity-receiver may be a well-insulated enclosure with an aperture for access of concentrated solar energy, the aperture size being small relative to the surface area of the inner cavity wall. In an embodiment, a single cavity-receiver is used, and the single cavity-receiver includes at least one aperture for entry of concentrated solar radiation into the cavity. The aperture may include an opening in the reactor wall, and may optionally comprise a window at least partially covering an opening in the reactor wall, the window allowing transmission of solar radiation. In an embodiment, a single aperture for entry of solar radiation is provided. The non-aperture portions of the cavity wall may be thermally insulating and opaque to radiation. In an embodiment, the non-aperture portions of the cavity wall are opaque to radiation in the wavelength range 200 nm to 20 micrometers.

In accordance with various aspects of these embodiments, the cavity-receiver is able to efficiently capture incoming concentrated solar energy due to multiple inner reflections. The larger the ratio of inner cavity area to the solar radiation aperture area, the closer the cavity receiver approaches a blackbody absorber (apparent absorptance approaching unity), but at the expense of higher conduction losses through the insulated cavity wall. Smaller apertures can also reduce re-radiation losses, but they intercept less sunlight. Consequently, the optimum aperture size becomes a compromise between maximizing radiation capture and minimizing radiation losses. To some extent, the aperture size may be reduced with the help of non-imaging secondary concentrators, e.g. compound parabolic concentrators (CPC), placed at the receivers' aperture in tandem with the primary concentrating system. Optionally, the aperture may be closed to the atmosphere with a transparent window to eliminate convective losses and allow for controlled atmospheres (e.g. non-oxidizing atmosphere) inside the cavity receiver.

Cooling zones may encircle at least one of the top, bottom, front, back, and aperture/secondary concentrator of the receiver.

Typically, the solar radiation aperture and the source of concentrated solar energy is "aligned" or positioned so that concentrated solar energy can enter the cavity. In an embodiment, at least one of the reactor tube assemblies is positioned so that concentrated solar radiation is directly incident upon the reactor tubes.

The cavity-receiver may also comprise inlets or ports to allow flow of reactant and product gases into and out of the reactor tube assemblies. The cavity may also comprise inlets or ports to permit physical and optical access for measurement of temperatures.

In accordance with exemplary embodiments, the cavity is elongated along a longitudinal axis. Alternatively, the cavity-receiver may be of cylindrical shape with a circular or elliptical cross section. The inner surface of the cavity may desirably be capable of absorbing and re-emitting radiation. In another embodiment, the inner surface of the outer shell may reflect solar radiation (in particular radiation in the visible range) and infrared radiation.

The solar reactor systems of the disclosure may include a plurality of reactor tube assemblies, which are not concentric to each other and are arranged so that the outer side walls of the reactor tube assemblies are not in contact with each other. When more than two reactor tube assemblies are present, the reactor tube assemblies operating in oxidation mode may be grouped together in one portion of the cavity or they may be intermixed with the tube assemblies operating in reduction mode. In an embodiment, each reactor tube assembly has a longitudinal axis parallel to the longitudinal axis of the outer cavity.

A reactor tube assembly may comprise a nonporous sidewall, thereby preventing leakage of reactants and/or products from sides of the reactor tube assembly during operation. Generally, each reactor tube assembly comprises at least one tube. When the reactor tube assembly includes only one tube, the outer wall of that tube forms the sidewall of the assembly. The reactor tube assembly may also include nested tubes, in case the outer wall of the outmost tube forms the sidewall.

In accordance with exemplary embodiments, the reactor tube assembly comprises an outer tube and an inner tube located within the outer tube, the active material (e.g., metal oxide or reduced metal oxide) being located in the annular space between the inner and outer tube. In an embodiment, the end of the outer tube at a first end of each reactor tube assembly is sealed and the inlet and outlet are located at the second end of the reactor tube assembly. The end of the inner tube at the first end of each reactor tube assembly may be closed to movement of solids, but sufficiently porous to allow gas flow. For example, the end of the inner tube may be capped by a porous plug.

The tubes of the reactor tube assembly may be made of a material having relatively low thermal conductivity and capable of withstanding high temperatures. Such materials include ceramic materials. Suitable ceramic materials include, but are not limited to, silicon carbide, zirconia, hafnia, and alumina.

A net thermal energy absorbed by the reactor tube assemblies may be transferred to the reaction site by combined conduction, convection, and radiation heat transfer. Heat transfer within the reactor may be improved by the presence of a packed bed of particles or a porous material (e.g., having a surface area of 1-1000 m2/g) in the inner tube of the reactor tube assembly. The particles or porous material may be a refractory inorganic material such as alumina, zirconia, silicon carbide, or a silica aerogel.

The packed bed of particles or porous material in the inner tube of the reactor tube assembly may also remove impurities from the reactant gases. This sacrificial material can prevent degradation of the active oxide within the annular region between tubes.

The reactor may include a supply system for feeding a plurality of reactants and/or sweep gases into the reactor tube assemblies, the supply system being in fluid communication with an inlet of each reactor tube assembly. In an embodiment, the supply system includes pipes, tubing or other gas flow channels and a valving system or manifold.

The reactor may also include an extraction system for removing product gases and/or sweep gases the reactor tube assemblies, the extraction system being in fluid communication with an outlet of each reactor tube assembly. In an embodiment, the extraction system includes pipes, tubing or other gas flow channels and a valving system or manifold. At least part of the extraction system may be connected to a source of reduced pressure, such as a vacuum pump.

Exemplary solar reactor systems may also include systems for analyzing the composition of product and/or feed gases. In line analytical techniques suitable for use with the exemplary systems include, but are not limited to, gas chromatography, thermal conductivity based detectors and mass spectrometry. Such analysis systems may be connected to the supply and/or extraction systems.

The sunlight can be provided in the form of a collimated beam (spot) source, a concentric annular source distributed circumferentially around the reactor, or in the form of a linearized slot source providing heating axially along the length of reactor. The light can be redirected and focused or defocused with various optical components to provide the concentration on or in the reactor as required. In an embodiment, the concentrated solar radiation is further concentrated by a secondary concentrating reflector before entering the reactor.

The reactor system may further comprise a heat exchanger coupled to the extraction system. The sensible heat of the hot gaseous streams exiting the cavity-receiver can thus be recovered via the heat exchanger(s) and used to vaporize reactants and/or preheat the gaseous streams to the operating temperatures.

The solar reactor system may be designed at least in part through a combination of theoretical, computational investigations and experimental validation. In an embodiment, a steady state, three dimensional computational fluid dynamics (CFD) model of the reactor can be developed using finite volume methods. Commercial software such as Fluent (ANSYS, Ann Arbor, Mich.) may be used. Radiation heat transfer can be incorporated into the CFD models via a discrete ordinates method in which the radiative transfer equation is transformed into a transport equation for the radiation intensity contained within a specified number of discrete solid angles and solved using finite volume schemes[61, 63-65]. Another approach to solve the radiative exchange is to use the Monte-Carlo ray-tracing technique. A gray band model consisting of at least two wavelength bands can be employed both to account for spectral behavior of the optical properties, and to separate the shorter-wavelength solar radiation from the longer-wavelength emission from the heated tubes. All spectral optical properties can be averaged and assumed constant over the wavelengths contained in each band, but allowed to vary between bands. The tube walls can be treated as opaque, diffuse surfaces. This radiation model can provide the radiation intensity at any point in the receiver and correspondingly, the energy incident on and absorbed by each tube surface. Coupled with convective and conductive heat transfer models, the temperatures of each tube surface can be obtained and the distribution of temperatures between the various tubes in the receiver can be evaluated.

Solar flux boundary conditions at the aperture surface can be determined from ray trace modeling using the ray trace program such as Soltrace[66] (developed by NREL). These results can be used to determine both the magnitude and direction of the concentrated solar radiation entering the receiver window as a function of position over the aperture/window surface. Detailed knowledge of the vector direction of rays arriving at the receiver aperture/window can allow for accurate calculations of the energy intercepted by each tube.

In an embodiment, the solar reactor system may be integrated with a control system. In an embodiment, the control system is a model predictive control system (MPC), which uses a model of the process in order to obtain the control signal by minimizing an objective function[71]. The model-based control system is designed and implemented to maximize reactor productivity given the inevitable variations in solar energy flux resulting from seasonal and daily variations, cloud cover and air transparency [68-70]. In accordance with an exemplary embodiment, the model-based control system may be developed through: (1) the development of a simplified dynamic model of the system and the validation of this model with experimental data, (2) the development of an algorithm that predicts solar irradiation using digital images of the sky in combination with atmospheric measurements, (3) the design and implementation of the model-based predictive control algorithm, and (4) the integration of the modules into a functioning prototype control system.

In an embodiment, digital images of the clouds may be used to predict the incoming solar irradiation at future horizons and thus the predicted outputs of the process. A digital charge-coupled device (CCD) system can be used to capture images of the sky. These images can be analyzed using pattern recognition software and can be used in combination with meteorological data to predict the incoming solar irradiation at future instances [73, 74]. The solar irradiation predictions can then be sent to the model predictive controller that can determine the required manipulation to the process in order to maximize the hydrogen production.

In solar thermal processes a major cost is the collection and management of heat, in particularly the heliostats and towers. This cost is proportional to the collection area required and as a consequence, increased plant efficiency results in capital and production cost savings. Therefore, it is desirable to optimize solar thermal processes which employ the methods and devices of the disclosure. The flowsheet design and process optimization are expected to be significantly different from traditional chemical or power plants.

In an embodiment, a computational simulation (e.g., using AspenPLUS, AspenTech, Burlington, Mass.) can be developed for the process and can provide material and energy balances required for equipment design, cost estimation and economic analysis. The DOE H2A program may be used in the analysis. The simulation and economic analysis can be continually updated as new information is acquired relative to the process. A life cycle analysis can also be carried out. The purity of water required for the process can be addressed and a process control methodology can be developed and tested.

In an embodiment, the concentrated solar energy may be supplied by a large scale power tower type system. Large scale power tower type systems take advantage of the economy of scale (5 towers surrounded by 2.3 million $m^2$ of heliostat) where competing distributed dish based systems would require 7,500 dishes of 200 $m^2$ each (16 m diameter) to produce the equivalent amount of $H_2$. Preliminary design indicates that five ~250 m tall towers driven by a total of 2.3 million $m^2$ of heliostats can be integrated for a full 100,000 kg $H_2$/day production plant of the solar receiver/reactor and heliostat field array with tower for a central 100,000 kg H2/day facility.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Every formulation or combination of components described or exemplified can be used to practice the invention, unless otherwise stated. Specific names of compounds are intended to be exemplary, as it is known that one of ordinary skill in the art can name the same compounds differently. One will appreciate that methods, device elements, starting materials, and synthetic methods, other than those specifically exemplified can be employed in the practice of the invention without resort to undue experimentation. All art-known functional equivalents, of any such methods, device elements, starting materials, and synthetic methods, and are intended to be included in this invention. Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The following definitions are provided to clarify their specific use in the context of the invention.

The present invention has been described above with reference to a number of exemplary embodiments and examples. It should be appreciated that the particular embodiments shown and described herein are illustrative of the invention and its best mode and are not intended to limit in any way the scope of the invention. It will be recognized that changes and modifications may be made to the exemplary embodiments without departing from the scope of the present invention. These and other changes or modifications are intended to be included within the scope of the present invention.

1. Scheffe, J. R., J. H. Li, and A. W. Weimer, *A spinel ferrite/hercynite water-splitting redox cycle*. International Journal of Hydrogen Energy, 2010. 35(8): p. 3333-3340.

2. Chueh, W. C., et al., *High-Flux Solar-Driven Thermochemical Dissociation of CO(2) and H(2)O Using Nonstoichiometric Ceria*. Science, 2010. 330(6012): p. 1797-1801.

3. Chueh, W. C. and S. M. Haile, *A thermochemical study of ceria: exploiting an old material for new modes of energy conversion and CO(2) mitigation*. Philosophical Transactions of the Royal Society a-Mathematical Physical and Engineering Sciences, 2010. 368 (1923): p. 3269-3294.

4. Kodama, T., N. Gokon, and R. Yamamoto, *Thermochemical two-step water splitting by ZrO2-supported NixFe3-xO4 for solar hydrogen production*. Solar Energy, 2008. 82(1): p. 73-79.

5. Liang, X. H., N. H. Li, and A. W. Weimer, *Template-directed synthesis of porous alumina particles with precise wall thickness control via atomic layer deposition*. Microporous and Mesoporous Materials, 2012. 149(1): p. 106-110.

6. Scheffe, J. R., et al., *Atomic layer deposition of iron(III) oxide on zirconia nanoparticles in a fluidized bed reactor using ferrocene and oxygen*. Thin Solid Films, 2009. 517(6): p. 1874-1879.

7. Lewandowski, A., et al., *PERFORMANCE CHARACTERIZATION OF THE SERI HIGH-FLUX SOLAR FURNACE*. Solar Energy Materials, 1991. 24(1-4): p. 550-563.

8. Perkins, C., and A. W. Weimer, "Solar-Thermal Production of Renewable Hydrogen", AIChE Journal Vol. 55, No. 2, 2009, pp. 286-293.

9. Kodama, T., N. Gokon, and R. Yamamoto, "Thermochemical two-step water splitting by ZrO2-supported NixFe3-xO4 for solar hydrogen production", Solar Energy Vol. 82, No. 1, 2008, pp. 73-79.

10. Kodama, T., Y. Kondoh, R. Yamamoto, H. Andou, and N. Satou, "Thermochemical hydrogen production by a redox system of ZrO2-supported Co(II)-ferrite", Solar Energy Vol. 78, No. 5, 2005, pp. 623-631.

11. Kodama, T., Y. Nakamura, and T. Mizuno, "A two-step thermochemical water splitting by iron-oxide on stabilized zirconia", Journal of Solar Energy Engineering-Transactions of the Asme Vol. 128, No. 1, 2006, pp. 3-7.

12. Scheffe, J. R., J. Li, and A. W. Weimer, "A spinel ferrite/hercynite water-splitting redox cycle", International Journal of Hydrogen Energy Vol. (doi:10.1016/j.ijhydene.2010.01.140), 2010, 35, pp. 3333-3340.

13. Abanades, S., and G. Flamant, "Thermochemical hydrogen production from a two-step solar-driven water-splitting cycle based on cerium oxides", Solar Energy Vol. 80, No. 12, 2006, pp. 1611-1623.

14. Chueh, W. C., and S. M. Haile, "Ceria as a Thermochemical Reaction Medium for Selectively Generating Syngas or Methane from H2O 2O and CO2", Chemsuschem Vol. 2, No. 8, 2009, pp. 735-739.

15. Singh, P., and M. Hegde, "Ce0.67CrO.3302.11: A new low temperature O2 evolution material and hydrogen generation catalyst by thermochemical splitting of water", Chemistry of Materials Vol. 22, No. 3, 2010, pp. 762-768.

16. Hasuike, H., Y. Yoshizawa, A. Suzuki, and Y. Tamaura, "Study on design of molten salt solar receivers for beam-down solar concentrator", Solar Energy Vol. 80, 2006, pp. 1255-1262.

17. Wang, L., T. Maxisch, and G. Ceder, "Oxidation energies of transition metal oxides within the GGA+U framework", Physical Review B Vol. 73, No. 19, 2006.

18. Wang, L., T. Maxisch, and G. Ceder, "A first-principles approach to studying the thermal stability of oxide cathode materials", Chemistry of Materials Vol. 19, No. 3, 2007, pp. 543-552.

19. Ceder, G., P. D. Tepesch, A. F. Kohan, and A. Van der Ven, "A model to predict ionic disorder and phase diagrams: Application to CaO—MgO, Gd2O3-ZrO2, and to sodium beta "-alumina", Journal of Electroceramics Vol. 1, No. 1, 1997, pp. 15-26.

20. Mukhopadhyay, A. B., C. B. Musgrave, and J. F. Sanz, "Atomic layer deposition of hafnium oxide from hafnium chloride and water", Journal of the American Chemical Society Vol. 130, No. 36, 2008, pp. 11996-12006.

21. Mukhopadhyay, A. B., J. F. Sanz, and C. B. Musgrave, "First-principles investigation of hydroxylated monoclinic HfO2 surfaces", Chemistry of Materials Vol. 18, No. 15, 2006, pp. 3397-3403.

22. Pornprasertsuk, R., P. Ramanarayanan, C. B. Musgrave, and F. B. Prinz, "Predicting ionic conductivity of solid oxide fuel cell electrolyte from first principles", Journal of Applied Physics Vol. 98, No. 10, 2005.

23. Hybertsen, M. S., and S. G. Louie, "1ST-PRINCIPLES THEORY OF QUASIPARTICLES—CALCULATION OF BAND-GAPS 1N SEMICONDUCTORS AND INSULATORS", Physical Review Letters Vol. 55, No. 13, 1985, pp. 1418-1421.

24. Ferguson, J. D., A. W. Weimer, and S. M. George, "Atomic layer deposition of ultrathin and conformal Al2O3 films on BN particles", Thin Solid Films Vol. 371, No. 1-2, 2000, pp. 95-104.

25. George, S. M., "Atomic Layer Deposition: An Overview", Chemical Reviews Vol. 110, No. 1, 2010, pp. 111-131.

26. Hakim, L. F., J. H. Blackson, and A. W. Weimer, "Modification of interparticle forces for nanoparticles using atomic layer deposition", Chemical Engineering Science Vol. 62, No. 22, 2007, pp. 6199-6211.

27. King, D. M., J. A. Spencer, X. Liang, L. F. Hakim, and A. W. Weimer, "Atomic layer deposition on particles using a fluidized bed reactor with in situ mass spectrometry", Surface & Coatings Technology Vol. 201, No. 22-23, 2007, pp. 9163-9171.

28. Barra, A. J., G. Diepvens, J. L. Ellzey, and M. R. Henneke, "Numerical study of the effects of material properties on flame stabilization in a porous burner", Combustion and Flame Vol. 134, No. 4, 2003, pp. 369-379.

29. Buck, R., J. F. Muir, R. E. Hogan, and R. D. Skocypec, "CARBON-DIOXIDE REFORMING OF METHANE IN A SOLAR VOLUMETRIC RECEIVER REACTOR—THE CAESAR PROJECT", Solar Energy Materials Vol. 24, No. 1-4, 1991, pp. 449-463.

30. Chavez, J. M., and C. Chaza, "TESTING OF A POROUS CERAMIC ABSORBER FOR A VOLUMETRIC AIR RECEIVER", Solar Energy Materials Vol. 24, No. 1-4, 1991, pp. 172-181.

31. Coquard, R., M. Loretz, and D. Baillis, "Conductive heat transfer in metallic/ceramic open-cell foams", Advanced Engineering Materials Vol. 10, No. 4, 2008, pp. 323-337.

32. Fay, M., R. Dhamrat, and J. L. Ellzey, "Effect of porous reactor design on conversion of methane to hydrogen", Combustion Science and Technology Vol. 177, No. 11, 2005, pp. 2171-2189.

33. Fend, T., B. Hoffschmidt, R. Pitz-Paal, O. Reutter, and P. Rietbrock, "Porous materials as open volumetric solar receivers: Experimental determination of thermophysical and heat transfer properties", Energy Vol. 29, No. 5-6, 2004, pp. 823-833.

34. Fend, T., R. Pitz-Paal, O. Reutter, J. Bauer, and B. Hoffschmidt, "Two novel high-porosity materials as volumetric receivers for concentrated solar radiation", Solar Energy Materials and Solar Cells Vol. 84, No. 1-4, 2004, pp. 291-304.

35. Fu, X., R. Viskanta, and J. P. Gore, "A model for the volumetric radiation characteristics of cellular ceramics", International Communications in Heat and Mass Transfer Vol. 24, No. 8, 1997, pp. 1069-1082.

36. Loretz, M., R. Coquard, D. Baillis, and E. Maire, "Metallic foams: Radiative properties/comparison between different models", Journal of Quantitative Spectroscopy & Radiative Transfer Vol. 109, No. 1, 2008, pp. 16-27.

37. Matthews, A. L., "Ceramic filters for the cast metal industry", Advanced Ceramic Materials, 1996, pp. 293-303.

38. Nettleship, I., "Applications of porous ceramics", Advanced Ceramic Materials, 1996, pp. 305-324.

39. van Setten, B., J. Bremmer, S. J. Jelles, M. Makkee, and J. A. Moulijn, "Ceramic foam as a potential molten salt oxidation catalyst support in the removal of soot from diesel exhaust gas", Catalysis Today Vol. 53, No. 4, 1999, pp. 613-621.

40. Scheffe, J. R., A. Frances, D. M. King, X. H. Liang, B. A. Branch, A. S. Cavanagh, S. M. George, and A. W. Weimer, "Atomic layer deposition of iron(III) oxide on zirconia nanoparticles in a fluidized bed reactor using ferrocene and oxygen", Thin Solid Films Vol. 517, No. 6, 2009, pp. 1874-1879.

41. Charvin, P., S. Abanades, E. Beche, F. Lemont, and G. Flamant, "Hydrogen production from mixed cerium oxides via three-step water-splitting cycles", Solid State Ionics Vol. 180, No. 14-16, 2009, pp. 1003-1010.

42. Kaneko, H., H. Ishihara, S. Taku, Y. Naganuma, N. Hasegawa, and Y. Tamaura, "Cerium ion redox system in $CeO2-xFe(2)O(3)$ solid solution at high temperatures (1,273-1,673 K) in the two-step water-splitting reaction for solar H-2 generation", Journal of Materials Science Vol. 43, No. 9, 2008, pp. 3153-3161.

43. Kaneko, H., T. Miura, H. Ishihara, S. Taku, T. Yokoyama, H. Nakajima, and Y. Tamaura, "Reactive ceramics of CeO2-MOx, (M=Mn, Fe, Ni, Cu) for H-2 generation by two-step water splitting using concentrated solar thermal energy", Energy Vol. 32, No. 5, 2007, pp. 656-663.

44. Kaneko, H., and Y. Tamaura, "Reactivity and XAFS study on (1-x)CeO2-xNiO (x=0.025-0.3) system in the two-step water-splitting reaction for solar H-2 production", Journal of Physics and Chemistry of Solids Vol. 70, No. 6, 2009, pp. 1008-1014.

45. Becht, M., and T. Morishita, "Thin film growth and microstructure analysis of CeO2 prepared by MOCVD", Chemical Vapor Deposition Vol. 2, No. 5, 1996, pp. 191-197.

46. Paivasaari, J., M. Putkonen, and L. Niinisto, "Cerium dioxide buffer layers at low temperature by atomic layer deposition", Journal of Materials Chemistry Vol. 12, No. 6, 2002, pp. 1828-1832.

47. Wrench, J. S., K. Black, H. C. Aspinall, A. C. Jones, J. Bacsa, P. R. Chalker, P. J. King, M. Werner, H. O. Davies, and P. N. Heys, "MOCVD and ALD of CeO2 Thin Films using a Novel Monomeric Ce-IV Alkoxide Precursor", Chemical Vapor Deposition Vol. 15, No. 10-12, 2009, pp. 259-+.

48. Petrasch, J., P. Coray, A. Meier, M. Brack, P. Haberling, D. Wuillemin, and A. Steinfeld, "A novel 50 kW 11,000 suns high-flux solar simulator based on an array of xenon arc lamps", Journal of Solar Energy Engineering-Transactions of the Asme Vol. 129, No. 4, 2007, pp. 405-411.

49. Schunk, L. O., and A. Steinfeld, "Kinetics of the Thermal Dissociation of ZnO Exposed to Concentrated Solar Irradiation Using a Solar-Driven Thermogravimeter in the 1800-2100 K Range", Aiche Journal Vol. 55, No. 6, 2009, pp. 1497-1504.

50. Petrasch, J., B. Schrader, P. Wyss, and A. Steinfeld, "Tomography-based determination of the effective thermal conductivity of fluid-saturated reticulate porous ceramics", Journal of Heat Transfer-Transactions of the Asme Vol. 130, No. 3, 2008.

51. Petrasch, J., P. Wyss, R. Stampfli, and A. Steinfeld, "Tomography-based multiscale analyses of the 3D geometrical morphology of reticulated porous ceramics", Journal of the American Ceramic Society Vol. 91, No. 8, 2008, pp. 2659-2665.

52. Haussener, S., P. Coray, W. Lipinski, P. Wyss, and A. Steinfeld, "Tomography-Based Heat and Mass Transfer Characterization of Reticulate Porous Ceramics for High-Temperature Processing", Journal of Heat Transfer-Transactions of the Asme Vol. 132, No. 2, 2010.

53. Haussener, S., W. Lipinski, J. Petrasch, P. Wyss, and A. Steinfeld, "Tomographic Characterization of a Semitransparent-Particle Packed Bed and Determination of its Thermal Radiative Properties", Journal of Heat Transfer-Transactions of the Asme Vol. 131, No. 7, 2009.

54. Spencer, G. H., and M. V. R. Murty, "GENERAL RAY-TRACING PROCEDURE", Journal of the Optical Society of America Vol. 52, No. 6, 1962, pp. 672-&.

55. Andersson, T., and D. J. Rowcliffe, "Indentation thermal shock test for ceramics", Journal of the American Ceramic Society Vol. 79, No. 6, 1996, pp. 1509-1514.

56. Collin, M., and D. Rowcliffe, "Analysis and prediction of thermal shock in brittle materials", Acta Materialia Vol. 48, No. 8, 2000, pp. 1655-1665.

57. Faber, K. T., M. D. Huang, and A. G. Evans, "QUANTITATIVE STUDIES OF THERMAL-SHOCK IN CERAMICS BASED ON A NOVEL TEST TECHNIQUE", Journal of the American Ceramic Society Vol. 64, No. 5, 1981, pp. 296-301.

58. Lord, H. W., and Y. Shulman, "A GENERALIZED DYNAMICAL THEORY OF THERMOELASTICITY", Journal of the Mechanics and Physics of Solids Vol. 15, No. 5, 1967, pp. 299-&.

59. Golmon, S., K. Maute, and M. L. Dunn, "Numerical modeling of electrochemical-mechanical interactions in lithium polymer batteries", Computers & Structures Vol. 87, No. 23-24, 2009, pp. 1567-1579.

60. Bohren, C. F., and D. R. Hoffman, "Absorption and Scattering of Light by Small Particles", John Wiley and Sons Vol. (New York), 1983.

61. Siegel, R., and J. R. Howell, "Thermal Radiation Heat Transfer (4th ed.)", Taylor and Francis Vol. (New York), 2002.

62. Perkins, C., and A. Weimer, "Computational fluid dynamics simulation of a tubular aerosol reactor for solar thermal ZnO decomposition", Journal of Solar Energy Engineering-Transactions of the Asme Vol. 129, No. 4, 2007, pp. 391-404.

63. Chui, E. H., and G. D. Raithby, "COMPUTATION OF RADIANT-HEAT TRANSFER ON A NONORTHOGO- NAL MESH USING THE FINITE-VOLUME METHOD", Numerical Heat Transfer Part B-Fundamentals Vol. 23, No. 3, 1993, pp. 269-288.

64. Murthy, J. Y., and S. R. Mathur, "Finite volume method for radiative heat transfer using unstructured meshes", Journal of Thermophysics and Heat Transfer Vol. 12, No. 3, 1998, pp. 313-321.

65. Raithby, G. D., and E. H. Chui, "A FINITE-VOLUME METHOD FOR PREDICTING A RADIANT-HEAT TRANSFER IN ENCLOSURES WITH PARTICIPATING MEDIA", Journal of Heat Transfer-Transactions of the Asme Vol. 112, No. 2, 1990, pp. 415-423.

66. Wendelin, T., "SolTRACE: A New Optical Modeling Tool for Concentrating Solar Optics", Proceedings of the ISEC 2003: International Solar Energy Conference Vol. ASME (New York), No. March, 2003, pp. 253-260.

67. Sargent, and Lundy, "Assessment of Parabolic Trough and Power Tower Solar Technology Cost and Performance Forecasts", NREL/SR-550-35060, 2003.

68. Camacho, E. F., F. R. Rubio, M. Berenguel, and L. Valenzuela, "A survey on control schemes for distributed solar collector fields. Part 1: Modeling and basic control approaches", Solar Energy Vol. 81, No. 10, 2007, pp. 1240-1251.

69. Camacho, E. F., F. R. Rubio, M. Berenguel, and L. Valenzuela, "A survey on control schemes for distributed solar collector fields. Part II: Advanced control approaches", Solar Energy Vol. 81, No. 10, 2007, pp. 1252-1272.

70. Cirre, C. M., M. Berenguel, L. Valenzuela, and E. F. Camacho, "Feedback linearization control for a distributed solar collector field", Control Engineering Practice Vol. 15, No. 12, 2007, pp. 1533-1544.

71. Camacho, E. F., and C. Bordons, "Model Predictive Control", Springer Verlag (London), 1999.

72. Bird, R. B., W. E. Stewart, and E. N. Lightfoot, "Transport Phenomena (2nd ed)", John Wiley and Sons Vol. (New York), 2002.

73. Berenguel, M., F. R. Rubio, A. Valverde, P. J. Lara, M. R. Arahal, E. F. Camacho, and M. Lopez, "An artificial vision-based control system for automatic heliostat positioning offset correction in a central receiver solar power plant", Solar Energy Vol. 76, No. 5, 2004, pp. 563-575.

74. Lopez-Martinez, M., M. Vargas, and F. R. Rubio, "Vision-based system for the safe operation of a solar power tower plant", Advances in Artificial Intelligence—Iberamia 2002, Proceedings, 2002, pp. 943-952.

The invention claimed is:

1. A method of splitting a gas-phase reactant, the method comprising the steps of:
providing a reactor comprising at least one reactor tube or vessel and an active redox material within the reactor tube or vessel;
thermally reducing the active redox material at a first temperature and using a first gas, wherein the first gas is an inert gas;
oxidizing the active redox material at a second temperature and using a second gas;
using an adsorbent material to remove oxygen from the reactor during the reducing step, and
regenerating the adsorbent material during the step of reducing,
wherein the reducing and oxidizing steps are performed under substantially isothermal conditions, wherein the difference between the first temperature and the second temperature is less than 100° C.

2. The method of splitting a gas-phase reactant of claim 1, wherein the first temperature and the second temperature are between about 950° C. and about 1750° C.

3. The method of splitting a gas-phase reactant of claim 1, wherein the difference between the first temperature and the second temperature is less than about 50° C.

4. The method of splitting a gas-phase reactant of claim 1, further comprising the step of removing a first product gas during the oxidizing step.

5. The method of splitting a gas-phase reactant of claim 1, further comprising the step of separating two or more product gasses.

6. The method of splitting a gas-phase reactant of claim 1, wherein the reducing and oxidizing steps are pulsed.

7. The method of splitting a gas-phase reactant of claim 1, wherein the second reactant gas comprises from about 50 wt % to about 100 wt % oxidizing gas.

8. The method of splitting a gas-phase reactant of claim 1, wherein an absolute pressure within the reactor tube or vessel is between about 1 Atm and about 5 Atm.

9. The method of splitting a gas-phase reactant of claim 1, wherein a pressure during the oxidizing step is greater than the pressure during the reducing step.

10. The method of splitting a gas-phase reactant of claim 1, wherein the first temperature and the second temperature are between about 1350° C. to about 1600° C.

11. The method of splitting a gas-phase reactant of claim 1, wherein the difference between the first temperature and the second temperature is less than about 25° C.

12. The method of splitting a gas-phase reactant of claim 1, wherein the second gas comprises one or more gasses selected from the group consisting of: $H_2O$, $CO_2$, air, and $NO_x$, where x is 1 or 2, and $SO_3$.

13. The method of splitting a gas-phase reactant of claim 1, further comprising the steps of repeating the steps of reducing and oxidizing.

14. The method of splitting a gas-phase reactant of claim 1, wherein the adsorbent material comprises biomass.

15. The method of splitting a gas-phase reactant of claim 1, wherein the adsorbent material comprises carbon black.

16. The method of splitting a gas-phase reactant of claim 1, wherein the active redox material is formed using one or more of ball milling , sol-gel processing, and depositing redox active material onto substrates.

17. The method of splitting a gas-phase reactant of claim 1, wherein the active redox material comprises M-ferrite/alumina hercynite material.

18. The method of splitting a gas-phase reactant of claim 1, wherein the reactor comprises a plurality of reactor tubes or a plurality of vessels and at least one reactor tube or vessel performs a reducing step while another tube or vessel performs an oxidizing step.

19. The method of splitting a gas-phase reactant of claim 1, wherein the at least one reactor tube or at least one vessel is heated within a solar cavity receiver.

* * * * *